US010348763B2

(12) United States Patent
Gopalakrishna et al.

(10) Patent No.: US 10,348,763 B2
(45) Date of Patent: Jul. 9, 2019

(54) RESPONSIVE DECEPTION MECHANISMS

(71) Applicant: Acalvio Technologies, Inc., Cupertino, CA (US)

(72) Inventors: Rajendra A. Gopalakrishna, Bangalore (IN); Johnson Wu, Santa Clara, CA (US); Sreenivas Gukal, Santa Clara, CA (US); Rammohan Varadarajan, Cupertino, CA (US)

(73) Assignee: Acalvio Technologies, Inc., Cupertino, CA (US)

( * ) Notice: Subject to any disclaimer, the term of this patent is extended or adjusted under 35 U.S.C. 154(b) by 0 days.

(21) Appl. No.: 15/496,724

(22) Filed: Apr. 25, 2017

(65) Prior Publication Data

US 2017/0310705 A1     Oct. 26, 2017

Related U.S. Application Data

(60) Provisional application No. 62/344,267, filed on Jun. 1, 2016, provisional application No. 62/327,829, filed on Apr. 26, 2016.

(30) Foreign Application Priority Data

Mar. 13, 2017   (IN) .............................. 201741008619

(51) Int. Cl.
*H04L 29/06*     (2006.01)
*H04L 12/24*     (2006.01)
(52) U.S. Cl.
CPC ...... *H04L 63/1491* (2013.01); *H04L 41/0886* (2013.01); *H04L 63/1425* (2013.01);
(Continued)

(58) Field of Classification Search
CPC .................................................. H04L 63/1491
See application file for complete search history.

(56) References Cited

U.S. PATENT DOCUMENTS 8,713,306 B1 * 4/2014 Bennett ............... H04L 63/1491
                                                  370/252
9,495,188 B1 * 11/2016 Ettema ................ G06F 9/45533
(Continued)

OTHER PUBLICATIONS

Clark, A., Sun, K. and Poovendran, R., Dec. 2013. Effectiveness of IP address randomization in decoy-based moving target defense. In Decision and Control (CDC), 2013 IEEE 52nd Annual Conference on (pp. 678-685). IEEE. (Year: 2013).*

(Continued)

*Primary Examiner* — James R Turchen
(74) *Attorney, Agent, or Firm* — Kilpatrick Townsend & Stockton LLP

(57) ABSTRACT

Provided are methods, network devices, and computer-program products for dynamically configuring a deception mechanism in response to network traffic from a possible network threat. In various implementations, a network deception system can receive a packet from a network. The network deception system can determine an intent associated with the packet by examining the contents of the packet. The network deception system can further configure a deception mechanism to respond to the intent, for example with the appropriate network communications, software or hardware configuration, and/or data.

36 Claims, 26 Drawing Sheets

(52) U.S. Cl.
CPC ...... *H04L 63/1433* (2013.01); *H04L 41/0816* (2013.01); *H04L 63/1408* (2013.01)

(56) References Cited

U.S. PATENT DOCUMENTS

| | | | | |
|---|---|---|---|---|
| 9,838,427 | B2* | 12/2017 | Quinlan | H04L 63/1491 |
| 9,860,208 | B1* | 1/2018 | Ettema | G06F 21/602 |
| 9,954,872 | B2* | 4/2018 | Capalik | H04L 63/1416 |
| 2002/0188864 | A1* | 12/2002 | Jackson | H04L 63/1408 726/4 |
| 2004/0148521 | A1* | 7/2004 | Cohen | H04L 63/0263 726/22 |
| 2004/0162994 | A1* | 8/2004 | Cohen | H04L 63/0227 726/22 |
| 2010/0077483 | A1* | 3/2010 | Stolfo | G06F 21/554 726/24 |
| 2012/0060220 | A1* | 3/2012 | Kerseboom | G06F 21/566 726/24 |
| 2012/0084866 | A1* | 4/2012 | Stolfo | G06F 21/554 726/25 |
| 2012/0311691 | A1 | 12/2012 | Karlin et al. | |
| 2013/0242743 | A1 | 9/2013 | Thomas et al. | |
| 2014/0096229 | A1* | 4/2014 | Burns | H04L 63/1491 726/15 |
| 2014/0115706 | A1* | 4/2014 | Silva | H04L 63/1425 726/23 |
| 2014/0298469 | A1* | 10/2014 | Marion | G06F 21/55 726/23 |
| 2015/0047032 | A1* | 2/2015 | Hannis | H04L 63/1416 726/23 |
| 2015/0058983 | A1* | 2/2015 | Zeitlin | H04L 63/1408 726/23 |
| 2015/0121529 | A1* | 4/2015 | Quinlan | H04L 63/1491 726/23 |
| 2016/0080415 | A1* | 3/2016 | Wu | H04L 63/1491 726/23 |
| 2016/0119365 | A1* | 4/2016 | Barel | G06F 16/35 726/12 |
| 2016/0149950 | A1* | 5/2016 | Ashley | G06F 9/45533 726/23 |
| 2016/0294858 | A1* | 10/2016 | Woolward | G06F 21/552 |
| 2017/0134423 | A1 | 5/2017 | Sysman et al. | |
| 2017/0180407 | A1* | 6/2017 | Zage | H04L 63/1433 |
| 2017/0331856 | A1* | 11/2017 | Vissamsetty | H04L 63/1416 |
| 2018/0115470 | A1* | 4/2018 | Huang | H04L 41/0873 |

OTHER PUBLICATIONS

U.S. Appl. No. 15/496,716, filed Apr. 25, 2017, Final Office Action dated Nov. 9, 2017, all pages.

* cited by examiner

RESPONSIVE DECEPTION MECHANISMS

CROSS REFERENCES TO RELATED APPLICATIONS

This application claims the benefit of and priority to U.S. Provisional Application No. 62/327,829, filed on Apr. 26, 2016; U.S. Provisional Application No. 62/344,267, filed on Jun. 1, 2016; and Indian Provisional Application No. 201741008619, filed on Mar. 13, 2017. Each of the preceding applications are incorporated herein by reference in their entirety.

BRIEF SUMMARY

Provided are methods, including computer-implemented methods or methods implemented by a network device, devices including network devices, and computer-program products for network threat engagement and deception escalation. In various implementations, super-low deception mechanisms can be implemented that require few computation resources, and that can respond to basic network packets for specific Internet Protocol (IP) addresses. When a suspected network threat attempts to engage with a super-low deception, the deception can be escalated to an interactive deception, include a low-interaction deception or a high-interaction deception. Interactive deceptions can better emulate a real computing system in a network. In various implementations, the interactive deception is configured in response to network traffic from the network threat, so that the network threat may be presented with a system and/or data that may meet the threat's desired intent. In this way, it may be possible to keep the threat engaged, and to gain intelligence about the threat.

In various implementations, a network device can be configured with a super-low deception mechanism. The super-low deception mechanism can include address information, where the address information includes a Media Access Control (MAC) address and an Internet Protocol (IP) address. The network device can further be configured to receive network traffic addressed to the MAC address or the IP address. The network device can further be configured to determine that the network traffic is suspect. The network device can further be configured to initiate an interactive deception mechanism, which includes de-assigning the address information from the address deception mechanism and reassigning the address information to the interactive deception mechanism. The network device can further be configured to direct the network traffic to the interactive deception mechanism.

In various implementations, the network device can further be configured to receive a request addressed to the address deception mechanism, and respond to the request using the address information.

In various implementations, determining that network traffic is suspect includes analyzing a behavior of the network traffic, and determining that a behavior of particular network traffic corresponds to behavior associated with a network attack.

In various implementations, the interactive deception mechanism is a low-interaction deception mechanism, where a low-interaction deception mechanism is configured to respond to one or more network addresses. In some implementations, when the interactive deception mechanism is a low-interaction deception mechanism, the network device a be further configured to monitor the network traffic to the low-interaction deception mechanism, and determine that particular network traffic is suspect.

In various implementations, the network device can be further configured to initiating a high-interaction deception mechanism. Initiating the network device can include de-assigning the address information from the low-interaction deception mechanism and reassigning the address information to the high-interaction deception mechanism. The network device can further be configured to direct the particular network traffic to the high-interaction deception mechanism.

In various implementations, the interactive deception mechanism is a high-interaction deception mechanism, where a high-interaction deception mechanism is configured with a particular operating system and particular services.

In some implementations, the interactive deception mechanism is executing on the network device. In some implementations, the interactive deception mechanism is executing on another network device.

BRIEF DESCRIPTION OF THE DRAWINGS

Illustrative embodiments are described in detail below with reference to the following figures.

DETAILED DESCRIPTION

Figure 1:
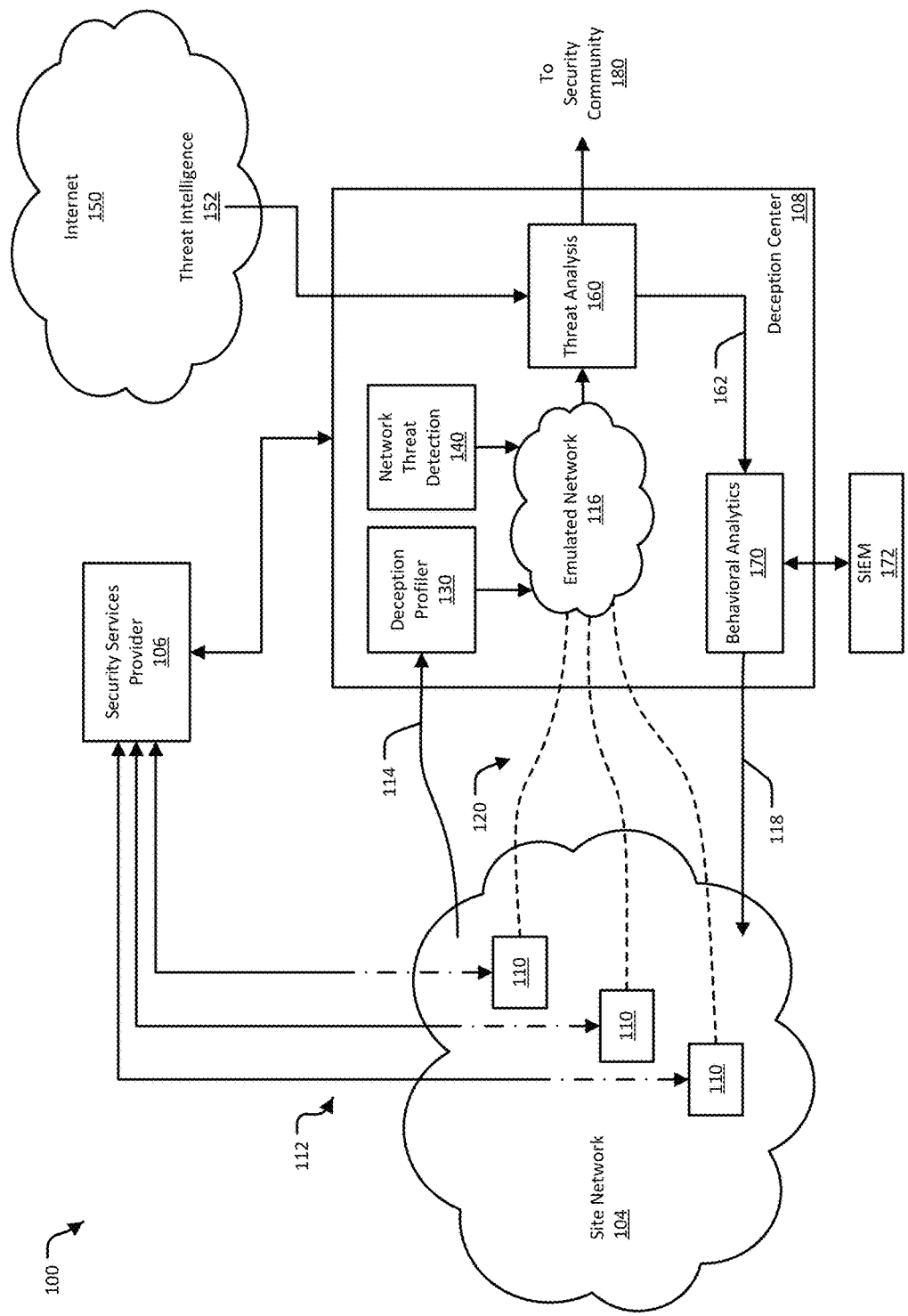
FIG. 1 illustrates an example of a network threat detection and analysis system, in which various implementations of a deception-based security system can be used.

Network deception mechanisms, often referred to as "honeypots," "honey tokens," and "honey nets," among others, defend a network from threats by distracting or diverting the threat. Honeypot-type deception mechanisms can be installed in a network for a particular site, such as a business office, to act as decoys in the site's network. Honeypot-type deception mechanisms are typically configured to be indistinguishable from active, production systems in the network. Additionally, such deception mechanisms are typically configured to be attractive to a network threat by having seemingly valuable data and/or by appearing vulnerable to infiltration. Though these deception mechanisms can be indistinguishable from legitimate parts of the site network, deception mechanisms are not part of the normal operation of the network, and would not be accessed during normal, legitimate use of the site network. Because normal users of the site network would not normally use or access a deception mechanism, any use or access to the deception mechanism is suspected to be a threat to the network.

"Normal" operation of a network generally includes network activity that conforms with the intended purpose of a network. For example, normal or legitimate network activity can include the operation of a business, medical facility, government office, education institution, or the ordinary network activity of a private home. Normal network activity can also include the non-business-related, casual activity of users of a network, such as accessing personal email and visiting websites on personal time, or using network resources for personal use. Normal activity can also include the operations of network security devices, such as firewalls, anti-virus tools, intrusion detection systems, intrusion protection systems, email filters, adware blockers, and so on. Normal operations, however, exclude deceptions mechanisms, in that deception mechanisms are not intended to take part in business operations or casual use. As such, network users and network systems do not normally access deceptions mechanisms except perhaps for the most routine network administrative tasks. Access to a deception mechanism, other than entirely routine network administration, may thus indicate a threat to the network.

Threats to a network can include active attacks, where an attacker interacts or engages with systems in the network to steal information or do harm to the network. An attacker may be a person, or may be an automated system. Examples of active attacks include denial of service (DoS) attacks, distributed denial of service (DDoS) attacks, spoofing attacks, "man-in-the-middle" attacks, attacks involving malformed network requests (e.g. Address Resolution Protocol (ARP) poisoning, "ping of death," etc.), buffer, heap, or stack overflow attacks, and format string attacks, among others. Threats to a network can also include self-driven, self-replicating, and/or self-triggering malicious software. Malicious software can appear innocuous until activated, upon which the malicious software may attempt to steal information from a network and/or do harm to the network. Malicious software is typically designed to spread itself to other systems in a network. Examples of malicious software include ransomware, viruses, worms, Trojan horses, spyware, keyloggers, rootkits, and rogue security software, among others.

In at least some cases, honeypot-type deception mechanisms can be easily identified as decoys. For example, a deception mechanism can be fingerprinted and identified as a decoy by examining how it responds to network packets. Specifically, a decoy system may be executing a Linux operating system, and present a Windows operating system to the network. The decoy system's pattern of responses to network packets, however, may give it away as a Linux-based system. As another example, a deception mechanism implemented using a proxy server may present multiple Internet Protocol (IP) addresses to the network, where each IP address is meant to represent a distinct decoy system. Because the proxy server typically has only one Media Access Control (MAC) address, however, once an attacker accesses any of the multiple IP addresses, the attacker may know that he has found a decoy system on the network.

More authentic-seeming deception mechanisms can be created using virtual machines. A virtual machine is an emulated computer system running on the hardware of a physical computer system. A virtual machine typically executes its own operating system, which may be different than the operating system running on the underlying physical computer system. The virtual machine can also provide user applications, which have access only to the resources provided by the virtual machine. The virtual machine can make some or all of the resources of the physical computer system available to its virtual operating system and applications. Alternatively or additionally, the virtual machine can present emulated physical resources to its operating system or applications. The physical computer system may be able to host multiple virtual machines, with the virtual machines sharing the physical computer system's hardware resources.

A deception mechanism implemented using a virtual machine may be able to have distinct MAC address, in addition to having a distinct IP address. Multiple virtual machines can thus be used to create multiple deception mechanisms, which may appear indistinct from real systems on the network. Virtual machines, however, require processing resources. The physical machine that is hosting the virtual machines typically can only support a limited number of virtual machines. Thus the number of virtual machine-based deception mechanisms that can be placed on a network may be limited by available physical computing resources.

Virtual machine-based deception mechanisms may also be able to engage a network attacker. The virtual machine can be configured with authentic services and/or data that appear to be valuable. By keeping an attacker engaged, the attacker is kept away from the real systems in the network. Additionally, by allowing the attacker to freely access the virtual machine, information can be collected about the attacker, including, for example, his intentions, his methods of attack, his network location, and/or is identity.

Simpler and less processor-intensive deception mechanisms, however, may be able to engage an attacker only for a short time. Less processor-intensive deception mechanisms, such as proxy servers, network address table (NAT)-based deceptions, and servers emulating services, may attract the attention of an attacker, but once the attacker begins to explore these deceptions, the attacker may quickly learn that they are decoys. For example, once an attacker has gained shell access to one of the deceptions, by exploring the environment provided by the deception the deception's true nature may be revealed. Additionally, less processor-intensive deceptions may not be able to engage an attacker to the same degree that a real network host can.

Additionally knowing which services and/or data to configure for a deception mechanism can be difficult. Network threats are frequently targeted at a specific type of network system, certain data, and/or are seeking to exploit particular vulnerability. If the threat actor's intent were known it would be possible to put up defenses to the actor's attack. Conversely, it would be possible to tailor a deception mechanism that is a perfect trap for the threat actor.

Generally, however, a threat actor's exact goal, and the method by which the actor will attempt such a goal, cannot be known in advance. The configuration of a deception mechanism may thus only be a best guess at services and/or data that are desirable attack targets. The configuration can be based on threat intelligence, but even the best threat intelligence may not be able to anticipate so called "zero-day" attacks, which are attacks that take advantage of previously unknown vulnerabilities.

In various implementations, a network deception system can be implemented that dynamically escalates an engagement with a threat source. The network deception system can also dynamically configure deception mechanisms in response to network packets received from a perceived threat source. In this way, the threat source may have a much tougher time distinguishing real assets in the network from deceptions, and can be kept engaged and away from real assets in a network. Additionally, intelligence can be gathered about the threat source.

In various implementations, the network deception system can include an emulated network. The emulated network can include one or more very low-interaction, network address-based deception mechanisms, as well as low-interaction deception mechanisms and high-interaction deception mechanisms. The network address-based deceptions and the low-interaction deceptions can operate to attract and engage the attention of a network threat. The high-interaction deception can then keep the attacker engaged and contained.

In various implementations, the super-low deceptions may not require a virtual machine, and thus may require few processing resources. The low-interaction deceptions can use a virtual machine, where the virtual machine is able to represent many emulated network devices. The network deception system can initiate a low-interaction deception when network traffic is received that appears suspicious. Should the network deception system receive additional network traffic that requires a more involved engagement, the network deception system can initiate a high-interaction deception. Communications to the low-interaction deception can thereafter be redirected to the high-interaction deception. The high-interaction deception can also be a virtual machine, here dedicated to convincingly emulating one system.

Low-interaction and high-interaction deceptions thus can be initiated only as needed. Super-low deceptions may require very little processing resources. By using more processor-intensive deceptions only as needed, the network deception system can possibly emulate thousands of deceptions on a network, and save processing resources for instances where an attack on the network is suspected.

Additionally, in various implementations, the deception mechanisms can be assigned distinct and authentic-seeming MAC addresses, as well as legitimate IP addresses. When a low-interaction deception is initiated, in response to suspect network traffic, a MAC address and its associated IP address can be de-assigned from a super-low deception and can be reassigned to the low-interaction deception. Similarly, when a high-interaction deception is initiated, the MAC address and IP address may be de-assigned from the low-interaction deception and be reassigned to the high-interaction deception. In this way, threat source may be seamlessly transferred between deceptions, keeping the threat source engaged and fooled.

In various implementations, the network deception system can also dynamically reconfigure the emulated network, to keep an attacker engaged and contained. For example, once an apparent attacker is engaged with a high-interaction deception, the network deception system may initiate additional deceptions. Some of these additional deceptions may be configured to resemble systems on the real network. Thus, should the threat source attempt to move laterally from the high-interaction deception to another network system, the threat source can be connected to another deception, even if the threat source attempts to connect to a real system on the real network. In this way, the attacker may remain engaged, and may be kept out of the real network.

In various implementations, the deception mechanisms can be dynamically configured, and tailored to an apparent intent of a threat source. The ultimate goal of the threat source may not be determinable in advance, but by automatically and dynamically responding to various types of input that a threat source can send to a deception mechanism, the network deception system can attempt to give the threat source what it is that the threat source is looking for. For example, when the deception mechanism receives packets that use a particular network protocol, the deception mechanism can be mutated or morphed to have the particular protocol (e.g., the appropriate service is launched to enable the protocol). As another example, when the deception mechanism receives packets with data that seek to exploit a bug in a particular application, the deception mechanism can be morphed into having the application, with the bug (e.g., a copy of the application is automatically placed on the deception mechanism). In these and other examples, dynamic, context-aware deceptions can be generated that are responsive to a particular threat.

Keeping the threat source engaged can have the benefit of keeping the threat source away from actual network systems and truly valuable data. Additionally, the deception mechanism can be used to gather intelligence about the threat source. For example, it may be possible to determine the threat source's methods, such as tools the threat source is using. As another example, the threat source's activity may reveal a previously unknown software, firmware, and/or hardware vulnerability. As another example, it may be possible to identify types of targets that malicious actors are presently after. As another example, it may be possible to trace a threat source and find its origin.

Deception-Based Security Systems

FIG. 1 illustrates an example of a network threat detection and analysis system 100, in which various implementations of a deception-based security system can be used. The network threat detection and analysis system 100, or, more briefly, network security system 100, provides security for a site network 104 using deceptive security mechanisms, a variety of which may be called "honeypots." The deceptive security mechanisms may be controlled by and inserted into the site network 104 using a deception center 108 and sensors 110, which may also be referred to as deception sensors, installed in the site network 104. In some implementations, the deception center 108 and the sensors 110 interact with a security services provider 106 located outside of the site network 104. The deception center 108 may also obtain or exchange data with sources located on the Internet 150.

Security mechanisms designed to deceive, sometimes referred to as "honeypots," may also be used as traps to divert and/or deflect unauthorized use of a network away from the real network assets. A deception-based security mechanism may be a computer attached to the network, a process running on one or more network systems, and/or some other device connected to the network. A security mechanism may be configured to offer services, real or emulated, to serve as bait for an attack on the network.

Deception-based security mechanisms that take the form of data, which may be called "honey tokens," may be mixed in with real data in devices in the network. Alternatively or additionally, emulated data may also be provided by emulated systems or services.

Deceptive security mechanisms can also be used to detect an attack on the network. Deceptive security mechanisms are generally configured to appear as if they are legitimate parts of a network. These security mechanisms, however, are not, in fact, part of the normal operation of the network. Consequently, normal activity on the network is not likely to access the security mechanisms. Thus any access over the network to the security mechanism is automatically suspect.

The network security system 100 may deploy deceptive security mechanisms in a targeted and dynamic fashion. Using the deception center 108 the system 100 can scan the site network 104 and determine the topology of the site network 104. The deception center 108 may then determine devices to emulate with security mechanisms, including the type and behavior of the device. The security mechanisms may be selected and configured specifically to attract the attention of network attackers. The security mechanisms may also be selected and deployed based on suspicious activity in the network. Security mechanisms may be deployed, removed, modified, or replaced in response to activity in the network, to divert and isolate network activity related to an apparent attack, and to confirm that the network activity is, in fact, part of a real attack.

The site network 104 is a network that may be installed among the buildings of a large business, in the office of a small business, at a school campus, at a hospital, at a government facility, or in a private home. The site network 104 may be described as a local area network (LAN) or a group of LANs. The site network 104 may be one site belonging to an organization that has multiple site networks 104 in one or many geographical locations. In some implementations, the deception center 108 may provide network security to one site network 104, or to multiple site networks 104 belonging to the same entity.

The site network 104 is where the networking devices and users of the an organizations network may be found. The site network 104 may include network infrastructure devices, such as routers, switches hubs, repeaters, wireless base stations, and/or network controllers, among others. The site network 104 may also include computing systems, such as servers, desktop computers, laptop computers, tablet computers, personal digital assistants, and smart phones, among others. The site network 104 may also include other analog and digital electronics that have network interfaces, such as televisions, entertainment systems, thermostats, refrigerators, and so on.

The deception center 108 provides network security for the site network 104 (or multiple site networks for the same organization) by deploying security mechanisms into the site network 104, monitoring the site network 104 through the security mechanisms, detecting and redirecting apparent threats, and analyzing network activity resulting from the apparent threat. To provide security for the site network 104, in various implementations the deception center 108 may communicate with sensors 110 installed in the site network 104, using network tunnels 120. As described further below, the tunnels 120 may allow the deception center 108 to be located in a different sub-network ("subnet") than the site network 104, on a different network, or remote from the site network 104, with intermediate networks (possibly including the Internet 150) between the deception center 108 and the site network 104.

In some implementations, the network security system 100 includes a security services provider 106. In these implementations, the security services provider 106 may act as a central hub for providing security to multiple site networks, possibly including site networks controlled by different organizations. For example, the security services provider 106 may communicate with multiple deception centers 108 that each provide security for a different site network 104 for the same organization. In some implementations, the security services provider 106 is located outside the site network 104. In some implementations, the security services provider 106 is controlled by a different entity than the entity that controls the site network. For example, the security services provider 106 may be an outside vendor. In some implementations, the security services provider 106 is controlled by the same entity as that controls the site network 104.

In some implementations, when the network security system 100 includes a security services provider 106, the sensors 110 and the deception center 108 may communicate with the security services provider 106 in order to be connected to each other. For example, the sensors 110, which may also be referred to as deception sensors, may, upon powering on in the site network 104, send information over a network connection 112 to the security services provider 106, identifying themselves and the site network 104 in which they are located. The security services provider 106 may further identify a corresponding deception center 108 for the site network 104. The security services provider 106 may then provide the network location of the deception center 108 to the sensors 110, and may provide the deception center 108 with the network location of the sensors 110. A network location may take the form of, for example, an Internet Protocol (IP) address. With this information, the deception center 108 and the sensors 110 may be able to configure tunnels 120 to communicate with each other.

In some implementations, the network security system 100 does not include a security services provider 106. In these implementations, the sensors 110 and the deception center 108 may be configured to locate each other by, for example, sending packets that each can recognize as coming for the other. Using these packets, the sensors 110 and deception center 108 may be able to learn their respective locations on the network. Alternatively or additionally, a network administrator can configure the sensors 110 with the network location of the deception center 108, and vice versa.

In various implementations, the sensors 110 are a minimal combination of hardware and/or software, sufficient to form a network connection with the site network 104 and a tunnel 120 with the deception center 108. For example, a sensor 110 may be constructed using a low-power processor, a network interface, and a simple operating system. In various implementations, the sensors 110 provide the deception center 108 with visibility into the site network 104, such as for example being able to operate as a node in the site network 104, and/or being able to present or project deceptive security mechanisms into the site network 104, as described further below. Additionally, in various implementations, the sensors 110 may provide a portal through which a suspected attack on the site network 104 can be redirected to the deception center 108, as is also described below.

In various implementations, the deception center 108 may be configured to profile the site network 104, deploy deceptive security mechanisms for the site network 104, detect suspected threats to the site network 104, analyze the suspected threat, and analyze the site network 104 for exposure and/or vulnerability to the supposed threat.

To provide the site network 104, the deception center 108 may include a deception profiler 130. In various implementations, the deception profiler may 130 derive information 114 from the site network 104, and determine, for example, the topology of the site network 104, the network devices included in the site network 104, the software and/or hardware configuration of each network device, and/or how the network is used at any given time. Using this information, the deception profiler 130 may determine one or more deceptive security mechanisms to deploy into the site network 104.

In various implementations, the deception profiler may configure an emulated network 116 to emulate one or more computing systems. Using the tunnels 120 and sensors 110, the emulated computing systems may be projected into the site network 104, where they serve as deceptions. The emulated computing systems may include address deceptions, low-interaction deceptions, and/or high-interaction deceptions. In some implementations, the emulated computing systems may be configured to resemble a portion of the network. In these implementations, this network portion may then be projected into the site network 104.

In various implementations, a network threat detection engine 140 may monitor activity in the emulated network 116, and look for attacks on the site network 104. For example, the network threat detection engine 140 may look for unexpected access to the emulated computing systems in the emulated network 116. The network threat detection engine 140 may also use information 114 extracted from the site network 104 to adjust the emulated network 116, in order to make the deceptions more attractive to an attack, and/or in response to network activity that appears to be an attack. Should the network threat detection engine 140 determine that an attack may be taking place, the network threat detection engine 140 may cause network activity related to the attack to be redirected to and contained within the emulated network 116.

In various implementations, the emulated network 116 is a self-contained, isolated, and closely monitored network, in which suspect network activity may be allowed to freely interact with emulated computing systems. In various implementations, questionable emails, files, and/or links may be released into the emulated network 116 to confirm that they are malicious, and/or to see what effect they have. Outside actors can also be allowed to access emulated system, steal data and user credentials, download malware, and conduct any other malicious activity. In this way, the emulated network 116 not only isolated a suspected attack from the site network 104, but can also be used to capture information about an attack. Any activity caused by suspect network activity may be captured in, for example, a history of sent and received network packets, log files, and memory snapshots.

In various implementations, activity captured in the emulated network 116 may be analyzed using a targeted threat analysis engine 160. The threat analysis engine 160 may examine data collected in the emulated network 116 and reconstruct the course of an attack. For example, the threat analysis engine 160 may correlate various events seen during the course of an apparent attack, including both malicious and innocuous events, and determine how an attacker infiltrated and caused harm in the emulated network 116. In some cases, the threat analysis engine 160 may use threat intelligence 152 from the Internet 150 to identify and/or analyze an attack contained in the emulated network 116. The threat analysis engine 160 may also confirm that suspect network activity was not an attack. The threat analysis engine 160 may produce indicators 162 that describe the suspect network activity, including indicating whether the suspect activity was or was not an actual threat. The threat analysis engine 160 may share these indicators 162 with the security community 180, so that other networks can be defended from the attack. The threat analysis engine 160 may also send the indicators 162 to the security services provider 106, so that the security services provider 106 can use the indicators to defend other site networks.

In various implementations, the threat analysis engine 160 may also send threat indicators 162, or similar data, to a behavioral analytics engine 170. The behavioral analytics engine 170 may be configured to use the indicators 162 to probe 118 the site network 104, and see whether the site network 104 has been exposed to the attack, or is vulnerable to the attack. For example, the behavioral analytics engine 170 may search the site network 104 for computing systems that resemble emulated computing systems in the emulated network 116 that were affected by the attack. In some implementations, the behavioral analytics engine 170 can also repair systems affected by the attack, or identify these systems to a network administrator. In some implementations, the behavioral analytics engine 170 can also reconfigure the site network's 104 security infrastructure to defend against the attack.

The behavioral analytics engine 170 can work in conjunction with a Security Information and Event Management (SIEM) 172 system. In various implementations, SIEM includes software and/or services that can provide real-time analysis of security alerts generates by network hardware and applications. In various implementations, the deception center 108 can communicate with the SIEM 172 system to obtain information about computing and/or networking systems in the site network 104.

Using deceptive security mechanisms, the network security system 100 may thus be able to distract and divert attacks on the site network 104. The network security system 100 may also be able to allow, using the emulated network 116, and attack to proceed, so that as much can be learned about the attack as possible. Information about the attack can then be used to find vulnerabilities in the site network 104. Information about the attack can also be provided to the security community 180, so that the attack can be thwarted elsewhere.

Customer Installations

The network security system, such as the deception-based system described above, may be flexibly implemented to accommodate different customer networks. FIGS. 2A-2D provide examples of different installation configurations 200a-200d that can be used for different customer networks 202. A customer network 202 may generally be described as a network or group of networks that is controlled by a common entity, such as a business, a school, or a person. The customer network 202 may include one or more site networks 204. The customer network's 202 site networks 204 may be located in one geographic location, may be behind a common firewall, and/or may be multiple subnets within one network. Alternatively or additionally, a customer network's 202 site networks 204 may be located in different geographic locations, and be connected to each other over various private and public networks, including the Internet 250.

Different customer networks 202 may have different requirements regarding network security. For example, some customer networks 202 may have relatively open connections to outside networks such as the Internet 250, while other customer networks 202 have very restricted access to outside networks. The network security system described in FIG. 1 may be configurable to accommodate these variations.

Figure 2A:
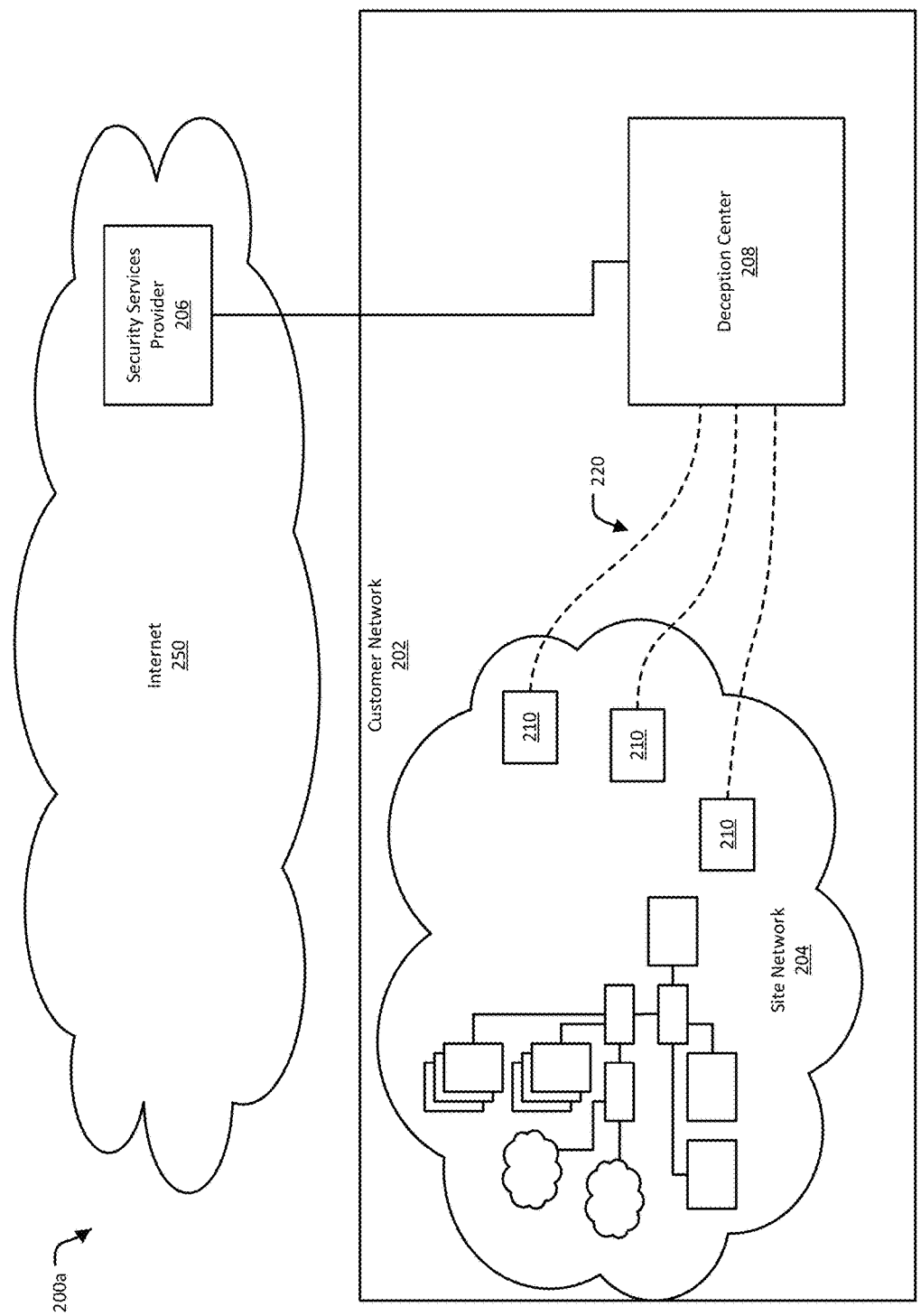
FIGS. 2A-2D provide examples of different installation configurations that can be used for different customer networks.

FIG. 2A illustrates one example of an installation configuration 200a, where a deception center 208 is located within the customer network 202. In this example, being located within the customer network 202 means that the deception center 208 is connected to the customer network 202, and is able to function as a node in the customer network 202. In this example, the deception center 208 may be located in the same building or within the same campus as the site network 204. Alternatively or additionally, the deception center 208 may be located within the customer network 202 but at a different geographic location than the site network 204. The deception center 208 thus may be within the same subnet as the site network 204, or may be connected to a different subnet within the customer network.

In various implementations, the deception center 208 communicates with sensors 210, which may also be referred to as deception sensors, installed in the site network over network tunnels 220 In this example, the network tunnels 220 may cross one or more intermediate within the customer network 202.

In this example, the deception center 208 is able to communicate with a security services provider 206 that is located outside the customer network 202, such as on the Internet 250. The security services provider 206 may provide configuration and other information for the deception center 208. In some cases, the security services provider 206 may also assist in coordinating the security for the customer network 202 when the customer network 202 includes multiple site networks 204 located in various geographic areas.

Figure 2B:
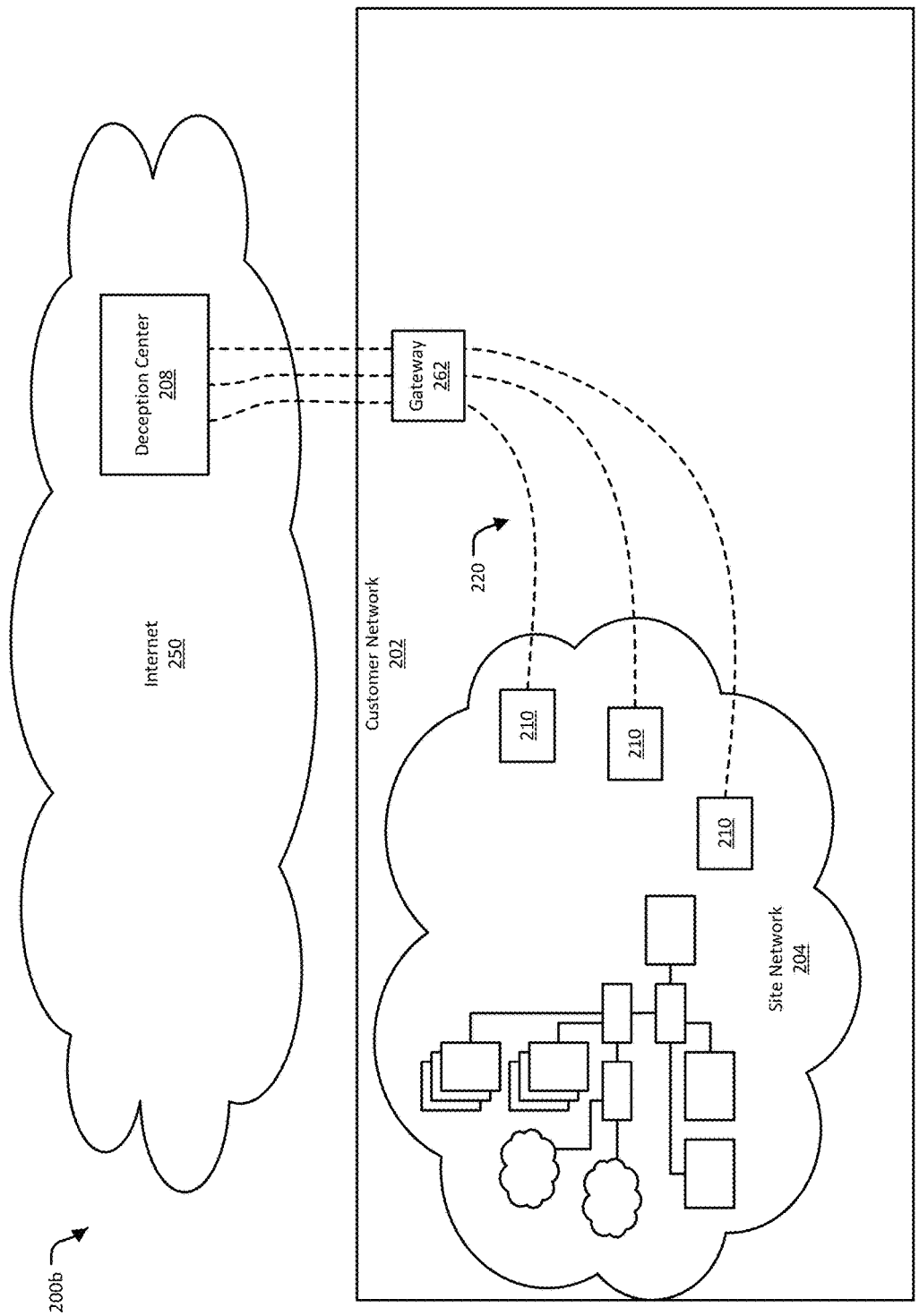

FIG. 2B illustrates another example of an installation configuration 200b, where the deception center 208 is located outside the customer network 202. In this example, the deception center 208 may connected to the customer network 202 over the Internet 250. In some implementations, the deception center 208 may be co-located with a security services provider, and/or may be provided by the security services provider.

In this example, the tunnels 220 connect the deception center 208 to the sensors 210 through a gateway 262. A gateway is a point in a network that connects the network to another network. For example, in this example, the gateway 262 connects the customer network 202 to outside networks, such as the Internet 250. The gateway 262 may provide a firewall, which may provide some security for the customer network 202. The tunnels 220 may be able to pass through the firewall using a secure protocol, such as Secure Socket Shell (SSH) and similar protocols. Secure protocols typically require credentials, which may be provided by the operator of the customer network 202.

Figure 2C:
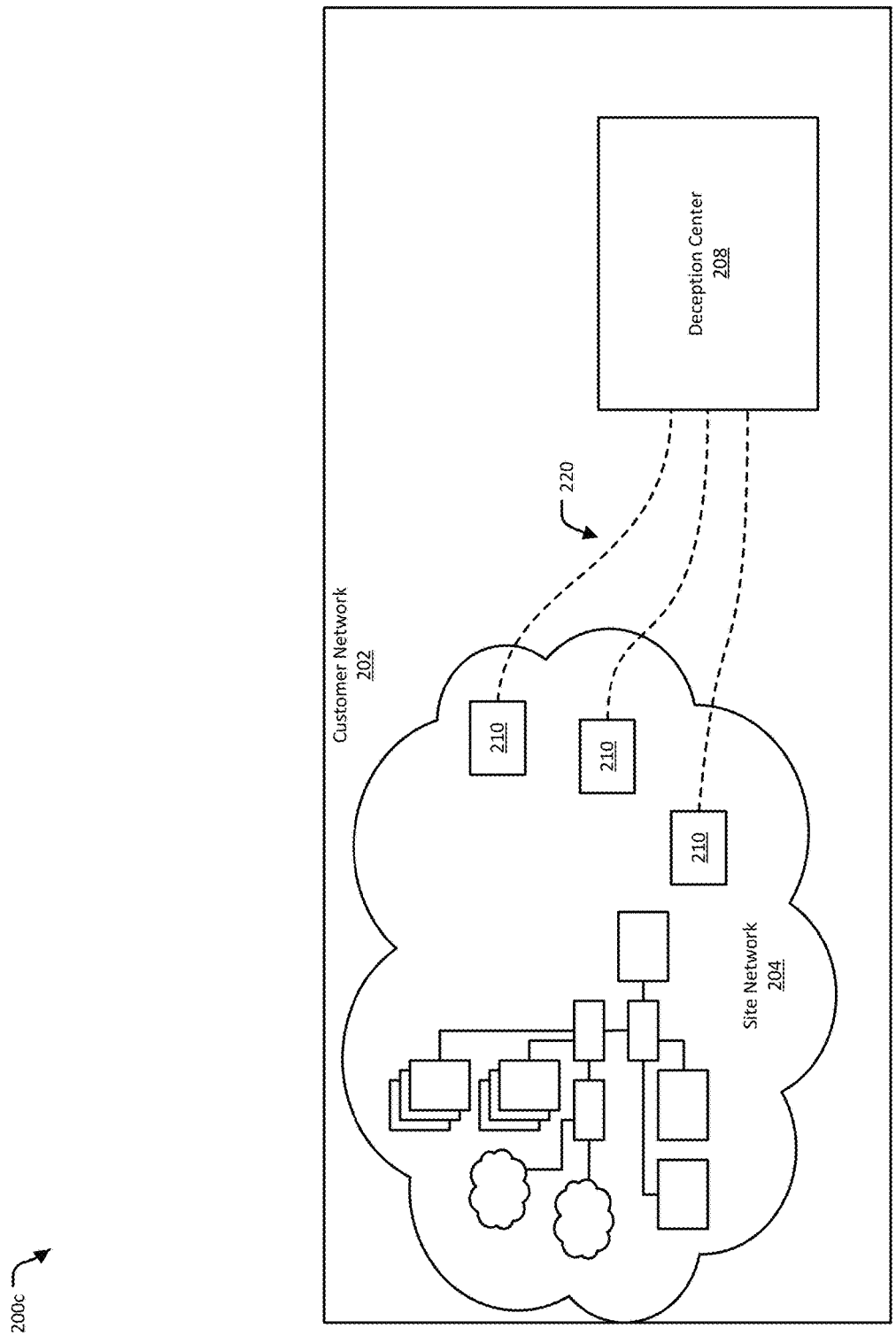

FIG. 2C illustrates another example of an installation configuration 200c, where the deception center 208 is located inside the customer network 202 but does not have access to outside networks. In some implementations, the customer network 202 may require a high level of network security. In these implementations, the customer network's 202 connections to the other networks may be very restricted. Thus, in this example, the deception center 208 is located within the customer network 202, and does not need to communicate with outside networks. The deception center 208 may use the customer networks 202 internal network to coordinate with and establish tunnels 220 to the sensors 210. Alternatively or additionally, a network administrator may configure the deception center 208 and sensors 210 to enable them to establish the tunnels 220.

Figure 2D:
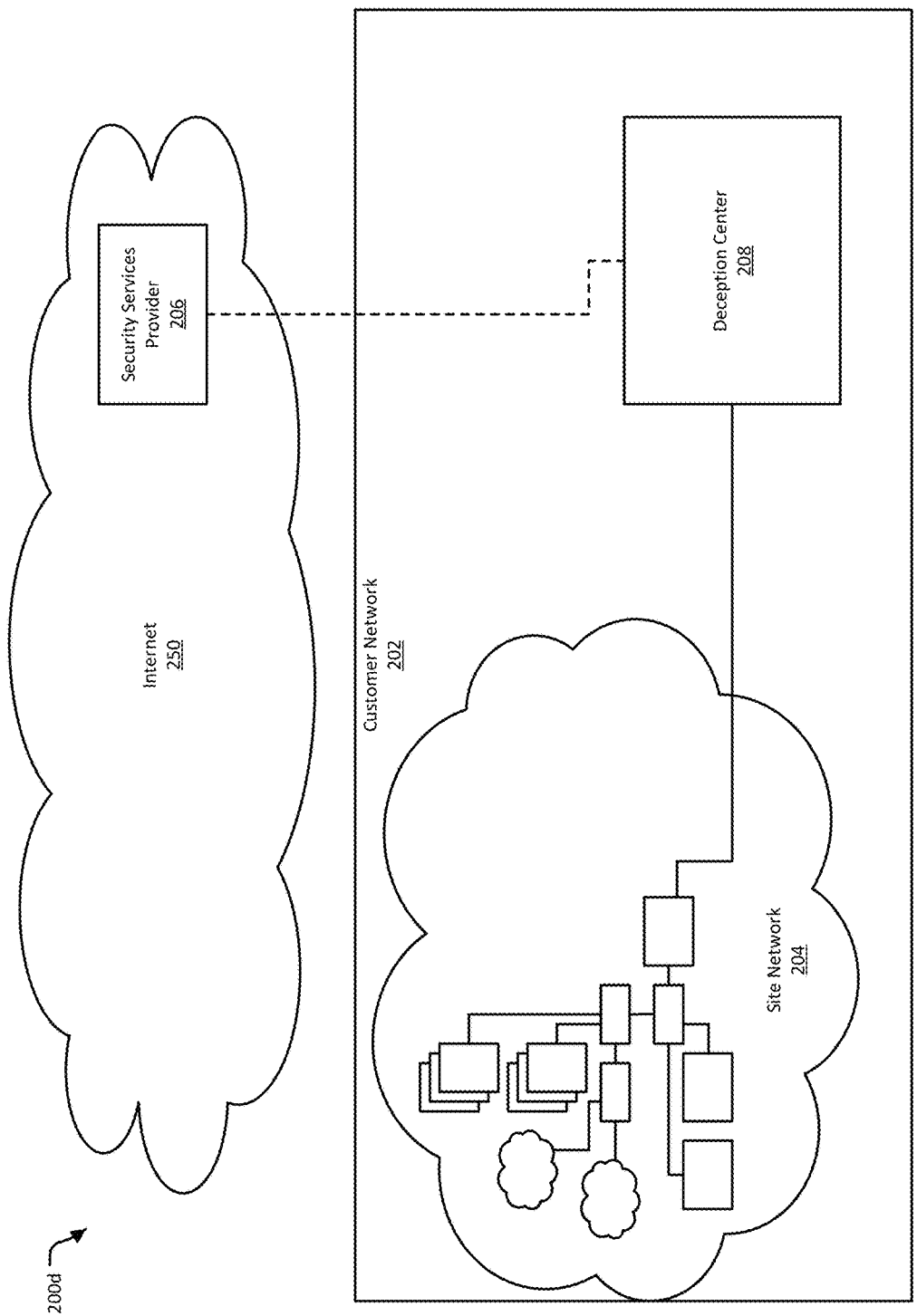

FIG. 2D illustrates another example of an installation configuration 200d. In this example, the deception center 208 is located inside the customer network 202, and further is directly connected to the site network 204. Directly connected, in this example, can mean that the deception center 208 is connected to a router, hub, switch, repeater, or other network infrastructure device that is part of the site network 204. Directly connected can alternatively or additionally mean that the deception center 208 is connected to the site network 204 using a Virtual Local Area Network (VLAN). For example, the deception center 208 can be connected to VLAN trunk port. In these examples, the deception center 208 can project deceptions into the site network 204 with or without the use of sensors, such as are illustrated in FIGS. 2A-2C.

In the example of FIG. 2D, the deception center 208 can also optionally be connected to an outside security services provider 206. The security services provider 206 can manage the deception center 208, including providing updated security data, sending firmware upgrades, and/or coordinating different deception centers 208 for different site networks 204 belonging to the same customer network 202. In some implementations, the deception center 208 can operate without the assistances of an outside security services provider 206.

Customer Networks

The network security system, such as the deception-based system discussed above, can be used for variety of customer networks. As noted above, customer networks can come in wide variety of configurations. For example, a customer network may have some of its network infrastructure "in the cloud." A customer network can also include a wide variety of devices, including what may be considered "traditional" network equipment, such as servers and routers, and non-traditional, "Internet-of-Things" devices, such as kitchen appliances. Other examples of customer networks include established industrial networks, or a mix of industrial networks and computer networks.

Figure 3A:
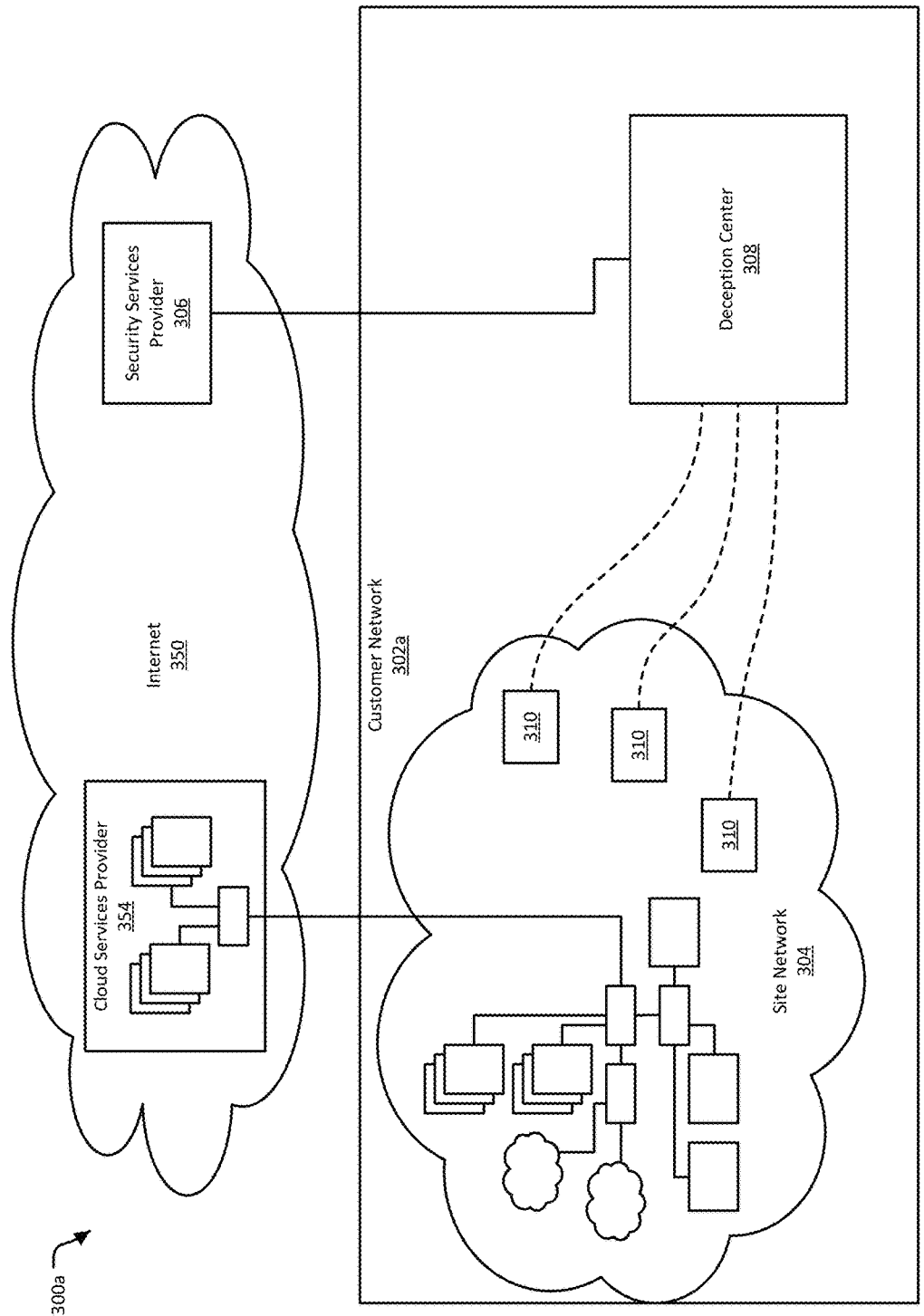
FIG. 3A-3B illustrate examples of customer networks where some of the customer networks' network infrastructure is "in the cloud," that is, is provided by a cloud services provider.
Figure 3B:
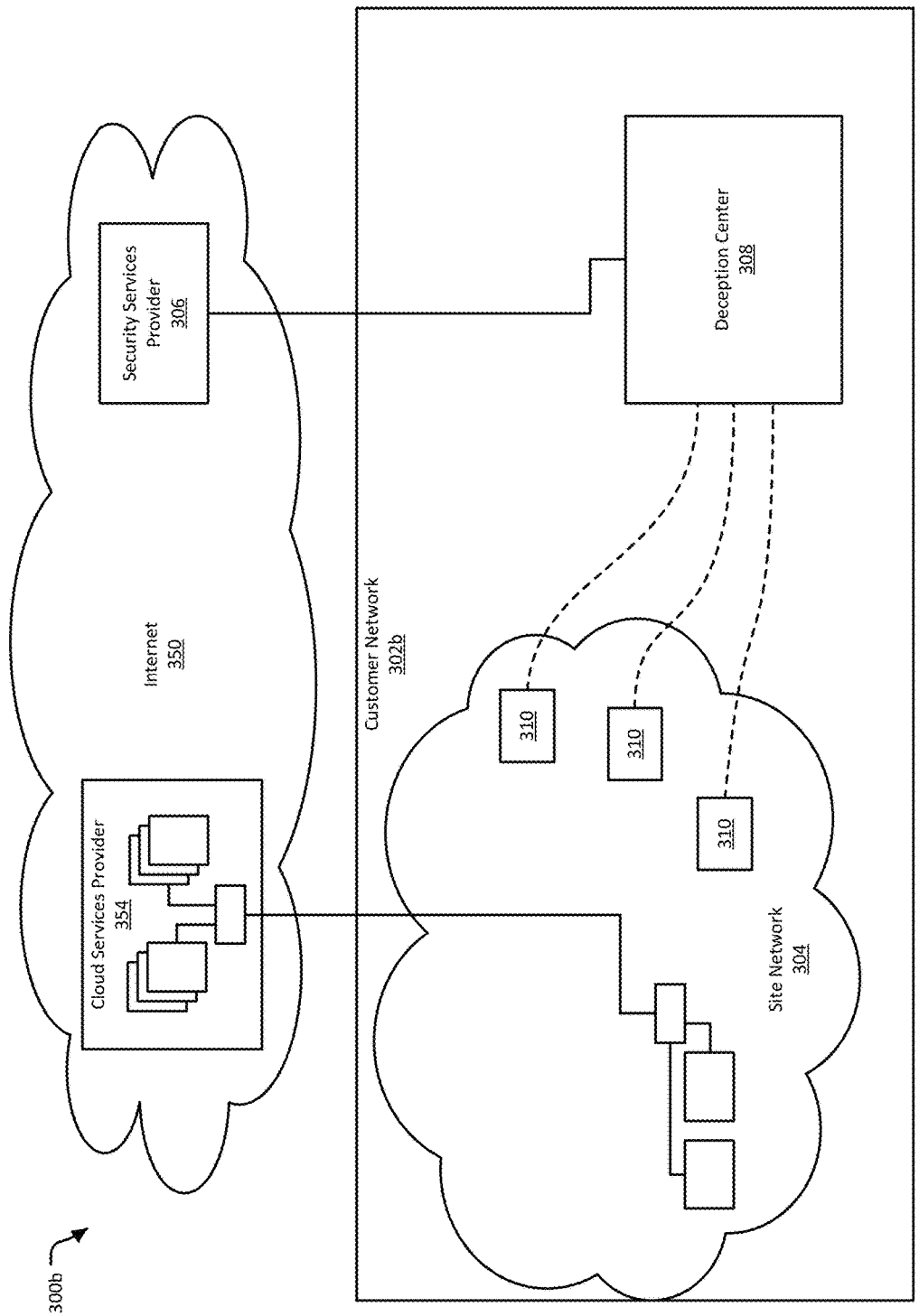

FIGS. 3A-3B illustrate examples of customer networks 302a-302b where some of the customer networks' 302a-302b network infrastructure is "in the cloud," that is, is provided by a cloud services provider 354. These example customer networks 302a-302b may be defended by a network security system that includes a deception center 308 and sensors 310, which may also be referred to as deception sensors, and may also include an off-site security services provider 306.

A cloud services provider is a company that offers some component of cloud computer—such as Infrastructure as a Service (IaaS), Software as a Service (SaaS) or Platform as Service (PaaS)—to other businesses and individuals. A cloud services provider may have a configurable pool of computing resources, including, for example, networks, servers, storage, applications, and services. These computing resources can be available on demand, and can be rapidly provisioned. While a cloud services provider's resources may be shared between the cloud service provider's customers, from the perspective of each customer, the individual customer may appear to have a private network within the cloud, including for example having dedicated subnets and IP addresses.

In the examples illustrated in FIGS. 3A-3B, the customer networks' 302a-302b network is partially in a site network 304, and partially provided by the cloud services provider 354. In some cases, the site network 304 is the part of the customer networks 302a-302b that is located at a physical site owned or controlled by the customer network 302a-302b. For example, the site network 304 may be a network located in the customer network's 302a-302b office or campus. Alternatively or additionally, the site network 304 may include network equipment owned and/or operated by the customer network 302a-302b that may be located anywhere. For example, the customer networks' 302a-302b operations may consist of a few laptops owned by the customer networks 302a-302b, which are used from the private homes of the lap tops' users, from a co-working space, from a coffee shop, or from some other mobile location.

In various implementations, sensors 310 may be installed in the site network 304. The sensors 310 can be used by the network security system to project deceptions into the site network 304, monitor the site network 304 for attacks, and/or to divert suspect attacks into the deception center 308.

In some implementations, the sensors 310 may also be able to project deceptions into the part of the customer networks 302a-302b network that is provided by the cloud services provider 354. In most cases, it may not be possible to install sensors 310 inside the network of the cloud services provider 354, but in some implementations, this may not be necessary. For example, as discussed further below, the deception center 308 can acquire the subnet address of the network provided by the cloud services provider 354, and use that subnet address the create deceptions. Though these deceptions are projected form the sensors 310 installed in the site network 304, the deceptions may appear to be within the subnet provided by the cloud services provider 354.

In illustrated examples, the deception center 308 is installed inside the customer networks 302a-302b. Though not illustrated here, the deception center 308 can also be installed outside the customer networks 302a-302b, such as for example somewhere on the Internet 350. In some implementations, the deception center 308 may reside at the same location as the security service provider 306. When located outside the customer networks 302a-302b, the deception center 308 may connect to the sensors 310 in the site network 304 over various public and/or private networks.

FIG. 3A illustrates an example of a configuration 300a where the customer network's 302a network infrastructure is located in the cloud and the customer network 302a also has a substantial site network 304. In this example, the customer may have an office where the site network 304 is located, and where the customer's employees access and use the customer network 302a. For example, developers, sales and marketing personnel, human resources and finance employees, may access the customer network 302a from the site network 304. In the illustrated example, the customer may obtain applications and services from the cloud services provider 354. Alternatively or additionally, the cloud services provider 354 may provide data center services for the customer. For example, the cloud services provider 354 may host the customer's repository of data (e.g., music provided by a streaming music service, or video provided by a streaming video provider). In this example, the customer's own customers may be provided data directly from the cloud services provider 354, rather than from the customer network 302a.

FIG. 3B illustrates and example of a configuration 300b where the customer network's 302b network is primarily or sometimes entirely in the cloud. In this example, the customer network's 302b site network 304 may include a few laptops, or one or two desktop servers. These computing devices may be used by the customer's employees to conduct the customer's business, while the cloud services provider 354 provides the majority of the network infrastructure needed by the customer. For example, a very small company may have no office space and no dedicated location, and have as computing resources only the laptops used by its employees. This small company may use the cloud services provider 354 to provide its fixed network infrastructure. The small company may access this network infrastructure by connecting a laptop to any available network connection (e.g. in a co-working space, library, or coffee shop). When no laptops are connected to the cloud services provider 354, the customer network 302b may be existing entirely within the cloud.

In the example provided above, the site network 304 can be found wherever the customer's employees connect to a network and can access the cloud services provider 354. Similarly, the sensors 310 can be co-located with the employees' laptops. For example, whenever an employee connects to a network, she can enable a sensor 310, which can then project deceptions into the network around her. Alternatively or additionally, sensors 310 can be installed in a fixed location (such as the home of an employee of the customer) from which they can access the cloud services provider 354 and project deceptions into the network provided by the cloud services provider 354.

Figure 4:
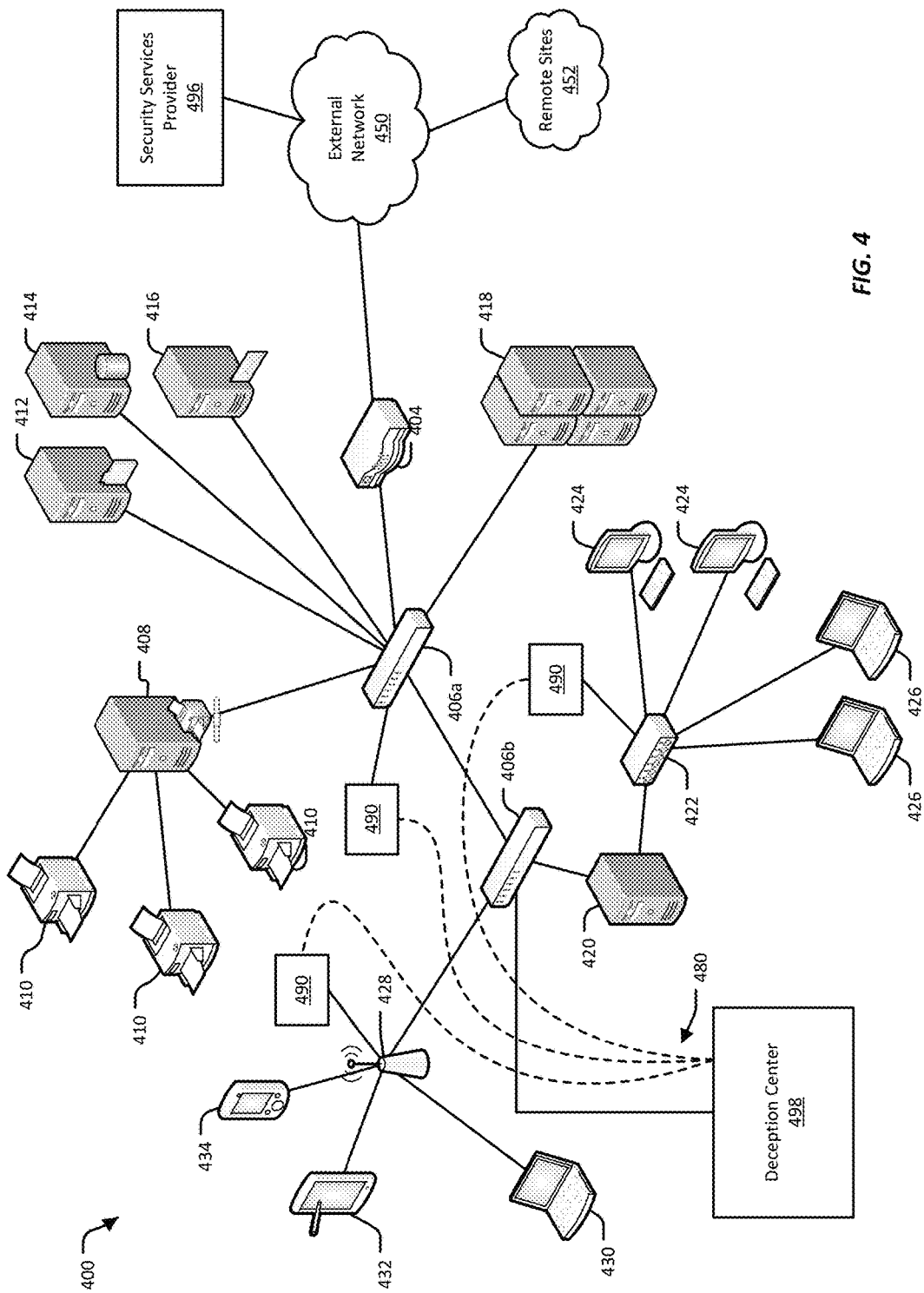
FIG. 4 illustrates an example of an enterprise network.

The network security system, such as the deception-based system discussed above, can provide network security for a variety of customer networks, which may include a diverse array of devices. FIG. 4 illustrates an example of an enterprise network 400, which is one such network that can be defended by a network security system. The example enterprise network 400 illustrates examples of various network devices and network clients that may be included in an enterprise network. The enterprise network 400 may include more or fewer network devices and/or network clients, and/or may include network devices, additional networks including remote sites 452, and/or systems not illustrated here. Enterprise networks may include networks installed at a large site, such as a corporate office, a university campus, a hospital, a government office, or a similar entity. An enterprise network may include multiple physical sites. Access to an enterprise networks is typically restricted, and may require authorized users to enter a password or otherwise authenticate before using the network. A network such as illustrated by the example enterprise network 400 may also be found at small sites, such as in a small business.

The enterprise network 400 may be connected to an external network 450. The external network 450 may be a public network, such as the Internet. A public network is a network that has been made accessible to any device that can connect to it. A public network may have unrestricted access, meaning that, for example, no password or other authentication is required to connect to it. The external network 450 may include third-party telecommunication lines, such as phone lines, broadcast coaxial cable, fiber optic cables, satellite communications, cellular communications, and the like. The external network 450 may include any number of intermediate network devices, such as switches, routers, gateways, servers, and/or controllers that are not directly part of the enterprise network 400 but that facilitate communication between the network 400 and other network-connected entities, such as a remote site 452.

Remote sites 452 are networks and/or individual computers that are generally located outside the enterprise network 400, and which may be connected to the enterprise network 400 through intermediate networks, but that function as if within the enterprise network 400 and connected directly to it. For example, an employee may connect to the enterprise network 400 while at home, using various secure protocols, and/or by connecting to a Virtual Private Network (VPN) provided by the enterprise network 400. While the employee's computer is connected, the employee's home is a remote site 452. Alternatively or additionally, the enterprise network's 400 owner may have a satellite office with a small internal network. This satellite office's network may have a fixed connection to the enterprise network 400 over various intermediate networks. This satellite office can also be considered a remote site.

The enterprise network 400 may be connected to the external network 450 using a gateway device 404. The gateway device 404 may include a firewall or similar system for preventing unauthorized access while allowing authorized access to the enterprise network 400. Examples of gateway devices include routers, modems (e.g. cable, fiber optic, dial-up, etc.), and the like.

The gateway device 404 may be connected to a switch 406a. The switch 406a provides connectivity between various devices in the enterprise network 400. In this example, the switch 406a connects together the gateway device 404, various servers 408, 412, 414, 416, 418, an another switch 406b. A switch typically has multiple ports, and functions to direct packets received on one port to another port. In some implementations, the gateway device 404 and the switch 406a may be combined into a single device.

Various servers may be connected to the switch 406a. For example, a print server 408 may be connected to the switch 406a. The print server 408 may provide network access to a number of printers 410. Client devices connected to the enterprise network 400 may be able to access one of the printers 410 through the printer server 408.

Other examples of servers connected to the switch 406a include a file server 412, database server 414, and email server 416. The file server 412 may provide storage for and access to data. This data may be accessible to client devices connected to the enterprise network 400. The database server 414 may store one or more databases, and provide services for accessing the databases. The email server 416 may host an email program or service, and may also store email for users on the enterprise network 400.

As yet another example, a server rack 418 may be connected to the switch 406a. The server rack 418 may house one or more rack-mounted servers. The server rack 418 may have one connection to the switch 406a, or may have multiple connections to the switch 406a. The servers in the server rack 418 may have various purposes, including providing computing resources, file storage, database storage and access, and email, among others.

An additional switch 406b may also be connected to the first switch 406a. The additional switch 406b may be provided to expand the capacity of the network. A switch typically has a limited number of ports (e.g., 8, 16, 32, 64 or more ports). In most cases, however, a switch can direct traffic to and from another switch, so that by connecting the additional switch 406b to the first switch 406a, the number of available ports can be expanded.

In this example, a server 420 is connected to the additional switch 406b. The server 420 may manage network access for a number of network devices or client devices. For example, the server 420 may provide network authentication, arbitration, prioritization, load balancing, and other management services as needed to manage multiple network devices accessing the enterprise network 400. The server 420 may be connected to a hub 422. The hub 422 may include multiple ports, each of which may provide a wired connection for a network or client device. A hub is typically a simpler device than a switch, and may be used when connecting a small number of network devices together. In some cases, a switch can be substituted for the hub 422. In this example, the hub 422 connects desktop computers 424 and laptop computers 426 to the enterprise network 400. In this example, each of the desktop computers 424 and laptop computers 426 are connected to the hub 422 using a physical cable.

In this example, the additional switch 406b is also connected to a wireless access point 428. The wireless access point 428 provides wireless access to the enterprise network 400 for wireless-enabled network or client devices. Examples of wireless-enabled network and client devices include laptops 430, tablet computers 432, and smart phones 434, among others. In some implementations, the wireless access point 428 may also provide switching and/or routing functionality.

The example enterprise network 400 of FIG. 4 is defended from network threats by a network threat detection and analysis system, which uses deception security mechanisms to attract and divert attacks on the network. The deceptive security mechanisms may be controlled by and inserted into the enterprise network 400 using a deception center 498 and sensors 490, which may also be referred to as deception sensors, installed in various places in the enterprise network 400. In some implementations, the deception center 498 and the sensors 490 interact with a security services provider 496 located outside of the enterprise network 400. The deception center 498 may also obtain or exchange data with sources located on external networks 450, such as the Internet.

In various implementations, the sensors 490 are a minimal combination of hardware and/or software, sufficient to form a network connection with the enterprise network 400 and a network tunnel 480 with the deception center 498. For example, a sensor 490 may be constructed using a low-power processor, a network interface, and a simple operating system. In some implementations, any of the devices in the enterprise network (e.g., the servers 408, 412, 416, 418 the printers 410, the computing devices 424, 426, 430, 432, 434, or the network infrastructure devices 404, 406a, 406b, 428) can be configured to act as a sensor.

In various implementations, one or more sensors 490 can be installed anywhere in the enterprise network 400, include being attached switches 406a, hubs 422, wireless access points 428, and so on. The sensors 490 can further be configured to be part of one or more VLANs. The sensors 490 provide the deception center 498 with visibility into the enterprise network 400, such as for example being able to operate as a node in the enterprise network 400, and/or being able to present or project deceptive security mechanisms into the enterprise network 400. Additionally, in various implementations, the sensors 490 may provide a portal through which a suspected attack on the enterprise network 400 can be redirected to the deception center 498.

The deception center 498 provides network security for the enterprise network 400 by deploying security mechanisms into the enterprise network 400, monitoring the enterprise network 400 through the security mechanisms, detecting and redirecting apparent threats, and analyzing network activity resulting from the apparent threat. To provide security for the enterprise network 400, in various implementations the deception center 498 may communicate with sensors 490 installed in the enterprise network 400, using, for example, network tunnels 480. The tunnels 480 may allow the deception center 498 to be located in a different sub-network ("subnet") than the enterprise network 400, on a different network, or remote from the enterprise network 400, with intermediate networks between the deception center 498 and the enterprise network 400. In some implementations, the enterprise network 400 can include more than one deception center 498. In some implementations, the deception center may be located off-site, such as in an external network 450.

In some implementations, the security services provider 496 may act as a central hub for providing security to multiple site networks, possibly including site networks controlled by different organizations. For example, the security services provider 496 may communicate with multiple deception centers 498 that each provide security for a different enterprise network 400 for the same organization. As another example, the security services provider 496 may coordinate the activities of the deception center 498 and the sensors 490, such as enabling the deception center 498 and the sensors 490 to connect to each other. In some implementations, the security services provider 496 is located outside the enterprise network 400. In some implementations, the security services provider 496 is controlled by a different entity than the entity that controls the site network. For example, the security services provider 496 may be an outside vendor. In some implementations, the security services provider 496 is controlled by the same entity as that controls the enterprise network 400. In some implementations, the network security system does not include a security services provider 496.

FIG. 4 illustrates one example of what can be considered a "traditional" network, that is, a network that is based on the interconnection of computers. In various implementations, a network security system, such as the deception-based system discussed above, can also be used to defend "non-traditional" networks that include devices other than traditional computers, such as for example mechanical, electrical, or electromechanical devices, sensors, actuators, and control systems. Such "non-traditional" networks may be referred to as the Internet of Things (IoT). The Internet of Things encompasses newly-developed, every-day devices designed to be networked (e.g., drones, self-driving automobiles, etc.) as well as common and long-established machinery that has augmented to be connected to a network (e.g., home appliances, traffic signals, etc.).

Figure 5:
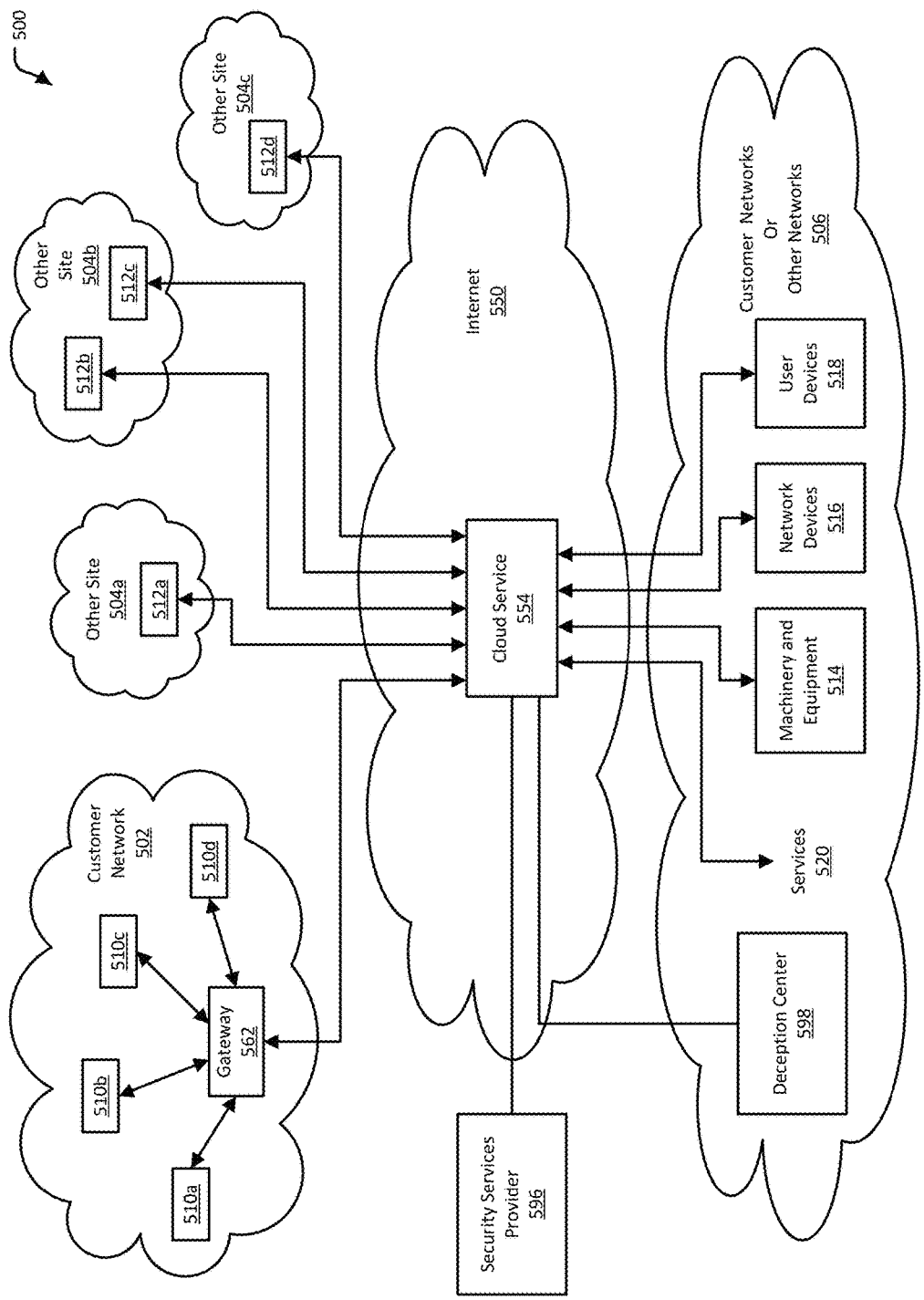
FIG. 5 illustrates a general example of an Internet-of-Things network.

FIG. 5 illustrates a general example of an IoT network 500. The example IoT network 500 can be implemented wherever sensors, actuators, and control systems can be found. For example, the example IoT network 500 can be implemented for buildings, roads and bridges, agriculture, transportation and logistics, utilities, air traffic control, factories, and private homes, among others. In various implementations, the IoT network 500 includes cloud service 554 that collects data from various sensors 510a-510d, 512a-512d, located in various locations. Using the collected data, the cloud service 554 can provide services 520, control of machinery and equipment 514, exchange of data with traditional network devices 516, and/or exchange of data with user devices 518. In some implementations, the cloud service 554 can work with a deception center 598 and/or a security service provider 596 to provide security for the network 500.

A cloud service, such as the illustrated cloud service 554, is a resource provided over the Internet 550. Sometimes synonymous with "cloud computing," the resource provided by the cloud services is in the "cloud" in that the resource is provided by hardware and/or software at some location remote from the place where the resource is used. Often, the hardware and software of the cloud service is distributed across multiple physical locations. Generally, the resource provided by the cloud service is not directly associated with specific hardware or software resources, such that use of the resource can continue when the hardware or software is changed. The resource provided by the cloud service can often also be shared between multiple users of the cloud service, without affecting each user's use. The resource can often also be provided as needed or on-demand. Often, the resource provided by the cloud service 554 is automated, or otherwise capable of operating with little or no assistance from human operators.

Examples of cloud services include software as a service (SaaS), infrastructure as a service (IaaS), platform as a service (PaaS), desktop as a service (DaaS), managed software as a service (MSaaS), mobile backend as a service (MBaaS), and information technology management as a service (ITMaas). Specific examples of cloud services include data centers, such as those operated by Amazon Web Services and Google Web Services, among others, that provide general networking and software services. Other examples of cloud services include those associated with smartphone applications, or "apps," such as for example apps that track fitness and health, apps that allow a user to remotely manage her home security system or thermostat, and networked gaming apps, among others. In each of these examples, the company that provides the app may also provide cloud-based storage of application data, cloud-based software and computing resources, and/or networking services. In some cases, the company manages the cloud services provided by the company, including managing physical hardware resources. In other cases, the company leases networking time from a data center provider.

In some cases, the cloud service 554 is part of one integrated system, run by one entity. For example, the cloud service 554 can be part of a traffic control system. In this example, sensors 510a-510d, 512a-512d can be used to monitor traffic and road conditions. In this example, the cloud service 554 can attempt to optimize the flow of traffic and also provide traffic safety. For example, the sensors 510a-510d, 512a-512d can include a sensor 512a on a bridge that monitors ice formation. When the sensor 512a detects that ice has formed on the bridge, the sensor 512a can alert the cloud service 554. The cloud service 554, can respond by interacting with machinery and equipment 514 that manages traffic in the area of the bridge. For example, the cloud service 554 can turn on warning signs, indicating to drivers that the bridge is icy. Generally, the interaction between the sensor 512a, the cloud service 554, and the machinery and equipment 514 is automated, requiring little or no management by human operators.

In various implementations, the cloud service 554 collects or receives data from sensors 510a-510d, 512a-512d, distributed across one or more networks. The sensors 510a-510d, 512a-512d include devices capable of "sensing" information, such as air or water temperature, air pressure, weight, motion, humidity, fluid levels, noise levels, and so on. The sensors 510a-510d, 512a-512d can alternatively or additionally include devices capable of receiving input, such as cameras, microphones, touch pads, keyboards, key pads, and so on. In some cases, a group of sensors 510a-510d may be common to one customer network 502. For example, the sensors 510a-510d may be motion sensors, traffic cameras, temperature sensors, and other sensors for monitoring traffic in a city's metro area. In this example, the sensors 510a-510d can be located in one area of the city, or be distribute across the city, and be connected to a common network. In these cases, the sensors 510a-510d can communicate with a gateway device 562, such as a network gateway. The gateway device 562 can further communicate with the cloud service 554.

In some cases, in addition to receiving data from sensors 510a-510d in one customer network 502, the cloud service 554 can also receive data from sensors 512a-512d in other sites 504a-504c. These other sites 504a-504c can be part of the same customer network 502 or can be unrelated to the customer network 502. For example, the other sites 504a-504c can each be the metro area of a different city, and the sensors 512a-512d can be monitoring traffic for each individual city.

Generally, communication between the cloud service 554 and the sensors 510a-510d, 512a-512d is bidirectional. For example, the sensors 510a-510d, 512a-512d can send information to the cloud service 554. The cloud service 554 can further provide configuration and control information to the sensors 510a-510d, 512a-512d. For example, the cloud service 554 can enable or disable a sensor 510a-510d, 512a-512d or modify the operation of a sensor 510a-510d, 512a-512d, such as changing the format of the data provided by a sensor 510a-510d, 512a-512d or upgrading the firmware of a sensor 510a-510d, 512a-512d.

In various implementations, the cloud service 554 can operate on the data received from the sensors 510a-510d, 512a-512d, and use this data to interact with services 520 provided by the cloud service 554, or to interact with machinery and equipment 514, network devices 516, and/or user devices 518 available to the cloud service 554. Services 520 can include software-based services, such as cloud-based applications, website services, or data management services. Services 520 can alternatively or additionally include media, such as streaming video or music or other entertainment services. Services 520 can also include delivery and/or coordination of physical assets, such as for example package delivery, direction of vehicles for passenger pick-up and drop-off, or automate re-ordering and re-stocking of supplies. In various implementations, services 520 may be delivered to and used by the machinery and equipment 514, the network devices 516, and/or the user devices 518.

In various implementations, the machinery and equipment 514 can include physical systems that can be controlled by the cloud service 554. Examples of machinery and equipment 514 include factory equipment, trains, electrical street cars, self-driving cars, traffic lights, gate and door locks, and so on. In various implementations, the cloud service 554 can provide configuration and control of the machinery and equipment 514 in an automated fashion.

The network devices 516 can include traditional networking equipment, such as server computers, data storage devices, routers, switches, gateways, and so on. In various implementations, the cloud service 554 can provide control and management of the network devices 516, such as for example automated upgrading of software, security monitoring, or asset tracking. Alternatively or additionally, in various implementations the cloud service 554 can exchange data with the network devices 516, such as for example providing websites, providing stock trading data, or providing online shopping resources, among others. Alternatively or additionally, the network devices 516 can include computing systems used by the cloud service provider to manage the cloud service 554.

The user devices 518 can include individual personal computers, smart phones, tablet devices, smart watches, fitness trackers, medical devices, and so on that can be associated with an individual user. The cloud service 554 can exchange data with the user devices 518, such as for example provide support for applications installed on the user devices 518, providing websites, providing streaming media, providing directional navigation services, and so on. Alternatively or additionally, the cloud service 554 may enable a user to use a user device 518 to access and/or view other devices, such as the sensors 510a-510d, 512a-512d, the machinery and equipment 514, or the network devices 516.

In various implementations, the services 520, machinery and equipment 514, network devices 516, and user devices 518 may be part of one customer network 506. In some cases, this customer network 506 is the same as the customer network 502 that includes the sensors 510a-510d. In some cases, the services 520, machinery and equipment 514, network devices 516, and user devices 518 are part of the same network, and may instead be part of various other networks 506.

In various implementations, customer networks can include a deception center 598. The deception center 598 provides network security for the IoT network 500 by deploying security mechanisms into the IoT network 500, monitoring the IoT network 500 through the security mechanisms, detecting and redirecting apparent threats, and analyzing network activity resulting from the apparent threat. To provide security for the IoT network 500, in various implementations the deception center 598 may communicate with the sensors 510a-5106d, 512a-512d installed in the IoT network 500, for example through the cloud service 554. In some implementations, the IoT network 500 can include more than one deception center 598. For example, each of customer network 502 and customer networks or other networks 506 can include a deception center 598.

In some implementations, the deception center 598 and the sensors 510a-510d, 512a-512d interact with a security services provider 596. In some implementations, the security services provider 596 may act as a central hub for providing security to multiple site networks, possibly including site networks controlled by different organizations. For example, the security services provider 596 may communicate with multiple deception centers 598 that each provide security for a different IoT network 500 for the same organization. As another example, the security services provider 596 may coordinate the activities of the deception center 598 and the sensors 510a-510d, 512a-512d, such as enabling the deception center 598 and the sensors 510a-510d, 512a-512d to connect to each other. In some implementations, the security services provider 596 is integrated into the cloud service 554. In some implementations, the security services provider 596 is controlled by a different entity than the entity that controls the site network. For example, the security services provider 596 may be an outside vendor. In some implementations, the security services provider 596 is controlled by the same entity as that controls the IoT network 500. In some implementations, the network security system does not include a security services provider 596.

Figure 6:
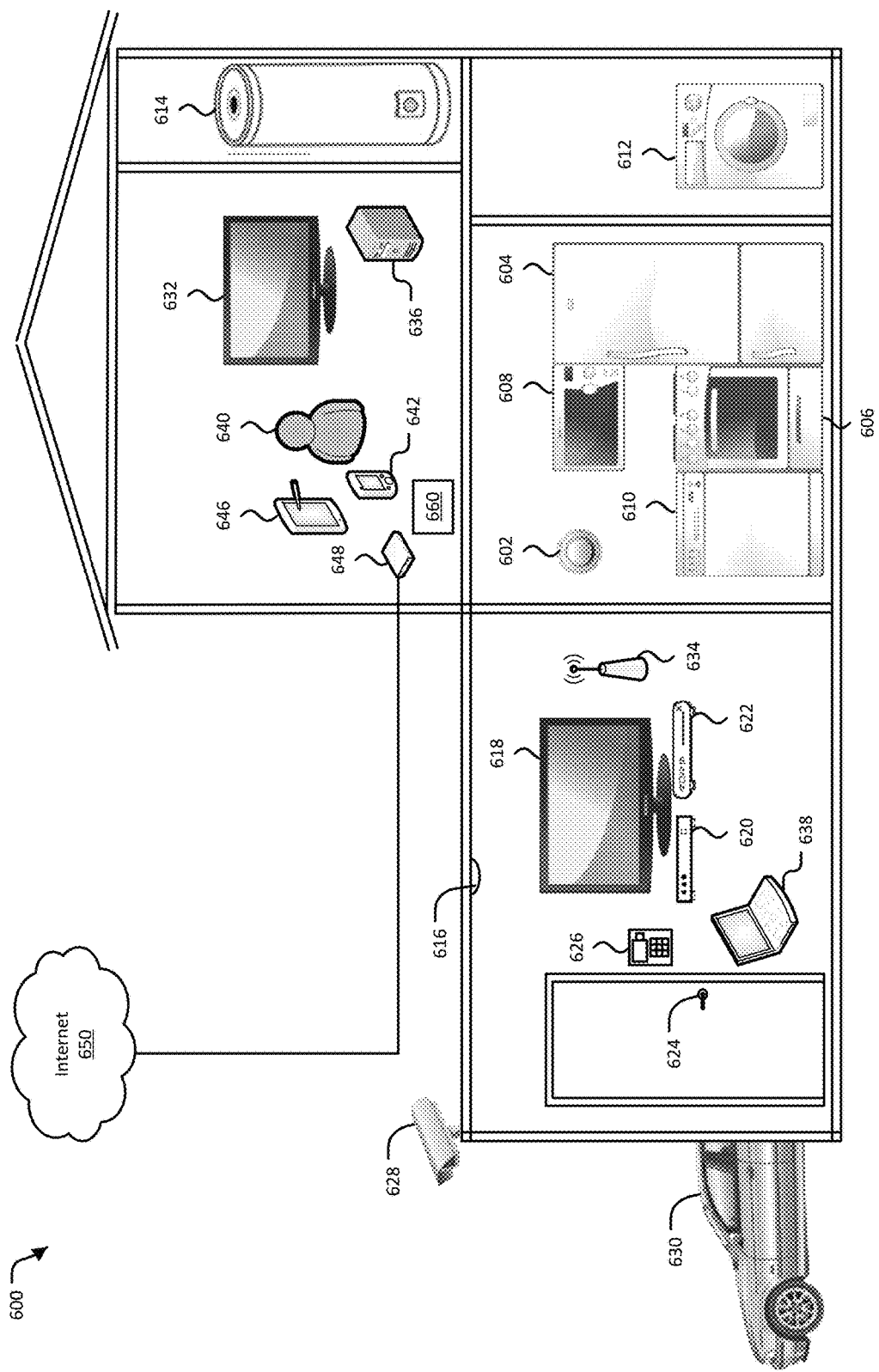
FIG. 6 illustrates an example of an Internet-of-Things network, here implemented in a private home.

IoT networks can also include small networks of non-traditional devices. FIG. 6 illustrates an example of a customer network that is a small network 600, here implemented in a private home. A network for a home is an example of small network that may have both traditional and non-traditional network devices connected to the network 600, in keeping with an Internet of Things approach. Home networks are also an example of networks that are often implemented with minimal security. The average homeowner is not likely to be a sophisticated network security expert, and may rely on his modem or router to provide at least some basic security. The homeowner, however, is likely able to at least set up a basic home network. A deception-based network security device may be as simple to set up as a home router or base station, yet provide sophisticated security for the network 600.

The example network 600 of FIG. 6 may be a single network, or may include multiple sub-networks. These sub-networks may or may not communicate with each other. For example, the network 600 may include a sub-network that uses the electrical wiring in the house as a communication channel. Devices configured to communicate in this way may connect to the network using electrical outlets, which also provide the devices with power. The sub-network may include a central controller device, which may coordinate the activities of devices connected to the electrical network, including turning devices on and off at particular times. One example of a protocol that uses the electrical wiring as a communication network is X10.

The network 600 may also include wireless and wired networks, built into the home or added to the home solely for providing a communication medium for devices in the house. Examples of wireless, radio-based networks include networks using protocols such as Z-Wave™, Zigbee™ (also known as Institute of Electrical and Electronics Engineers (IEEE) 802.15.4), Bluetooth™, and Wi-Fi (also known as IEEE 802.11), among others. Wireless networks can be set up by installing a wireless base station in the house. Alternatively or additionally, a wireless network can be established by having at least two devices in the house that are able to communicate with each other using the same protocol.

Examples of wired networks include Ethernet (also known as IEEE 802.3), token ring (also known as IEEE 802.5), Fiber Distributed Data Interface (FDDI), and Attached Resource Computer Network (ARCNET), among others. A wired network can be added to the house by running cabling through the walls, ceilings, and/or floors, and placing jacks in various rooms that devices can connect to with additional cables. The wired network can be extended using routers, switches, and/or hubs. In many cases, wired networks may be interconnected with wireless networks, with the interconnected networks operating as one seamless network. For example, an Ethernet network may include a wireless base station that provides a Wi-Fi signal for devices in the house.

As noted above, a small network 600 implemented in a home is one that may include both traditional network devices and non-traditional, everyday electronics and appliances that have also been connected to the network 600. Examples of rooms where one may find non-traditional devices connected to the network are the kitchen and laundry rooms. For example, in the kitchen a refrigerator 604, oven 606, microwave 608, and dishwasher 610 may be connected to the network 600, and in the laundry room a washing machine 612 may be connected to the network 600. By attaching these appliances to the network 600, the homeowner can monitor the activity of each device (e.g., whether the dishes are clean, the current state of a turkey in the oven, or the washing machine cycle) or change the operation of each device without needing to be in the same room or even be at home. The appliances can also be configured to resupply themselves. For example, the refrigerator 604 may detect that a certain product is running low, and may place an order with a grocery delivery service for the product to be restocked.

The network 600 may also include environmental appliances, such as a thermostat 602 and a water heater 614. By having these devices connected to the network 600, the homeowner can monitor the current environment of the house (e.g., the air temperature or the hot water temperature), and adjust the settings of these appliances while at home or away. Furthermore, software on the network 600 or on the Internet 650 may track energy usage for the heating and cooling units and the water heater 614. This software may also track energy usage for the other devices, such as the kitchen and laundry room appliances. The energy usage of each appliance may be available to the homeowner over the network 600.

In the living room, various home electronics may be on the network 600. These electronics may have once been fully analog or may have been standalone devices, but now include a network connection for exchanging data with other devices in the network 600 or with the Internet 650. The home electronics in this example include a television 618, a gaming system 620, and a media device 622 (e.g., a video and/or audio player). Each of these devices may play media hosted, for example, on network attached storage 636 located elsewhere in the network 600, or media hosted on the Internet 650.

The network 600 may also include home safety and security devices, such as a smoke detector 616, an electronic door lock 624, and a home security system 626. Having these devices on the network may allow the homeowner to track the information monitored and/or sensed by these devices, both when the homeowner is at home and away from the house. For example, the homeowner may be able to view a video feed from a security camera 628. When the safety and security devices detect a problem, they may also inform the homeowner. For example, the smoke detector 616 may send an alert to the homeowner's smartphone when it detects smoke, or the electronic door lock 624 may alert the homeowner when there has been a forced entry. Furthermore, the homeowner may be able to remotely control these devices. For example, the homeowner may be able to remotely open the electronic door lock 624 for a family member who has been locked out. The safety and security devices may also use their connection to the network to call the fire department or police if necessary.

Another non-traditional device that may be found in the network 600 is the family car 630. The car 630 is one of many devices, such as laptop computers 638, tablet computers 646, and smartphones 642, that connect to the network 600 when at home, and when not at home, may be able to connect to the network 600 over the Internet 650. Connecting to the network 600 over the Internet 650 may provide the homeowner with remote access to his network. The network 600 may be able to provide information to the car 630 and receive information from the car 630 while the car is away. For example, the network 600 may be able to track the location of the car 630 while the car 630 is away.

In the home office and elsewhere around the house, this example network 600 includes some traditional devices connected to the network 600. For example, the home office may include a desktop computer 632 and network attached storage 636. Elsewhere around the house, this example includes a laptop computer 638 and handheld devices such as a tablet computer 646 and a smartphone 642. In this example, a person 640 is also connected to the network 600. The person 640 may be connected to the network 600 wirelessly through personal devices worn by the person 640, such as a smart watch, fitness tracker, or heart rate monitor. The person 640 may alternatively or additionally be connected to the network 600 through a network-enabled medical device, such as a pacemaker, heart monitor, or drug delivery system, which may be worn or implanted.

The desktop computer 632, laptop computer 638, tablet computer 646, and/or smartphone 642 may provide an interface that allows the homeowner to monitor and control the various devices connected to the network. Some of these devices, such as the laptop computer 638, the tablet computer 646, and the smartphone 642 may also leave the house, and provide remote access to the network 600 over the Internet 650. In many cases, however, each device on the network may have its own software for monitoring and controlling only that one device. For example, the thermostat 602 may use one application while the media device 622 uses another, and the wireless network provides yet another. Furthermore, it may be the case that the various sub-networks in the house do not communicate with each other, and/or are viewed and controlled using software that is unique to each sub-network. In many cases, the homeowner may not have one unified and easily understood view of his entire home network 600.

The small network 600 in this example may also include network infrastructure devices, such as a router or switch (not shown) and a wireless base station 634. The wireless base station 634 may provide a wireless network for the house. The router or switch may provide a wired network for the house. The wireless base station 634 may be connected to the router or switch to provide a wireless network that is an extension of the wired network. The router or switch may be connected to a gateway device 648 that connects the network 600 to other networks, including the Internet 650. In some cases, a router or switch may be integrated into the gateway device 648. The gateway device 648 is a cable modem, digital subscriber line (DSL) modem, optical modem, analog modem, or some other device that connects the network 600 to an Internet Service Provider (ISP). The ISP may provide access to the Internet 650. Typically, a home network only has one gateway device 648. In some cases, the network 600 may not be connected to any networks outside of the house. In these cases, information about the network 600 and control of devices in the network 600 may not be available when the homeowner is not connected to the network 600; that is, the homeowner may not have access to his network 600 over the Internet 650.

Typically, the gateway device 648 includes a hardware and/or software firewall. A firewall monitors incoming and outgoing network traffic and, by applying security rules to the network traffic, attempts to keep harmful network traffic out of the network 600. In many cases, a firewall is the only security system protecting the network 600. While a firewall may work for some types of intrusion attempts originating outside the network 600, the firewall may not block all intrusion mechanisms, particularly intrusions mechanisms hidden in legitimate network traffic. Furthermore, while a firewall may block intrusions originating on the Internet 650, the firewall may not detect intrusions originating from within the network 600. For example, an infiltrator may get into the network 600 by connecting to signal from the Wi-Fi base station 634. Alternatively, the infiltrator may connect to the network 600 by physically connecting, for example, to the washing machine 612. The washing machine 612 may have a port that a service technician can connect to service the machine. Alternatively or additionally, the washing machine 612 may have a simple Universal Serial Bus (USB) port. Once an intruder has gained access to the washing machine 612, the intruder may have access to the rest of the network 600.

To provide more security for the network 600, a deception-based network security device 660 can be added to the network 600. In some implementations, the security device 660 is a standalone device that can be added to the network 600 by connecting it to a router or switch. In some implementations, the security device 660 can alternatively or additionally be connected to the network's 600 wireless sub-network by powering on the security device 660 and providing it with Wi-Fi credentials. The security device 660 may have a touchscreen, or a screen and a keypad, for inputting Wi-Fi credentials. Alternatively or additionally, the homeowner may be able to enter network information into the security device by logging into the security device 660 over a Bluetooth™ or Wi-Fi signal using software on a smartphone, tablet, or laptop, or using a web browser. In some implementations, the security device 660 can be connected to a sub-network running over the home's electrical wiring by connecting the security device 660 to a power outlet. In some implementations, the security device 660 may have ports, interfaces, and/or radio antennas for connecting to the various sub-networks that can be included in the network 600. This may be useful, for example, when the sub-networks do not communicate with each other, or do not communicate with each other seamlessly. Once powered on and connected, the security device 660 may self-configure and monitor the security of each sub-network in the network 600 that it is connected to.

In some implementations, the security device 660 may be configured to connect between the gateway device 648 and the network's 600 primary router, and/or between the gateway device 648 and the gateway device's 648 connection to the wall. Connected in one or both of these locations, the security device 660 may be able to control the network's 600 connection with outside networks. For example, the security device can disconnect the network 600 from the Internet 650.

In some implementations, the security device 660, instead of being implemented as a standalone device, may be integrated into one or more of the appliances, home electronics, or computing devices (in this example network 600), or in some other device not illustrated here. For example, the security device 660—or the functionality of the security device 660—may be incorporated into the gateway device 648 or a desktop computer 632 or a laptop computer 638. As another example, the security device 660 can be integrated into a kitchen appliance (e.g., the refrigerator 604 or microwave 608), a home media device (e.g., the television 618 or gaming system 620), or the home security system 626. In some implementations, the security device 660 may be a printed circuit board that can be added to another device without requiring significant changes to the other device. In some implementations, the security device 660 may be implemented using an Application Specific Integrated Circuit (ASIC) or Field Programmable Gate Array (FPGA) that can be added to the electronics of a device. In some implementations, the security device 660 may be implemented as a software module or modules that can run concurrently with the operating system or firmware of a networked device. In some implementations, the security device 660 may have a physical or virtual security barrier that prevents access to it by the device that it is integrated into. In some implementations, the security device's 660 presence in another device may be hidden from the device into which the security device 660 is integrated.

In various implementations, the security device 660 may scan the network 600 to determine which devices are present in the network 600. Alternatively or additionally, the security device 660 may communicate with a central controller in the network 600 (or multiple central controllers, when there are sub-networks, each with their own central controller) to learn which devices are connected to the network 600. In some implementations, the security device 660 may undergo a learning period, during which the security device 660 learns the normal activity of the network 600, such as what time of day appliances and electronics are used, what they are used for, and/or what data is transferred to and from these devices. During the learning period, the security device 660 may alert the homeowner to any unusual or suspicious activity. The homeowner may indicate that this activity is acceptable, or may indicate that the activity is an intrusion. As described below, the security device 660 may subsequently take preventive action against the intrusion.

Once the security device 660 has learned the topology and/or activity of the network 600, the security device 660 may be able to provide deception-based security for the network 600. In some implementations, the security device 660 may deploy security mechanisms that are configured to emulate devices that could be found in the network 600. In some implementations, the security device 660 may monitor activity on the network 600, including watching the data sent between the various devices on the network 600, and between the devices and the Internet 650. The security device 660 may be looking for activity that is unusual, unexpected, or readily identifiable as suspect. Upon detecting suspicious activity in the network 600, the security device 660 may deploy deceptive security mechanisms.

In some implementations, the deceptive security mechanisms are software processes running on the security device 660 that emulate devices that may be found in the network 600. In some implementations, the security device 660 may be assisted in emulating the security devices by another device on the network 600, such as the desktop computer 632. From the perspective of devices connected to the network 600, the security mechanisms appear just like any other device on the network, including, for example, having an Internet Protocol (IP) address, a Media Access Control (MAC) address, and/or some other identification information, having an identifiable device type, and responding to or transmitting data just as would the device being emulated. The security mechanisms may be emulated by the security device 660 itself; thus, while, from the point of view of the network 600, the network 600 appears to have additional devices, no physical equivalent (other than the security device 660) can be found in the house.

The devices and data emulated by a security mechanism are selected such that the security mechanism is an attractive target for intrusion attempts. Thus, the security mechanism may emulate valuable data, and/or devices that are easily hacked into, and/or devices that provide easy access to the reset of the network 600. Furthermore, the security mechanisms emulate devices that are likely to be found in the network 600, such as a second television, a second thermostat, or another laptop computer. In some implementations, the security device 660 may contact a service on the Internet 650 for assistance in selecting devices to emulate and/or for how to configure emulated devices. The security devices 660 may select and configure security mechanisms to be attractive to intrusions attempts, and to deflect attention away from more valuable or vulnerable network assets. Additionally, the security mechanisms can assist in confirming that an intrusion into the network 600 has actually taken place.

In some implementations, the security device 660 may deploy deceptive security mechanisms in advance of detecting any suspicious activity. For example, having scanned the network, the security device 660 may determine that the network 600 includes only one television 618 and one smoke detector 616. The security device 660 may therefore choose to deploy security mechanisms that emulate a second television and a second smoke detector. With security mechanisms preemptively added to the network, when there is an intrusion attempt, the intruder may target the security mechanisms instead of valuable or vulnerable network devices. The security mechanisms thus may serve as decoys and may deflect an intruder away from the network's 600 real devices.

In some implementations, the security mechanisms deployed by the security device 660 may take into account specific requirements of the network 600 and/or the type of devices that can be emulated. For example, in some cases, the network 600 (or a sub-network) may assign identifiers to each device connected to the network 600, and/or each device may be required to adopt a unique identifier. In these cases, the security device 660 may assign an identifier to deployed security mechanisms that do not interfere with identifiers used by actual devices in the network 600. As another example, in some cases, devices on the network 600 may register themselves with a central controller and/or with a central service on the Internet 650. For example, the thermostat 602 may register with a service on the Internet 650 that monitors energy use for the home. In these cases, the security mechanisms that emulate these types of devices may also register with the central controller or the central service. Doing so may improve the apparent authenticity of the security mechanism, and may avoid conflicts with the central controller or central service. Alternatively or additionally, the security device 660 may determine to deploy security mechanisms that emulate other devices, and avoid registering with the central controller or central service.

In some implementations, the security device 660 may dynamically adjust the security mechanisms that it has deployed. For example, when the homeowner adds devices to the network 600, the security device 660 may remove security mechanisms that conflict with the new devices, or change a security mechanism so that the security mechanism's configuration is not incongruous with the new devices (e.g., the security mechanisms should not have the same MAC address as a new device). As another example, when the network owner removes a device from the network 600, the security device 660 may add a security mechanism that mimics the device that was removed. As another example, the security device may change the activity of a security mechanism, for example, to reflect changes in the normal activity of the home, changes in the weather, the time of year, the occurrence of special events, and so on.

The security device 660 may also dynamically adjust the security mechanisms it has deployed in response to suspicious activity it has detected on the network 600. For example, upon detecting suspicious activity, the security device 660 may change the behavior of a security mechanism or may deploy additional security mechanisms. The changes to the security mechanisms may be directed by the suspicious activity, meaning that if, for example, the suspicious activity appears to be probing for a wireless base station 634, the security device 660 may deploy a decoy wireless base station.

Changes to the security mechanisms are meant not only to attract a possible intrusion, but also to confirm that an intrusion has, in fact, occurred. Since the security mechanisms are not part of the normal operation of the network 600, normal occupants of the home are not expected to access the security mechanisms. Thus, in most cases, any access of a security mechanism is suspect. Once the security device 660 has detected an access to a security mechanism, the security device 660 may next attempt to confirm that an intrusion into the network 600 has taken place. An intrusion can be confirmed, for example, by monitoring activity at the security mechanism. For example, login attempts, probing of data emulated by the security mechanism, copying of data from the security mechanism, and attempts to log into another part of the network 600 from the security mechanism indicate a high likelihood that an intrusion has occurred.

Once the security device 660 is able to confirm an intrusion into the network 600, the security device 660 may alert the homeowner. For example, the security device 660 may sound an audible alarm, send an email or text message to the homeowner or some other designated persons, and/or send an alert to an application running on a smartphone or tablet. As another example, the security device 660 may access other network devices and, for example, flash lights, trigger the security system's 626 alarm, and/or display messages on devices that include display screens, such as the television 618 or refrigerator 604. In some implementations, depending on the nature of the intrusion, the security device 660 may alert authorities such as the police or fire department.

In some implementations, the security device 660 may also take preventive actions. For example, when an intrusion appears to have originated outside the network 600, the security device 660 may block the network's 600 access to the Internet 650, thus possibly cutting off the intrusion. As another example, when the intrusion appears to have originated from within the network 600, the security device 660 may isolate any apparently compromised devices, for example by disconnecting them from the network 600. When only its own security mechanisms are compromised, the security device 660 may isolate itself from the rest of the network 600. As another example, when the security device 660 is able to determine that the intrusion very likely included physical intrusion into the house, the security device 660 may alert the authorities. The security device 660 may further lock down the house by, for example, locking any electronic door locks 624.

In some implementations, the security device 660 may be able to enable a homeowner to monitor the network 600 when a suspicious activity has been detected, or at any other time. For example, the homeowner may be provided with a software application that can be installed on a smartphone, tablet, desktop, and/or laptop computer. The software application may receive information from the security device 660 over a wired or wireless connection. Alternatively or additionally, the homeowner may be able to access information about his network through a web browser, where the security device 660 formats webpages for displaying the information. Alternatively or additionally, the security device 660 may itself have a touchscreen or a screen and key pad that provide information about the network 600 to the homeowner.

The information provided to the homeowner may include, for example, a list and/or graphic display of the devices connected to the network 600. The information may further provide a real-time status of each device, such as whether the device is on or off, the current activity of the device, data being transferred to or from the device, and/or the current user of the device, among other things. The list or graphic display may update as devices connect and disconnect from the network 600, such as for example laptops and smartphones connecting to or disconnecting from a wireless sub-network in the network 600. The security device 660 may further alert the homeowner when a device has unexpectedly been disconnected from the network 600. The security device 660 may further alert the homeowner when an unknown device connects to the network 600, such as for example when a device that is not known to the homeowner connects to the Wi-Fi signal.

The security device 660 may also maintain historic information. For example, the security device 660 may provide snapshots of the network 600 taken once a day, once a week, or once a month. The security device 660 may further provide a list of devices that have, for example, connected to the wireless signal in the last hour or day, at what times, and for how long. The security device 660 may also be able to provide identification information for these devices, such as MAC addresses or usernames. As another example, the security device 660 may also maintain usage statistics for each device in the network 600, such as for example the times at which each device was in use, what the device was used for, how much energy the device used, and so on.

The software application or web browser or display interface that provides the homeowner with information about his network 600 may also enable the homeowner to make changes to the network 600 or to devices in the network 600. For example, through the security device 660, the homeowner may be able to turn devices on or off, change the configuration of a device, change a password for a device or for the network, and so on.

In some implementations, the security device 660 may also display currently deployed security mechanisms and their configuration. In some implementations, the security device 660 may also display activity seen at the security mechanisms, such as for example a suspicious access to a security mechanism. In some implementations, the security device 660 may also allow the homeowner to customize the security mechanisms. For example, the homeowner may be able to add or remove security mechanisms, modify data emulated by the security mechanisms, modify the configuration of security mechanism, and/or modify the activity of a security mechanism.

A deception-based network security device 660 thus can provide sophisticated security for a small network. The security device 660 may be simple to add to a network, yet provide comprehensive protection against both external and internal intrusions. Moreover, the security device 660 may be able to monitor multiple sub-networks that are each using different protocols. The security device 660, using deceptive security mechanisms, may be able to detect and confirm intrusions into the network 600. The security device 660 may be able to take preventive actions when an intrusion occurs. The security device 660 may also be able to provide the homeowner with information about his network, and possibly also control over devices in the network.

Figure 7:
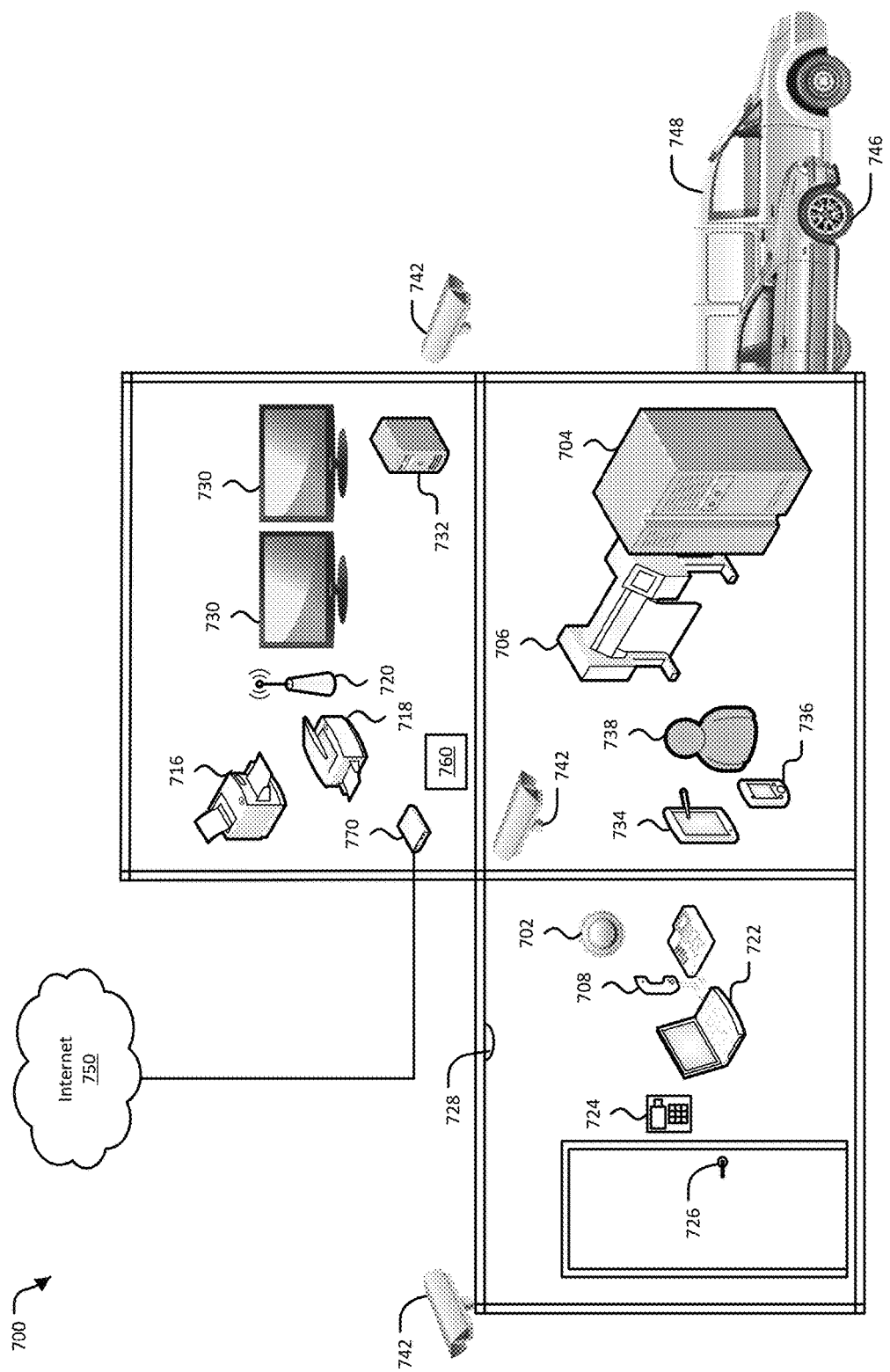
FIG. 7 illustrates an Internet-of-Things network, here implemented in a small business.

FIG. 7 illustrates another example of a small network 700, here implemented in a small business. A network in a small business may have both traditional and non-traditional devices connected to the network 700. Small business networks are also examples of networks that are often implemented with minimal security. A small business owner may not have the financial or technical resources, time, or expertise to configure a sophisticated security infrastructure for her network 700. The business owner, however, is likely able to at least set up a network 700 for the operation of the business. A deception-based network security device that is at least as simple to set up as the network 700 itself may provide inexpensive and simple yet sophisticated security for the network 700.

The example network 700 may be one, single network, or may include multiple sub-networks. For example, the network 700 may include a wired sub-network, such as an Ethernet network, and a wireless sub-network, such as an 802.11 Wi-Fi network. The wired sub-network may be implemented using cables that have been run through the walls and/or ceilings to the various rooms in the business. The cables may be connected to jacks in the walls that devices can connect to in order to connect to the network 700. The wireless network may be implemented using a wireless base station 720, or several wireless base stations, which provide a wireless signal throughout the business. The network 700 may include other wireless sub-networks, such as a short-distance Bluetooth™ network. In some cases, the sub-networks communicate with one another. For example, the Wi-Fi sub-network may be connected to the wired Ethernet sub-network. In some cases, the various sub-networks in the network 700 may not be configured to or able to communicate with each other.

As noted above, the small business network 700 may include both computers, network infrastructure devices, and other devices not traditionally found in a network. The network 700 may also include electronics, machinery, and systems that have been connected to the network 700 according to an Internet-of-Things approach. Workshop machinery that was once purely analog may now have computer controls. Digital workshop equipment may be network-enabled. By connecting shop equipment and machinery to the network 700, automation and efficiency of the business can be improved and orders, materials, and inventory can be tracked. Having more devices on the network 700, however, may increase the number of vulnerabilities in the network 700. Devices that have only recently become network-enabled may be particularly vulnerable because their security systems have not yet been hardened through use and attack. A deception-based network security device may provide simple-to-install and sophisticated security for a network that may otherwise have only minimal security.

The example small business of FIG. 7 includes a front office. In the front office, the network may include devices for administrative tasks. These devices may include, for example, a laptop computer 722 and a telephone 708. These devices may be attached to the network 700 in order to, for example, access records related to the business, which may be stored on a server 732 located elsewhere in the building. In the front office, security devices for the building may also be found, including, for example, security system controls 724 and an electronic door lock 726. Having the security devices on the network 700 may enable the business owner to remotely control access to the building. The business owner may also be able to remotely monitor the security of building, such as for example being able to view video streams from security cameras 742. The front office may also be where environmental controls, such as a thermostat 702, are located. Having the thermostat 702 on the network 700 may allow the business owner to remotely control the temperature settings. A network-enabled thermostat 702 may also track energy usage for the heating and cooling systems. The front office may also include safety devices, such as a network-connected smoke alarm 728. A network-connected smoke alarm may be able to inform the business owner that there is a problem in the building be connecting to the business owner's smartphone or computer.

Another workspace in this example small business is a workshop. In the workshop, the network 700 may include production equipment for producing the goods sold by the business. The production equipment may include, for example, manufacturing machines 704 (e.g. a milling machine, a Computer Numerical Control (CNC) machine, a 3D printer, or some other machine tool) and a plotter 706. The production equipment may be controlled by a computer on the network 700, and/or may receive product designs over the network 700 and independently execute the designs. In the workshop, one may also find other devices related to the manufacturing of products, such as radiofrequency identification (RFID) scanners, barcode or Quick Response (QR) code generators, and other devices for tracking inventory, as well as electronic tools, hand tools, and so on.

In the workshop and elsewhere in the building, mobile computing devices and people 738 may also be connected to the network 700. Mobile computing devices include, for example, tablet computers 734 and smartphones 736. These devices may be used to control production equipment, track supplies and inventory, receive and track orders, and/or for other operations of the business. People 738 may be connected to the network through network-connected devices worn or implanted in the people 738, such as for example smart watches, fitness trackers, heart rate monitors, drug delivery systems, pacemakers, and so on.

At a loading dock, the example small business may have a delivery van 748 and a company car 746. When these vehicles are away from the business, they may be connected to the network 700 remotely, for example over the Internet 750. By being able to communicate with the network 700, the vehicles may be able to receive information such as product delivery information (e.g., orders, addresses, and/or delivery times), supply pickup instructions, and so on. The business owner may also be able to track the location of these vehicles from the business location, or over the Internet 750 when away from the business, and/or track who is using the vehicles.

The business may also have a back office. In the back office, the network 700 may include traditional network devices, such as computers 730, a multi-function printer 716, a scanner 718, and a server 732. In this example, the computers 730 may be used to design products for manufacturing in the workshop, as well as for management of the business, including tracking orders, supplies, inventory, and/or human resources records. The multi-function printer 716 and scanner 718 may support the design work and the running of the business. The server 732 may store product designs, orders, supply records, and inventory records, as well as administrative data, such as accounting and human resources data.

The back office may also be where a gateway device 770 is located. The gateway device 770 connects the small business to other networks, including the Internet 750. Typically, the gateway device 770 connects to an ISP, and the ISP provides access to the Internet 750. In some cases, a router may be integrated into the gateway device 770. In some cases, gateway device 770 may be connected to an external router, switch, or hub, not illustrated here. In some cases, the network 700 is not connected to any networks outside of the business's own network 700. In these cases, the network 700 may not have a gateway device 770.

The back office is also where the network 700 may have a deception-based network security device 760. The security device 760 may be a standalone device that may be enabled as soon as it is connected to the network 700. Alternatively or additionally, the security device 760 may be integrated into another device connected to the network 700, such as the gateway device 770, a router, a desktop computer 730, a laptop computer 722, the multi-function printer 716, or the thermostat 702, among others. When integrated into another device, the security device 760 may use the network connection of the other device, or may have its own network connection for connecting to the network 700. The security device 760 may connect to the network 700 using a wired connection or a wireless connection.

Once connected to the network 700, the security device 760 may begin monitoring the network 700 for suspect activity. In some implementations, the security device 760 may scan the network 700 to learn which devices are connected to the network 700. In some cases, the security device 760 may learn the normal activity of the network 700, such as what time the various devices are used, for how long, by whom, for what purpose, and what data is transferred to and from each device, among other things.

In some implementations, having learned the configuration and/or activity of the network 700, the security device 760 may deploy deceptive security mechanisms. These security mechanisms may emulate devices that may be found on the network 700, including having an identifiable device type and/or network identifiers (such as a MAC address and/or IP address), and being able to send and receive network traffic that a device of a certain time would send and receive. For example, for the example small business, the security device 760 may configure a security mechanism to emulate a 3D printer, a wide-body scanner, or an additional security camera. The security device 760 may further avoid configuring a security mechanism to emulate a device that is not likely to be found in the small business, such as a washing machine. The security device 760 may use the deployed security mechanisms to monitor activity on the network 700.

In various implementations, when the security device 760 detects suspect activity, the security device 760 may deploy additional security mechanisms. These additional security mechanisms may be selected based on the nature of suspect activity. For example, when the suspect activity appears to be attempting to break into the shop equipment, the security device 760 may deploy a security mechanism that looks like shop equipment that is easy to hack. In some implementations, the security device 760 may deploy security mechanisms only after detecting suspect activity on the network 700.

The security device 760 selects devices to emulate that are particularly attractive for an infiltration, either because the emulated device appears to have valuable data or because the emulated device appears to be easy to infiltrate, or for some other reason. In some implementations, the security device 760 connects to a service on the Internet 750 for assistance in determining which devices to emulate and/or how to configure the emulated device. Once deployed, the security mechanisms serve as decoys to attract the attention of a possible infiltrator away from valuable network assets. In some implementations, the security device 760 emulates the security mechanisms using software processes. In some implementations, the security device 760 may be assisted in emulating security mechanisms by a computer 730 on the network.

In some implementations, the security device 760 may deploy security mechanisms prior to detecting suspicious activity on the network 700. In these implementations, the security mechanisms may present more attractive targets for a possible, future infiltration, so that if an infiltration occurs, the infiltrator will go after the security mechanisms instead of the actual devices on the network 700.

In various implementations, the security device 760 may also change the security mechanisms that it has deployed. For example, the security device 760 may add or remove security mechanisms as the operation of the business changes, as the activity on the network 700 changes, as devices are added or removed from the network 700, as the time of year changes, and so on.

Besides deflecting a possible network infiltration away from valuable or vulnerable network devices, the security device 760 may use the security mechanisms to confirm that the network 700 has been infiltrated. Because the security mechanisms are not part of actual devices in use by the business, any access to them over the network is suspect. Thus, once the security device 760 detects an access to one of its security mechanisms, the security device 760 may attempt to confirm that this access is, in fact, an unauthorized infiltration of the network 700.

To confirm that a security mechanism has been infiltrated, the security device 760 may monitor activity seen at the security mechanism. The security device 760 may further deploy additional security mechanisms, to see if, for example, it can present an even more attractive target to the possible infiltrator. The security device 760 may further look for certain activity, such as log in attempts to other devices in the network, attempts to examine data on the security mechanism, attempts to move data from the security mechanism to the Internet 750, scanning of the network 700, password breaking attempts, and so on.

Once the security device 760 has confirmed that the network 700 has been infiltrated, the security device 760 may alert the business owner. For example, the security device 760 may sound an audible alarm, email or send text messages to the computers 730 and/or handheld devices 734, 736, send a message to the business's cars 746, 748, flash lights, or trigger the security system's 724 alarm. In some implementations, the security device 760 may also take preventive measures. For example, the security device 760 may disconnect the network 700 from the Internet 750, may disconnect specific devices from the network 700 (e.g., the server 732 or the manufacturing machines 704), may turn some network-connected devices off, and/or may lock the building.

In various implementations, the security device 760 may allow the business owner to monitor her network 700, either when an infiltration is taking place or at any other time. For example, the security device 760 may provide a display of the devices currently connected to the network 700, including flagging any devices connected to the wireless network that do not appear to be part of the business. The security device 760 may further display what each device is currently doing, who is using them, how much energy each device is presently using, and/or how much network bandwidth each device is using. The security device 760 may also be able to store this information and provide historic configuration and/or usage of the network 700.

The security device 760 may have a display it can use to show information to the business owner. Alternatively or additionally, the security device 760 may provide this information to a software application that can run on a desktop or laptop computer, a tablet, or a smartphone. Alternatively or additionally, the security device 760 may format this information for display through a web browser. The business owner may further be able to control devices on the network 700 through an interface provided by the security device 760, including, for example, turning devices on or off, adjusting settings on devices, configuring user accounts, and so on. The business owner may also be able to view any security mechanisms presently deployed, and may be able to re-configure the security mechanisms, turn them off, or turn them on.

IoT networks can also include industrial control systems. Industrial control system is a general term that encompasses several types of control systems, including supervisory control and data acquisition (SCADA) systems, distributed control systems (DCS) and other control system configurations, such as Programmable Logic Controllers (PLCs), often found in the industrial sectors and infrastructures. Industrial control systems are often found in industries such as electrical, water and wastewater, oil and natural gas, chemical, transportation, pharmaceutical, pulp and paper, food and beverage, and discrete manufacturing (e.g., automotive, aerospace, and durable goods). While a large percentage of industrial control systems may be privately owned and operated, federal agencies also operate many industrial processes, such as air traffic control systems and materials handling (e.g., Postal Service mail handling).

Figure 8:
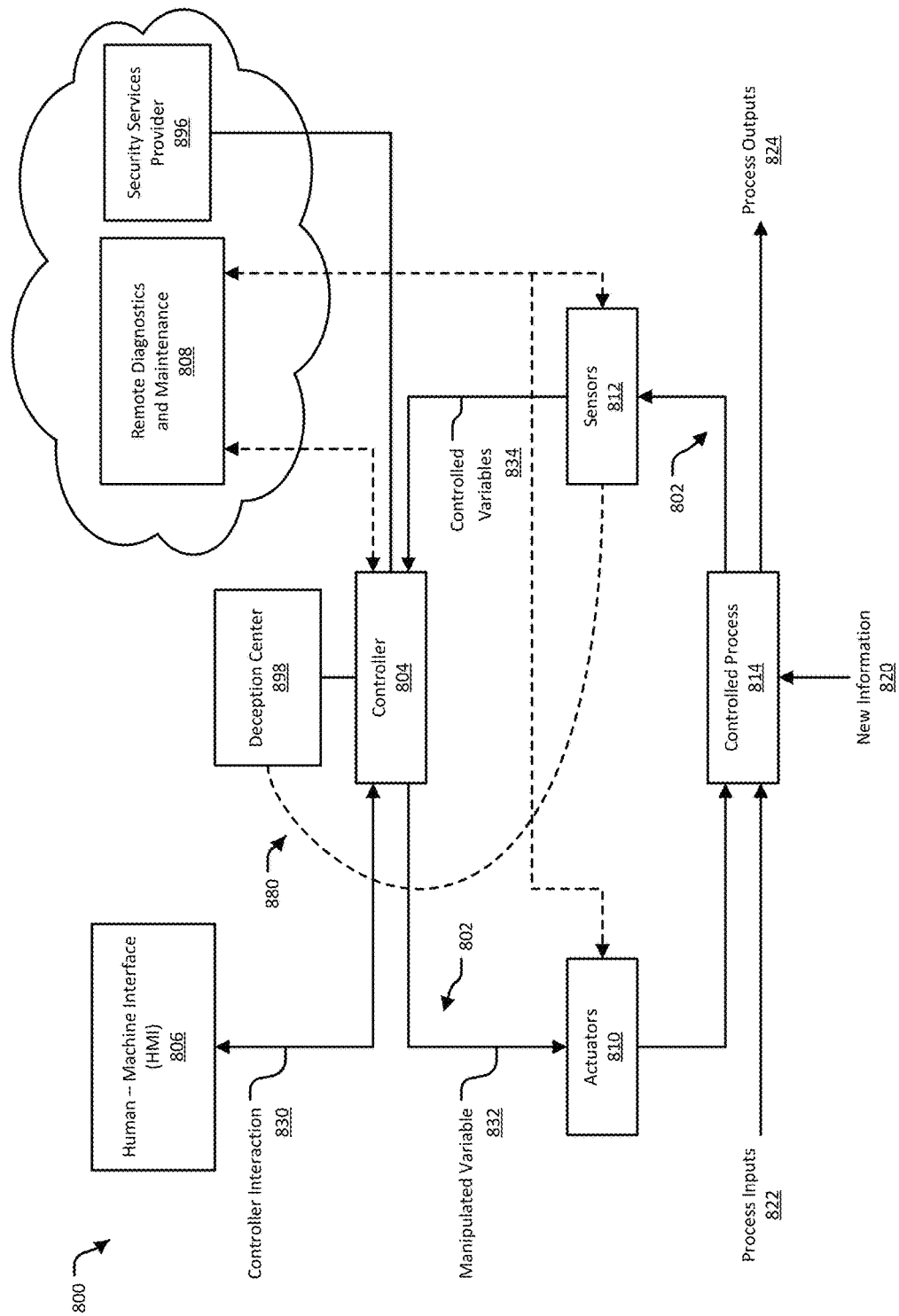
FIG. 8 illustrates an example of the basic operation of an industrial control system.

FIG. 8 illustrates an example of the basic operation of an industrial control system 800. Generally, an industrial control system 800 may include a control loop 802, a human-machine interface 806, and remote diagnostics and maintenance 808. In some implementations, the example industrial control system can be defended by a network threat detection and analysis system, which can include a deception center 898 and a security services provider 896.

A control loop 802 may consist of sensors 812, controller 804 hardware such as PLCs, actuators 810, and the communication of variables 832, 834. The sensors 812 may be used for measuring variables in the system, while the actuators 810 may include, for example, control valves breakers, switches, and motors. Some of the sensors 812 may be deceptions sensors. Controlled variables 834 may be transmitted to the controller 804 from the sensors 812. The controller 804 may interpret the controlled variables 834 and generates corresponding manipulated variables 832, based on set points provided by controller interaction 830. The controller 804 may then transmit the manipulated variables 832 to the actuators 810. The actuators 810 may drive a controlled process 814 (e.g., a machine on an assembly line). The controlled process 814 may accept process inputs 822 (e.g., raw materials) and produce process outputs 824 (e.g., finished products). New information 820 provided to the controlled process 814 may result in new sensor 812 signals, which identify the state of the controlled process 814 and which may also transmitted to the controller 804.

In some implementations, at least some of the sensors 812 can also provide the deception center 898 with visibility into the industrial control system 800, such as for example being able to present or project deceptive security mechanisms into the industrial control system. Additionally, in various implementations, the sensors 812 may provide a portal through which a suspected attack on the industrial control system can be redirected to the deception center 898. The deception center 898 and the sensors 812 may be able to communicate using network tunnels 880.

The deception center 898 provides network security for the industrial control system 800 by deploying security mechanisms into the industrial control system 800, monitoring the industrial control system through the security mechanisms, detecting and redirecting apparent threats, and analyzing network activity resulting from the apparent threat. In some implementations, the industrial control system 800 can include more than one deception center 898. In some implementations, the deception center may be located off-site, such as on the Internet.

In some implementations, the deception center 898 may interact with a security services provider 896 located outside the industrial control system 800. The security services provider 896 may act as a central hub for providing security to multiple sites that are part of the industrial control system 800, and/or for multiple separate, possibly unrelated, industrial control systems. For example, the security services provider 896 may communicate with multiple deception centers 898 that each provide security for a different industrial control system 800 for the same organization. As another example, the security services provider 896 may coordinate the activities of the deception center 898 and the sensors 812, such as enabling the deception center 898 and the sensors 812 to connect to each other. In some implementations, the security services provider 896 is located outside the industrial control system 800. In some implementations, the security services provider 896 is controlled by a different entity than the entity that controls the site network. For example, the security services provider 896 may be an outside vendor. In some implementations, the security services provider 896 is controlled by the same entity as that controls the industrial control system. In some implementations, the network security system does not include a security services provider 896.

The human-machine interface 806 provides operators and engineers with an interface for controller interaction 830. Controller interaction 830 may include monitoring and configuring set points and control algorithms, and adjusting and establishing parameters in the controller 804. The human-machine interface 806 typically also receives information from the controller 804 that allows the human-machine interface 806 to display process status information and historical information about the operation of the control loop 802.

The remote diagnostics and maintenance 808 utilities are typically used to prevent, identify, and recover from abnormal operation or failures. For diagnostics, the remote diagnostics and maintenance utilities 808 may monitor the operation of each of the controller 804, sensors 812, and actuators 810. To recover after a problem, the remote diagnostics and maintenance 808 utilities may provide recovery information and instructions to one or more of the controller 804, sensors 812, and/or actuators 810.

A typical industrial control system contains many control loops, human-machine interfaces, and remote diagnostics and maintenance tools, built using an array of network protocols on layered network architectures. In some cases, multiple control loops are nested and/or cascading, with the set point for one control loop being based on process variables determined by another control loop. Supervisory-level control loops and lower-level control loops typically operate continuously over the duration of a process, with cycle times ranging from milliseconds to minutes.

One type of industrial control system that may include many control loops, human-machine interfaces, and remote diagnostics and maintenance tools is a supervisory control and data acquisition (SCADA) system. SCADA systems are used to control dispersed assets, where centralized data acquisition is typically as important as control of the system. SCADA systems are used in distribution systems such as, for example, water distribution and wastewater collection systems, oil and natural gas pipelines, electrical utility transmission and distribution systems, and rail and other public transportation systems, among others. SCADA systems typically integrate data acquisition systems with data transmission systems and human-machine interface software to provide a centralized monitoring and control system for numerous process inputs and outputs. SCADA systems are typically designed to collect field information, transfer this information to a central computer facility, and to display the information to an operator in a graphic and/or textual manner. Using this displayed information, the operator may, in real time, monitor and control an entire system from a central location. In various implementations, control of any individual sub-system, operation, or task can be automatic, or can be performed by manual commands.

Figure 9:
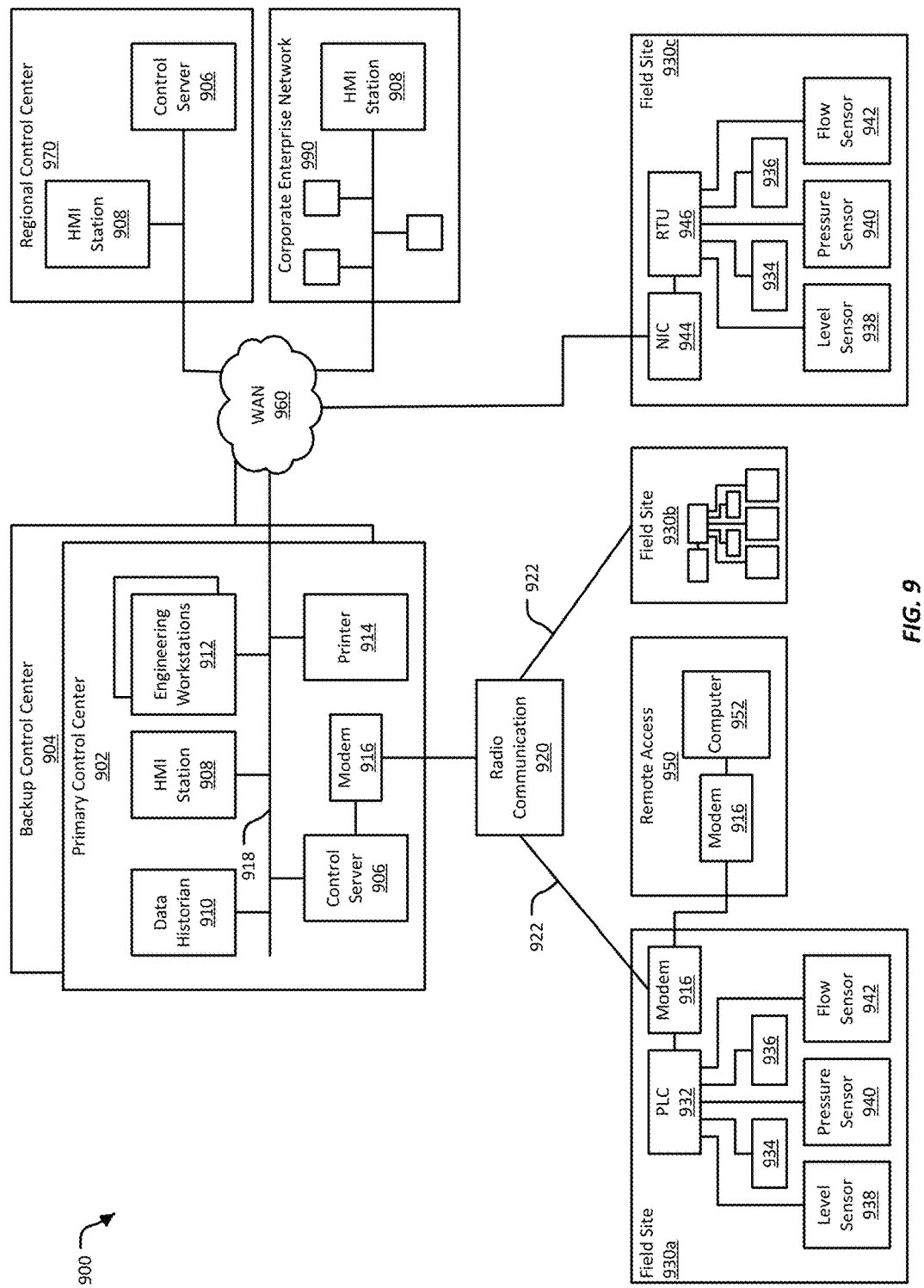
FIG. 9 illustrates an example of a SCADA system, here used for distributed monitoring and control.

FIG. 9 illustrates an example of a SCADA system 900, here used for distributed monitoring and control. This example SCADA system 900 includes a primary control center 902 and three field sites 930a-930c. A backup control center 904 provides redundancy in case of there is a malfunction at the primary control center 902. The primary control center 902 in this example includes a control server 906—which may also be called a SCADA server or a Master Terminal Unit (MTU)—and a local area network (LAN) 918. The primary control center 902 may also include a human-machine interface station 908, a data historian 910, engineering workstations 912, and various network equipment such as printers 914, each connected to the LAN 918.

The control server 906 typically acts as the master of the SCADA system 900. The control server 906 typically includes supervisory control software that controls lower-level control devices, such as Remote Terminal Units (RTUs) and PLCs, located at the field sites 930a-930c. The software may tell the system 900 what and when to monitor, what parameter ranges are acceptable, and/or what response to initiate when parameters are outside of acceptable values.

The control server 906 of this example may access Remote Terminal Units and/or PLCs at the field sites 930a-930c using a communications infrastructure, which may include radio-based communication devices, telephone lines, cables, and/or satellites. In the illustrated example, the control server 906 is connected to a modem 916, which provides communication with serial-based radio communication 920, such as a radio antenna. Using the radio communication 920, the control server 906 can communicate with field sites 930a-930b using radiofrequency signals 922. Some field sites 930a-930b may have radio transceivers for communicating back to the control server 906.

A human-machine interface station 908 is typically a combination of hardware and software that allows human operators to monitor the state of processes in the SCADA system 900. The human-machine interface station 908 may further allow operators to modify control settings to change a control objective, and/or manually override automatic control operations, such as in the event of an emergency. The human-machine interface station 908 may also allow a control engineer or operator to configure set points or control algorithms and parameters in a controller, such as a Remote Terminal Unit or a PLC. The human-machine interface station 908 may also display process status information, historical information, reports, and other information to operators, administrators, mangers, business partners, and other authorized users. The location, platform, and interface of a human-machine interface station 908 may vary. For example, the human-machine interface station 908 may be a custom, dedicated platform in the primary control center 902, a laptop on a wireless LAN, or a browser on a system connected to the Internet.

The data historian 910 in this example is a database for logging all process information within the SCADA system 900. Information stored in this database can be accessed to support analysis of the system 900, for example for statistical process control or enterprise level planning.

The backup control center 904 may include all or most of the same components that are found in the primary control center 902. In some cases, the backup control center 904 may temporarily take over for components at the primary control center 902 that have failed or have been taken offline for maintenance. In some cases, the backup control center 904 is configured to take over all operations of the primary control center 902, such as when the primary control center 902 experiences a complete failure (e.g., is destroyed in a natural disaster).

The primary control center 902 may collect and log information gathered by the field sites 930a-930c and display this information using the human-machine interface station 908. The primary control center 902 may also generate actions based on detected events. The primary control center 902 may, for example, poll field devices at the field sites 930a-930c for data at defined intervals (e.g., 5 or 60 seconds), and can send new set points to a field device as required. In addition to polling and issuing high-level commands, the primary control center 902 may also watch for priority interrupts coming from the alarm systems at the field sites 930a-930c.

In this example, the primary control center 902 uses point-to-point connections to communication with three field sites 930a-930c, using radio telemetry for two communications with two of the field sites 930a-930b. In this example, the primary control center 902 uses a wide area network (WAN) 960 to communicate with the third field site 930c. In other implementations, the primary control center 902 may use other communication topologies to communicate with field sites. Other communication topologies include rings, stars, meshes, trees, lines or series, and busses or multi-drops, among others. Standard and proprietary communication protocols may be used to transport information between the primary control center 902 and field sites 930a-930c. These protocols may use telemetry techniques such as provided by telephone lines, cables, fiber optics, and/or radiofrequency transmissions such as broadcast, microwave, and/or satellite communications.

The field sites 930a-930c in this example perform local control of actuators and monitor local sensors. For example, a first field site 930a may include a PLC 932. A PLC is a small industrial computer originally designed to perform the logic functions formerly executed by electrical hardware (such as relays, switches, and/or mechanical timers and counters). PLCs have evolved into controllers capable of controlling complex processes, and are used extensively in both SCADA systems and distributed control systems. Other controllers used at the field level include process controllers and Remote Terminal Units, which may provide the same level of control as a PLC but may be designed for specific control applications. In SCADA environments, PLCs are often used as field devices because they are more economical, versatile, flexible, and configurable than special-purpose controllers.

The PLC 932 at a field site, such as the first field site 930a, may control local actuators 934, 936 and monitor local sensors 938, 940, 942. Examples of actuators include valves 934 and pumps 936, among others. Examples of sensors include level sensors 938, pressure sensors 940, and flow sensors 942, among others. Any of the actuators 934, 936 or sensors 938, 940, 942 may be "smart" actuators or sensors, more commonly called intelligent electronic devices (IEDs). Intelligent electronic devices may include intelligence for acquiring data, communicating with other devices, and performing local processing and control. An intelligent electronic device could combine an analog input sensor, analog output, low-level control capabilities, a communication system, and/or program memory in one device. The use of intelligent electronic devices in SCADA systems and distributed control systems may allow for automatic control at the local level. Intelligent electronic devices, such as protective relays, may communicate directly with the control server 906. Alternatively or additionally, a local Remote Terminal Unit may poll intelligent electronic devices to collect data, which it may then pass to the control server 906.

Field sites 930a-930c are often equipped with remote access capability that allows field operators to perform remote diagnostics and repairs. For example, the first remote 930a may include a modem 916 connected to the PLC 932. A remote access 950 site may be able to, using a dial up connection, connect to the modem 916. The remote access 950 site may include its own modem 916 for dialing into to the field site 930a over a telephone line. At the remote access 950 site, an operator may use a computer 952 connected to the modem 916 to perform diagnostics and repairs on the first field site 930a.

The example SCADA system 900 includes a second field site 930b, which may be provisioned in substantially the same way as the first field site 930a, having at least a modem and a PLC or Remote Terminal that controls and monitors some number of actuators and sensors.

The example SCADA system 900 also includes a third field site 930c that includes a network interface card (NIC) 944 for communicating with the system's 900 WAN 960. In this example, the third field site 930c includes a Remote Terminal Unit 946 that is responsible for controlling local actuators 934, 936 and monitoring local sensors 938, 940, 942. A Remote Terminal Unit, also called a remote telemetry unit, is a special-purpose data acquisition and control unit typically designed to support SCADA remote stations. Remote Terminal Units may be field devices equipped with wireless radio interfaces to support remote situations where wire-based communications are unavailable. In some cases, PLCs are implemented as Remote Terminal Units.

The SCADA system 900 of this example also includes a regional control center 970 and a corporate enterprise network 990. The regional control center 970 may provide a higher level of supervisory control. The regional control center 970 may include at least a human-machine interface station 908 and a control server 906 that may have supervisory control over the control server 906 at the primary control center 902. The corporate enterprise network 990 typically has access, through the system's 900 WAN 960, to all the control centers 902, 904 and to the field sites 930a-930c. The corporate enterprise network 990 may include a human-machine interface station 908 so that operators can remotely maintain and troubleshoot operations.

Another type of industrial control system is the distributed control system (DCS). Distributed control systems are typically used to control production systems within the same geographic location for industries such as oil refineries, water and wastewater management, electric power generation plants, chemical manufacturing plants, and pharmaceutical processing facilities, among others. These systems are usually process control or discrete part control systems. Process control systems may be processes that run continuously, such as manufacturing processes for fuel or steam flow in a power plant, for petroleum production in a refinery, or for distillation in a chemical plant. Discrete part control systems have processes that have distinct processing steps, typically with a distinct start and end to each step, such as found in food manufacturing, electrical and mechanical parts assembly, and parts machining. Discrete-based manufacturing industries typically conduct a series of steps on a single item to create an end product.

A distributed control system typically uses a centralized supervisory control loop to mediate a group of localized controllers that share the overall tasks of carrying out an entire production process. By modularizing the production system, a distributed control system may reduce the impact of a single fault on the overall system. A distributed control system is typically interfaced with a corporate network to give business operations a view of the production process.

Figure 10:
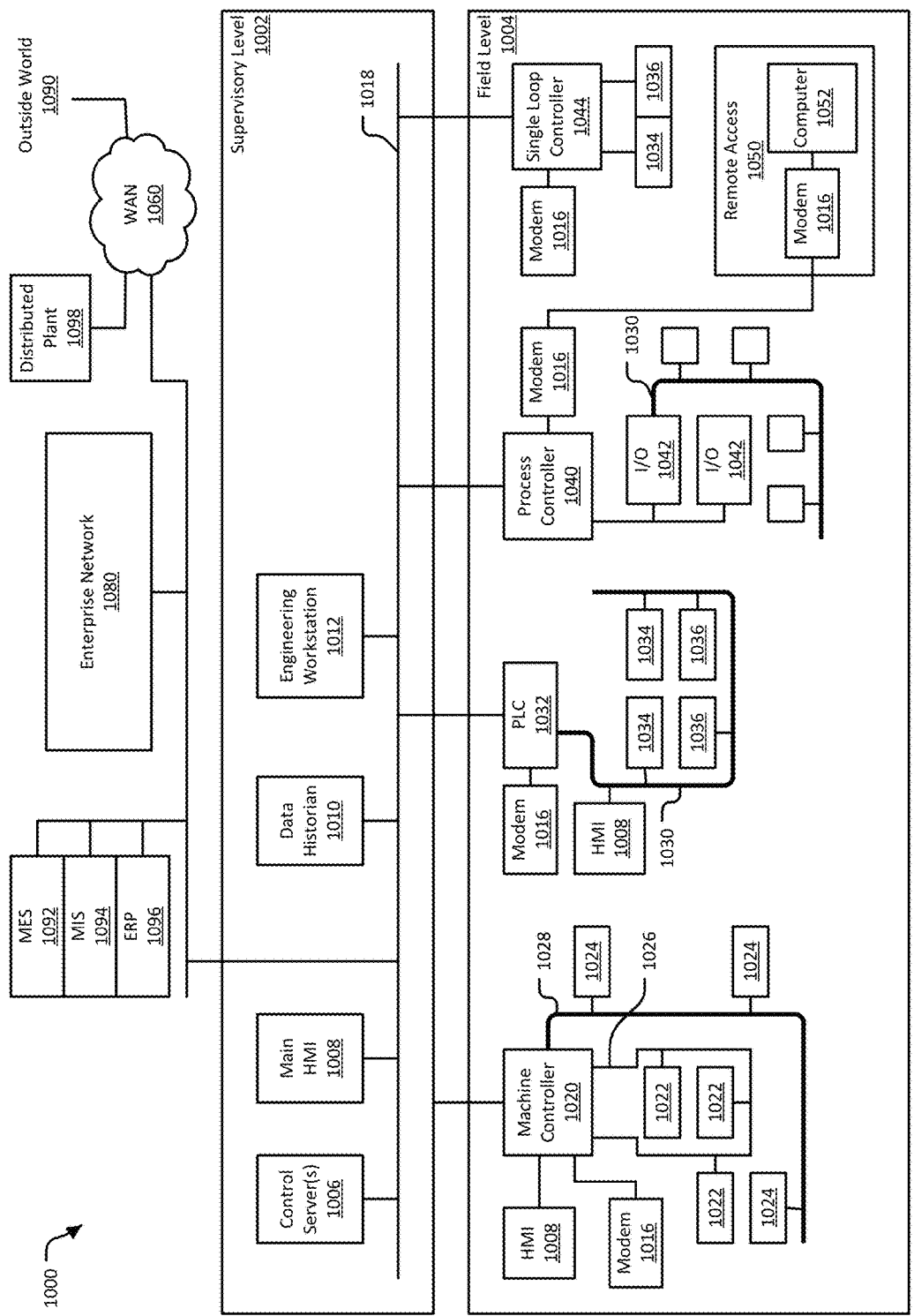
FIG. 10 illustrates an example of a distributed control.

FIG. 10 illustrates an example of a distributed control system 1000. This example distributed control system 1000 encompasses a production facility, including bottom-level production processes at a field level 1004, supervisory control systems at a supervisory level 1002, and a corporate or enterprise layer.

At the supervisory level 1002, a control server 1006, operating as a supervisory controller, may communicate with subordinate systems via a control network 1018. The control server 1006 may send set points to distributed field controllers, and may request data from the distributed field controllers. The supervisory level 1002 may include multiple control servers 1006, with one acting as the primary control server and the rest acting as redundant, back-up control servers. The supervisory level 1002 may also include a main human-machine interface 1008 for use by operators and engineers, a data historian 1010 for logging process information from the system 1000, and engineering workstations 1012.

At the field level 1004, the system 1000 may include various distributed field controllers. In the illustrated example, the distributed control system 1000 includes a machine controller 1020, a PLC 1032, a process controller 1040, and a single loop controller 1044. The distributed field controllers may each control local process actuators, based on control server 1006 commands and sensor feedback from local process sensors.

In this example, the machine controller 1020 drives a motion control network 1026. Using the motion control network 1026, the machine controller 1020 may control a number of servo drives 1022, which may each drive a motor. The machine controller 1020 may also drive a logic control bus 1028 to communicate with various devices 1024. For example, the machine controller 1020 may use the logic control bus 1028 to communicate with pressure sensors, pressure regulators, and/or solenoid valves, among other devices. One or more of the devices 1024 may be an intelligent electronic device. A human-machine interface 1008 may be attached to the machine controller 1020 to provide an operator with local status information about the processes under control of the machine controller 1020, and/or local control of the machine controller 1020. A modem 1016 may also be attached to the machine controller 1020 to provide remote access to the machine controller 1020.

The PLC 1032 in this example system 1000 uses a fieldbus 1030 to communicate with actuators 1034 and sensors 1036 under its control. These actuators 1034 and sensors 1036 may include, for example, direct current (DC) servo drives, alternating current (AC) servo drives, light towers, photo eyes, and/or proximity sensors, among others. A human-machine interface 1008 may also be attached to the fieldbus 1030 to provide operators with local status and control for the PLC 1032. A modem 1016 may also be attached to the PLC 1032 to provide remote access to the PLC 1032.

The process controller 1040 in this example system 1000 also uses a fieldbus 1030 to communicate with actuators and sensors under its control, one or more of which may be intelligent electronic devices. The process controller 1040 may communicate with its fieldbus 1030 through an input/output (I/O) server 1042. An I/O server is a control component typically responsible for collecting, buffering, and/or providing access to process information from control subcomponents. An I/O server may be used for interfacing with third-party control components. Actuators and sensors under control of the process controller 1040 may include, for example, pressure regulators, pressure sensors, temperature sensors, servo valves, and/or solenoid valves, among others. The process controller 1040 may be connected to a modem 1016 so that a remote access 1050 site may access the process controller 1040. The remote access 1050 site may include a computer 1052 for use by an operator to monitor and control the process controller 1040. The computer 1052 may be connected to a local modem 1016 for dialing in to the modem 1016 connected to the process controller 1040.

The illustrated example system 1000 also includes a single loop controller 1044. In this example, the single loop controller 1044 interfaces with actuators 1034 and sensors 1036 with point-to-point connections, instead of a fieldbus. Point-to-point connections require a dedicated connection for each actuator 1034 and each sensor 1036. Fieldbus networks, in contrast, do not need point-to-point connections between a controller and individual field sensors and actuators. In some implementations, a fieldbus allows greater functionality beyond control, including field device diagnostics. A fieldbus can accomplish control algorithms within the fieldbus, thereby avoiding signal routing back to a PLC for every control operation. Standard industrial communication protocols are often used on control networks and fieldbus networks.

The single loop controller 1044 in this example is also connected to a modem 1016, for remote access to the single loop controller.

In addition to the supervisory level 1002 and field level 1004 control loops, the distributed control system 1000 may also include intermediate levels of control. For example, in the case of a distributed control system controlling a discrete part manufacturing facility, there could be an intermediate level supervisor for each cell within the plant. This intermediate level supervisor could encompass a manufacturing cell containing a machine controller that processes a part, and a robot controller that handles raw stock and final products. Additionally, the distributed control system could include several of these cells that manage field-level controllers under the main distributed control system supervisory control loop.

In various implementations, the distributed control system may include a corporate or enterprise layer, where an enterprise network 1080 may connect to the example production facility. The enterprise network 1080 may be, for example, located at a corporate office co-located with the facility, and connected to the control network 1018 in the supervisory level 1002. The enterprise network 1080 may provide engineers and managers with control and visibility into the facility. The enterprise network 1080 may further include Manufacturing Execution Systems (MES) 1092, control systems for managing and monitoring work-in-process on a factory floor. An MES can track manufacturing information in real time, receiving up-to-the-minute data from robots, machine monitors and employees. The enterprise network 1080 may also include Management Information Systems (MIS) 1094, software and hardware applications that implement, for example, decision support systems, resource and people management applications, project management, and database retrieval applications, as well as basic business functions such as order entry and accounting. The enterprise network 1080 may further include Enterprise Resource Planning (ERP) systems 1096, business process management software that allows an organization to use a system of integrated applications to manage the business and automate many back office functions related to technology, services, and human resources.

The enterprise network 1080 may further be connected to a WAN 1060. Through the WAN 1060, the enterprise network 1080 may connect to a distributed plant 1098, which may include control loops and supervisory functions similar to the illustrated facility, but which may be at a different geographic location. The WAN 1060 may also connect the enterprise network to the outside world 1090, that is, to the Internet and/or various private and public networks. In some cases, the WAN 1060 may itself include the Internet, so that the enterprise network 1080 accesses the distributed plant 1098 over the Internet.

As described above, SCADA systems and distributed control systems use Programmable Logic Controllers (PLCs) as the control components of an overall hierarchical system. PLCs can provide local management of processes through feedback control, as described above. In a SCADA implementation, a PLC can provide the same functionality as a Remote Terminal Unit. When used in a distributed control system, PLCs can be implemented as local controllers within a supervisory scheme. PLCs can have user-programmable memory for storing instructions, where the instructions implement specific functions such as I/O control, logic, timing, counting, proportional-integral-derivative (PID) control, communication, arithmetic, and data and file processing.

Figure 11:
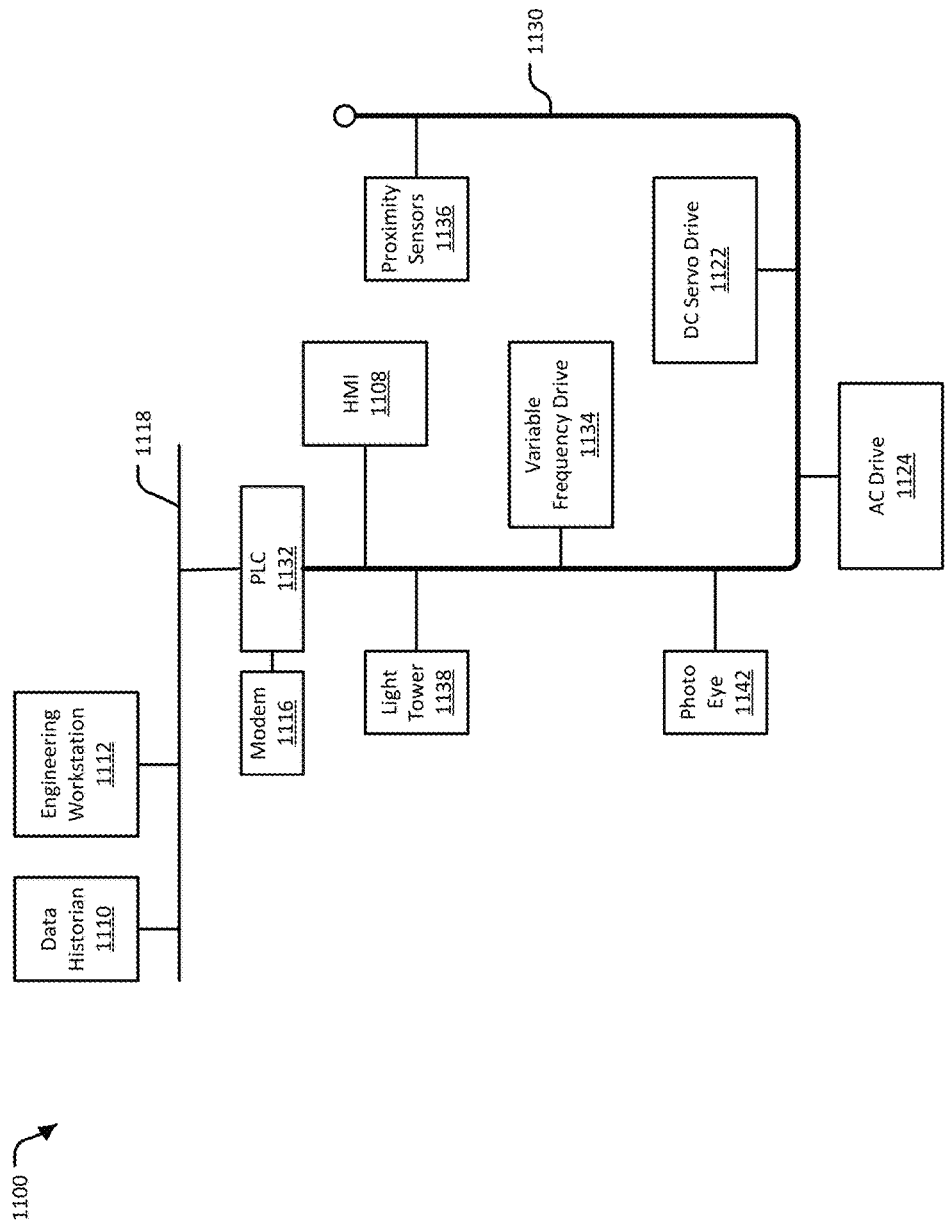
FIG. 11 illustrates an example of a PLC implemented in a manufacturing control process.

FIG. 11 illustrates an example of a PLC 1132 implemented in a manufacturing control process. The PLC 1132 in this example monitors and controls various devices over fieldbus network 1130. The PLC 1132 may be connected to a LAN 1118. An engineering workstation 1112 may also be connected to the LAN 1118, and may include a programming interface that provides access to the PLC 1132. A data historian 1110 on the LAN 1118 may store data produced by the PLC 1132.

The PLC 1132 in this example may control a number of devices attached to its fieldbus network 1130. These devices may include actuators, such as a DC servo drive 1122, an AC drive 1124, a variable frequency drive 1134, and/or a light tower 1138. The PLC 1132 may also monitor sensors connected to the fieldbus network 1130, such as proximity sensors 1136, and/or a photo eye 1142. A human-machine interface 1108 may also be connected to the fieldbus network 1130, and may provide local monitoring and control of the PLC 1132.

Most industrial control systems were developed years ago, long before public and private networks, desktop computing, or the Internet were a common part of business operations. These well-established industrial control systems were designed to meet performance, reliability, safety, and flexibility requirements. In most cases, they were physically isolated from outside networks and based on proprietary hardware, software, and communication protocols that included basic error detection and correction capabilities, but lacked secure communication capabilities. While there was concern for reliability, maintainability, and availability when addressing statistical performance and failure, the need for cyber security measures within these systems was not anticipated. At the time, security for industrial control systems mean physically securing access to the network and the consoles that controlled the systems.

Internet-based technologies have since become part of modern industrial control systems. Widely available, low-cost IP devices have replaced proprietary solutions, which increases the possibility of cyber security vulnerabilities and incidents. Industrial control systems have adopted Internet-based solutions to promote corporate connectivity and remote access capabilities, and are being designed and implemented using industry standard computers, operating systems (OS) and network protocols. As a result, these systems may to resemble computer networks. This integration supports new networking capabilities, but provides less isolation for industrial control systems from the outside world than predecessor systems. Networked industrial control systems may be exposed to similar threats as are seen in computer networks, and an increased likelihood that an industrial control system can be compromised.

Industrial control system vendors have begun to open up their proprietary protocols and publish their protocol specifications to enable third-party manufacturers to build compatible accessories. Organizations are also transitioning from proprietary systems to less expensive, standardized technologies such as Microsoft Windows and Unix-like operating systems as well as common networking protocols such as Transmission Control Protocol/Internet Protocol (TCP/IP) to reduce costs and improve performance. Another standard contributing to this evolution of open systems is Open Platform Communications (OPC), a protocol that enables interaction between control systems and PC-based application programs. The transition to using these open protocol standards provides economic and technical benefits, but also increases the susceptibility of industrial control systems to cyber incidents. These standardized protocols and technologies have commonly known vulnerabilities, which are susceptible to sophisticated and effective exploitation tools that are widely available and relatively easy to use.

Industrial control systems and corporate networking systems are often interconnected as a result of several changes in information management practices, operational, and business needs. The demand for remote access has encouraged many organizations to establish connections to the industrial control system that enable of industrial control systems engineers and support personnel to monitor and control the system from points outside the control network. Many organizations have also added connections between corporate networks and industrial control systems networks to allow the organization's decision makers to obtain access to critical data about the status of their operational systems and to send instructions for the manufacture or distribution of product.

In early implementations this might have been done with custom applications software or via an OPC server/gateway, but, in the past ten years this has been accomplished with TCP/IP networking and standardized IP applications like File Transfer Protocol (FTP) or Extensible Markup Language (XML) data exchanges. Often, these connections were implemented without a full understanding of the corresponding security risks. In addition, corporate networks are often connected to strategic partner networks and to the Internet. Control systems also make more use of WANs and the Internet to transmit data to their remote or local stations and individual devices. This integration of control system networks with public and corporate networks increases the accessibility of control system vulnerabilities. These vulnerabilities can expose all levels of the industrial control system network architecture to complexity-induced error, adversaries and a variety of cyber threats, including worms and other malware.

Many industrial control system vendors have delivered systems with dial-up modems that provide remote access to ease the burdens of maintenance for the technical field support personnel. Remote access can be accomplished, for example, using a telephone number, and sometimes an access control credential (e.g., valid ID, and/or a password). Remote access may provide support staff with administrative-level access to a system. Adversaries with war dialers—simple personal computer programs that dial consecutive phone numbers looking for modems—and password cracking software could gain access to systems through these remote access capabilities. Passwords used for remote access are often common to all implementations of a particular vendor's systems and may have not been changed by the end user. These types of connections can leave a system highly vulnerable because people entering systems through vendor-installed modems are may be granted high levels of system access.

Organizations often inadvertently leave access links such as dial-up modems open for remote diagnostics, maintenance, and monitoring. Also, control systems increasingly utilize wireless communications systems, which can be vulnerable. Access links not protected with authentication and/or encryption have the increased risk of adversaries using these unsecured connections to access remotely controlled systems. This could lead to an adversary compromising the integrity of the data in transit as well as the availability of the system, both of which can result in an impact to public and plant safety. Data encryption may be a solution, but may not be the appropriate solution in all cases.

Many of the interconnections between corporate networks and industrial control systems require the integration of systems with different communications standards. The result is often an infrastructure that is engineered to move data successfully between two unique systems. Because of the complexity of integrating disparate systems, control engineers often fail to address the added burden of accounting for security risks. Control engineers may have little training in security and often network security personnel are not involved in security design. As a result, access controls designed to protect control systems from unauthorized access through corporate networks may be minimal. Protocols, such as TCP/IP and others have characteristics that often go unchecked, and this may counter any security that can be done at the network or the application levels.

Public information regarding industrial control system design, maintenance, interconnection, and communication may be readily available over the Internet to support competition in product choices as well as to enable the use of open standards. Industrial control system vendors also sell toolkits to help develop software that implements the various standards used in industrial control system environments. There are also many former employees, vendors, contractors, and other end users of the same industrial control system equipment worldwide who have inside knowledge about the operation of control systems and processes.

Information and resources are available to potential adversaries and intruders of all calibers around the world. With the available information, it is quite possible for an individual with very little knowledge of control systems to gain unauthorized access to a control system with the use of automated attack and data mining tools and a factory-set default password. Many times, these default passwords are never changed.

Threat Engagement and Deception Escalation

In various implementations, the systems and methods discussed above can be used to implement a network deception system that can automatically and dynamically escalate to engage a network threat. By keeping a network threat engaged, the system can obtain intelligence about the threat, which can be used to defend networks against the same or a similar threat.

Figure 12:
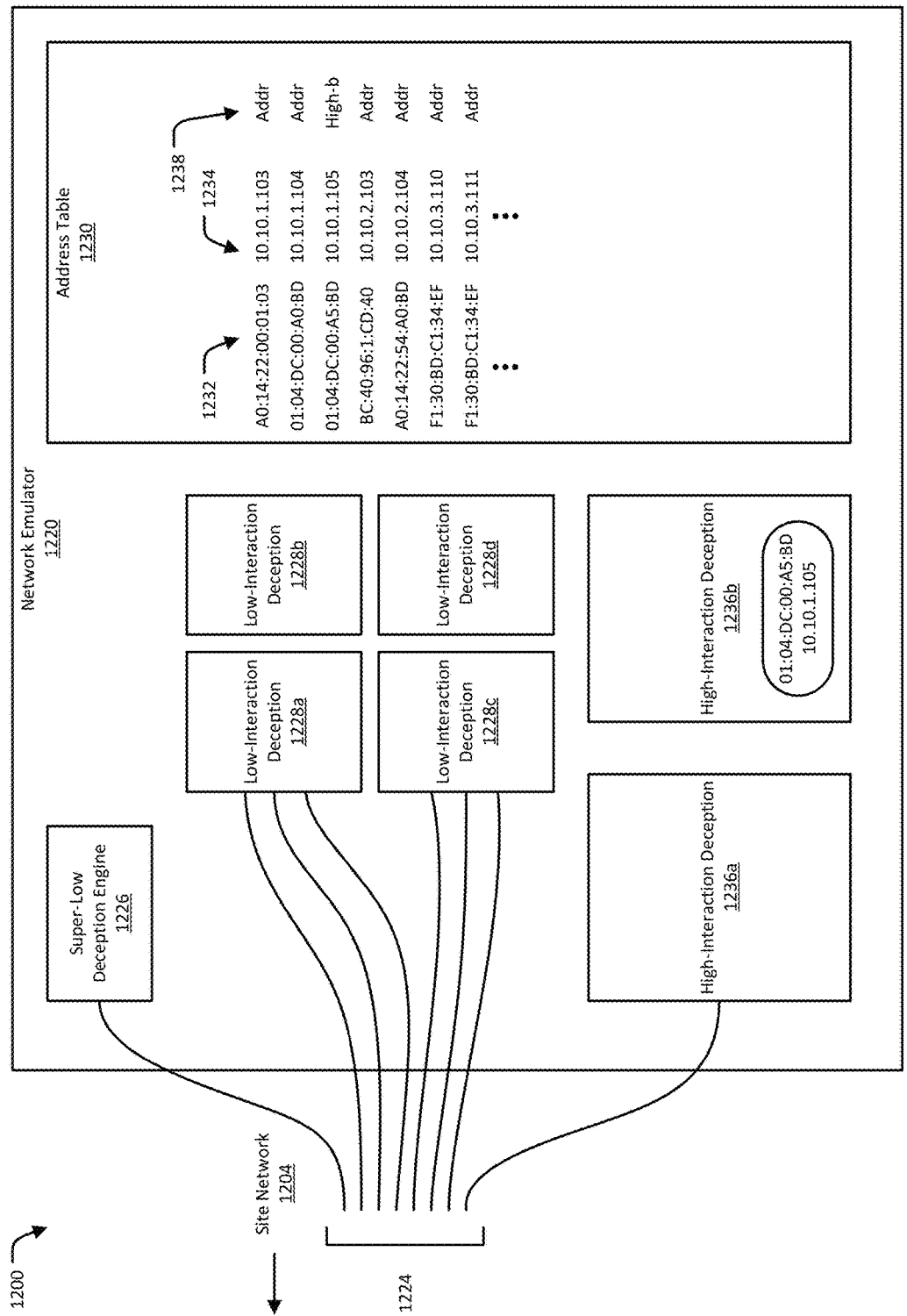
FIG. 12 illustrates an example of a network deception system.

FIG. 12 illustrates an example of a network deception system 1200. In various implementations, the illustrated network deception system 1200 can include three types of deception mechanisms: a super-low deception engine 1226, low-interaction deceptions 1228a-1228d, and high-interaction deceptions 1236a-1236b. Because of the super-low deception engine's association with multiple MAC and IP address pairs, the super-low deception engine 1226 can also be referred to as an address deception engine. Similarly, super-low-interaction deceptions (also referred to herein as super-low deceptions) can also be referred to as address deceptions. Low interaction deceptions and high-interaction deceptions may also be referred to as interactive deception mechanism. The example network deception system 1200 also includes an address table 1230 that stores MAC 1232 and IP 1234 addresses.

In the illustrated example, the deception mechanisms and the address table 1230 are implemented by a network emulator 1220. The network emulator 1220 can have multiple connections 1224 to a site network 1204. The site network 1204 is network installed at a customer site, such as a business, an office complex, an educational institution, or a private home. The site network 1204 may all or in part be located in the "cloud;" that is, some or all of the network may be provided by a network services provider. Multiple connections 1224 can connect the network emulator 1220 to the site network 1204 over multiple various communication mediums (e.g., cables, radio signals, optical cables, etc.). Alternatively or additionally, one or more of the multiple connections 1224 can be individual network conversations carried over one communication medium. Examples of network conversations include Transmission Control Protocol (TCP) sockets and exchanges of User Datagram Protocol (UDP) datagrams, among others.

The network emulator 1220 can be configured to emulate one or more network devices. Network devices can include network hardware, such as routers, switches, hubs, repeaters, and gateway devices, among others. Network devices can also include computing systems connected to the network, such as servers, desktop computers, laptop computers, netbooks, tablet computers, personal digital assistants, and smart phones, among others. Network devices can also include other electronic devices with network interfaces, such as televisions, gaming devices, thermostats, refrigerators, and so on. Network devices can also be virtual, such as virtual machines. In various implementations, the network emulator 1220 can be implemented by one or more network devices. In some implementations, the network emulator 1220 can be implemented by a network device dedicated to providing security services for the site network 1204.

In various implementations, deception mechanisms in the network emulator 1220 can each represent one or more emulated network devices. To aid the deceptions mechanisms in convincingly representing a network device, each deception mechanism can be assigned a realistic looking MAC address 1232. A MAC address, which may also be referred to as a physical address, is a unique identifier assigned to network interface of a network device. MAC addresses 1232 assigned to the deception mechanisms can be, for example, given recognizable Organizationally Unique Identifiers (OUIs), rather than fully random values, to increase the believability of the deception mechanisms. MAC addresses 1232 for the deception mechanisms can be programmed into the address table 1230 by a network administrator. Alternatively or additionally, MAC addresses 1232 may be provided by a configuration file, which can be provided by a network administrator and/or which may be downloaded from a security services provider on the Internet. Alternatively or additionally, an automated system within the network deception system 1200 can examine the site network 1204, and develop a profile describing the type and number of devices in the site network 1204. The network deception system 1200 can then generate MAC addresses 1232 based on the profile.

The network emulator 1220 can associate each MAC address 1232 with an IP address 1234, and store the associated IP addresses 1234 with their MAC addresses 1232 in the address table 1230. IP addresses are numerical strings that identify a network device on a network. IP addresses can be used in some contexts within network communications, while MAC addresses can be used in others. For example, MAC addresses are often not used once a packet leaves a local subnet. Furthermore, IP addresses, unlike MAC addresses, can be transient. For example, each time a laptop computer or handheld device connects to the same network, it may be assigned a different IP address.

Dynamically assigned IP addresses are typically managed and assigned by a server running the Dynamic Host Configuration Protocol (DHCP). The network emulator 1220 may request IP addresses 1234 from a DHCP server operating in the site network 1204, and store these IP addresses 1234 in the address table 1230. By requesting IP addresses 1234 from the DHCP server in the site network 1204, the network emulator 1220 is able to obtain IP addresses 1234 that are within the domain of the site network 1204. Static IP addresses can also be assigned to the network emulator 1220.

Additionally, the site network 1204 can have multiple broadcast domains. A broadcast domain is a logical division within a network, in which all the nodes can reach each other using broadcast packets. As an example, quite often all the network devices connected to the same repeater or switch are within the same broadcast domain. As a further example, routers frequently form the boundaries of a broadcast domain. When the site network 1204 has multiple broadcast domains, in various implementations, the network emulator 1220 can have deception mechanisms for each broadcast domain. For example, in the example of FIG. 12, the network emulator 1220 has obtained IP addresses in three broadcast domains: 10.10.1, 10.10.2, and 10.10.3.

In various implementations, the network emulator 1220 can also periodically request new IP addresses 1234, to mimic network devices disconnecting and reconnecting to the site network 1204. IP addresses 1234 can be refreshed intelligently. For example, the IP address 1234 for a MAC address 1232 that can be associated with a server may not be changed very frequently, if at all, since servers may be taken offline very infrequently, or may be assigned fixed IP addresses. As another example, a MAC address 1232 that is associated with a network interface card typically found in a laptop computer can be changed every morning, to simulate the laptop's owner arriving at work.

In various implementations, the address table 1230 can store the MAC addresses 1232 and associated IP addresses 1234. The address table 1230 can also store assignments 1238, which list the deception mechanism that each MAC 1232 and IP 1234 address is currently assigned to. Generally, as discussed further below, the assignments 1238 can be changed dynamically, in reaction to interactions with the deception mechanisms. Initially, in some implementations, all the MAC 1232 and IP 1234 addresses can be assigned to the super-low deception engine 1226, which is the lightest-weight deception. In some implementations, the network emulator 1220 can include a static high-interaction deception (illustrated in the example of FIG. 12 by the second high-interaction deception 1236*b*), where "static" means that this high-interaction deception 1236*b* is available for interacting with network traffic even before a suspect interaction occurs. This high-interaction deception 1236*b* can thus also have a MAC 1232 and IP 1234 address assigned to it.

Because these addresses 1232, 1234 were generated for decoy network devices, network traffic should ordinarily not be addressed to these addresses 1232, 1234. Not all network traffic for these addresses 1232, 1234, however, is suspect. For example, as discussed below, network traffic that appears to be for a port scan may not be, by itself, an attack on the site network. For this and other examples, the network emulator 1220 can intelligently determine when received network traffic warrants escalating the deception. Such intelligence can include algorithms based on observations of network traffic behavior. Alternatively or additionally, the intelligence can include observation of the site network 1204 and, for example, data science-based algorithms that relate the activity seen in the site network 1204 to possible attacks. Once the network deception system 1200 identifies some particular network traffic received by a deception mechanism as suspect, the network deception system 1200 can initiate a higher level deception to receive the suspect network traffic.

The lowest level deception is a super-low deception. The super-low deception engine 1226 is deception mechanism that can emulate one or more super-low deceptions. In various implementations, a super-low deception includes at least MAC address 1232 and an associated IP address 1234. The super-low deception engine 1226 can have a local table or memory in which it stores address to which it may respond. The network deception system 1200 can assign one or more of the MAC 1232 and IP 1234 address pairs to the super-low deception engine 1226 by adding the MAC 1232 and IP 1234 addresses to the super-low deception engine's local table.

In various implementations, the super-low deception engine 1226 can respond to queries for MAC and/or IP address information. For example, the super-low deception engine 1226 can implement an address resolution protocol (ARP). An address resolution protocol can enable the super-low deception engine 1226 to respond to queries, where the queries include an IP address. In this example, when the super-low deception engine 1226 is queried for an IP address that is in the super-low deception engine's local table, the super-low deception engine 1226 may respond with a MAC address that is associated with the IP address. Other examples of protocols that can be implemented by the super-low deception engine 1226 include Internet Control Message Protocol (ICMP), Network Basic Input/Output System (NetBIOS), finger, and ping, among others.

Address queries may occur, for example, when an attacker is mapping a network and looking for possible points to attack. For example, an attacker can generate queries for all IP addresses in a broadcast domain (e.g., assuming a 32-bit netmask, 10.10.1.0, 10.10.1.1, 10.10.1.2, and so on until 10.10.1.254). Devices that respond not only tell the attacker that the device exists, but may also provide the attacker with the device's MAC address. Once the attacker has a device's MAC address, the attacker may be able to attack the device by directing network traffic at the device, using the device's MAC address as the destination address.

In various implementations, the super-low deception engine 1226 can also minimally respond to other types of broadcast traffic and/or multicast or unicast traffic directed to one of the IP address that is currently assigned to the super-low deception engine 1226. For example, the super-low deception engine 1226 can be configured to respond to some and/or some other system can also respond to some packets associated with TCP, UDP, and ICMP scans. In various implementations, the super-low deception engine 1226 can only respond to network packets that do not require a persistent connection, and/or that require a response that is less complicated than acknowledging the presence of a device on the network.

In some implementations, the super-low deception engine 1226 and/or some other component in the network deception system 1200 can be configured to transmit network traffic, where the network traffic is configured to appear to be coming from an IP address assigned to the super-low deception engine 1226. Network traffic generation can make the super-low deceptions more realistically appear to be real network devices.

When the network emulator 1220 receives suspect network traffic addressed to a super-low deception that may require a more complex reply, in various implementations, the network emulator 1220 can initiate a low-interaction deception 1228*a*-1228*d*, to respond to the network traffic. Network traffic that can initiate an escalation to a low-interaction deception includes, for example, certain TCP packets and UDP packets, such as packets for establishing telnet, File Transfer Protocol (FTP), Secure SHell (SSH), Remote Desktop Protocol (RDP) or another type of connection.

In various implementations, low-interaction deceptions 1228*a*-1228*d* are emulated systems that can configured to receive network traffic for multiple MAC 1232 and IP 1234 address pairs. The low-interaction deceptions 1228*a*-1228*d* can have a basic installation of an operating system, which can have a particular version number but may not account for variations of the operating system due to patches, incremental updates, custom installations, or other factors. In some cases, the low-interaction deceptions 1228*a*-1228*d* can also be configured with a full suite of services that may be offered by real system with the same operating system. In most implementations, the services are fully functional processes, and respond as would the same services running on a real network device. In some implementations, the services may be emulated, and respond in an automated and/or pre-configured fashion. In some implementations, the low-interaction deceptions 1228*a*-1228*d* can also be configured with applications, executing processes, data, and/or databases. In these implementations, the executing processes can be emulating an application, and/or the processes can be actual executing instances of applications. In some implementations, the low-interaction deceptions 1228*a*-1228*d* can also emulate particular hardware, such as a processor type or version, motherboard architecture, and/or attached peripheral devices. In some implementations the low-interaction deceptions 1228*a*-1228*d* can be implemented using one or more computers, servers, blade computers, or some other type of computing system hardware. In some implementations, the low-interaction deceptions 1228a-1228d can be implemented using virtual machines.

In various implementations, the network emulator 1220 can include multiple low-interaction deceptions 1228a-1228d, with each low-interaction deception 1228a-1228d running a different operating system. The network devices in the site network 1204 can be running a variety of different operating systems, such as Red Hat Linux, Ubuntu Linux, Windows 7, Windows 10, OSX, and so on. To mimic network devices that may be found in the site network 1204, the network emulator 1220 can have low-interaction deceptions 1228a-1228d for some or all of the operating systems in use in the site network 1204. In this way, the low-interaction deceptions 1228a-1228d can resemble a typical system that can be found in the site network 1204.

The site network 1204, however, may have multiple variations of the same operating system. For example, various network devices may have the same version of Linux but have different patch levels or installed packages. In most implementations, the network deception system 1200 may not have a low-interaction deception 1228a-1228d for each variation of each operating system, since to do so could potentially require a very large number of low-interaction deceptions 1228a-1228d. Instead, one low-interaction deception 1228a-1228d, executing one version of an operation system, can emulate multiple network devices by being able to receive network traffic addresses to different addresses, where each of these network devices appear to have at least the same version of the operating system.

In various implementations, the network emulator 1220 can keep the low-interaction deceptions 1228a-1228d on standby, so that a low-interaction deception 1228a-1228b is available as soon as suspect network traffic is received for any of the MAC 1232 or IP 1234 addresses being used for super-low deceptions. Alternatively or additionally, the configuration for a low-interaction deception 1228a-1228d can be kept ready, and a low-interaction deceptions 1228a-1228d can be launched when it is needed.

Should a threat source connect to a low-interaction deception 1228a-1228d, however, the threat source may be able to determine that the threat source has connected to a decoy. For example, the threat source may notice that many network devices (that is, the network devices emulated by one low-interaction deception 1228a-1228d) have identical operating systems and services. This may indicate to the threat source that the threat source has found a decoy. The network deception system 1200 thus, in most cases, will not allow connections to low-interaction deceptions 1228a-1228d to complete. The network deception system 1200 can, instead, redirect the connections to a high-interaction deception 1236a-1236b.

The high-interaction deceptions 1236a-1236b are systems configured to respond to network traffic for a specific MAC 1232 and IP 1234 addresses. In some implementations, the high-interaction deceptions 1236a-1236b can be implemented using one or more physical computers, servers, or other computing system hardware. In some implementations, a particular hardware and/or software configuration for a high-interaction deception 1236a-1236b can be emulated using physical hardware. In some implementations, configuring a high-interaction deception to resemble a particle hardware and software configuration (e.g., a Macbook) can be simplified by using the actual hardware (e.g., a Macbook can incorporated into the network deception system). In some implementations, the high-interaction deceptions 1236a-1236b may be implemented using virtual machines.

In various implementations, the high-interaction deceptions 1236a-1236b can execute a specific installation of an operating system, including patches, packages, and other variations of the operating system that a network device in the site network 1204 may have. The specific configuration of the operating system may be based on a real network device in the site network 1204. Alternatively or additionally, the configuration of the operating system may be based on randomized list of available options. Generally, as discussed below, a high-interaction deception 1236a-1236b can be configured with the same basic operation system that is executing on a low-interaction deception 1228a-1228d, so that, when communications from a threat source are transferred to the high-interaction deception 1236a-1236b, the threat source does not see a difference. The operating systems on the high-interaction deceptions 1236a-1236b can otherwise have variations to enhance the believability of the high-interaction deception 1236a-1236b.

The high-interaction deceptions 1236a-1236b can further include applications, data, desktop configuration, desktop icons and short cuts, and/or log files, any of which can be generated so that the high-interaction deception 1236a-1236b resembles a system that is actively in use. The applications, data, desktop configuration, etc. can be copied from actual systems in a site network, and/or can be based and randomized data sets. As discussed further below, the high-interaction deceptions 1236a-1236b can also be configured with software and/or data that appears attractive, and/or misinformation that can misdirect and/or confuse a threat source.

In some implementations, one or more high-interaction deceptions 1236a-1236b can be kept on standby. Initiating a standby high-interaction deceptions 1236a-1236b for use can involve booting and configuring an operating system. In some implementations, a standby high-interaction deception 1236a-1236b may already have an operating system running, and initiating the high-interaction deception 1236a-1236b only requires configuring the operating system. In various implementations, initiating a high-interaction deception 1236a-1236b can also include starting various services that may be offered by a computing system running a particular operating system. In some implementations, a high-interaction deception 1236a-1236b can also be initiated with data, such as various log files that can typically be generated when a network device is in use. Pre-initializing the high-interaction deception 1236a-1236b can help the high-interaction deception 1236a-1236b look like it has been an active system, rather than a system that has just been started.

Once an attack on the site network 1204 has, for one reason or another, ended, a high-interaction deception 1236a-1236b used to engage the attacker can be decommissioned, and the MAC 1232 and IP 1234 addresses the high-interaction deception 1236a-1236b was using can be reassigned to the super-low deception engine 1226 or one of the low-interaction deceptions 1228a-1228d. Processing resources used by the high-interaction deception 1236a-1236b can thus be freed for other uses.

In some implementations, the network emulator 1220 can include a static high-interaction deception 1236b. The static high-interaction deception 1236b can be used, for example, to emulate a server that is always available on the site network 1204. For example, the static high-interaction deception 1236b can be configured as a database server or a shared network resource (sometimes referred to as a network share). To entice attack, the static high-interaction deception 1236b can have open ports and/or data that appears valuable. A static high-interaction deception 1236b can be available at any time, and be assigned a fixed MAC address 1232. Interaction with this MAC address 1232 (or an associated IP address 1234) can escalate from the super-low deception engine 1226 directly to the static high-interaction deception 1236b, without making use of a low-interaction deception 1228a-1228d deception.

In some implementations, an alternate method to implement low-interaction and high-interaction deceptions is to use a network address translation (NAT) mechanism. Network address translation enables a network device to translate network addresses to different network addresses. For example, a network address translation mechanism can present one or more IP addresses 1234, and associated MAC addresses 1232, from the address table 1230 to the site network 1204, while other MAC and/or IP addresses are used by the high-interaction deceptions 1236a-1236b running in the network emulator 1220. Furthermore, the network address translation mechanism can present many addresses to the site network 1204, and map those many addresses to just a few high-interaction deceptions 1236a-1236b. A network address translation mechanism thus enables the network emulator 1220 to emulate many decoy systems without requiring a high-interaction deception 1236a-1236b for each decoy.

Once a possible attacker attempts to access an address presented by the network address translation mechanism, however, the attacker may be able to discover that the address is only a deception. For example, should the attacker log in to the device represented by a MAC 1232 and IP 1234 address combination, the attacker would be logged into a high-interaction deception 1236a-1236b running behind the network address translation. The high-interaction deception 1236a-1236b could likely have a different IP and/or MAC address than was presented to the attacker. The attacker may thus discover that he has been deceived, and stop his attack. A network address translation mechanism may thus serve to divert and distract an attacker, but the low-interaction and high-interaction deceptions described above may be more effective for keeping the attacker engaged.

Figure 13A:
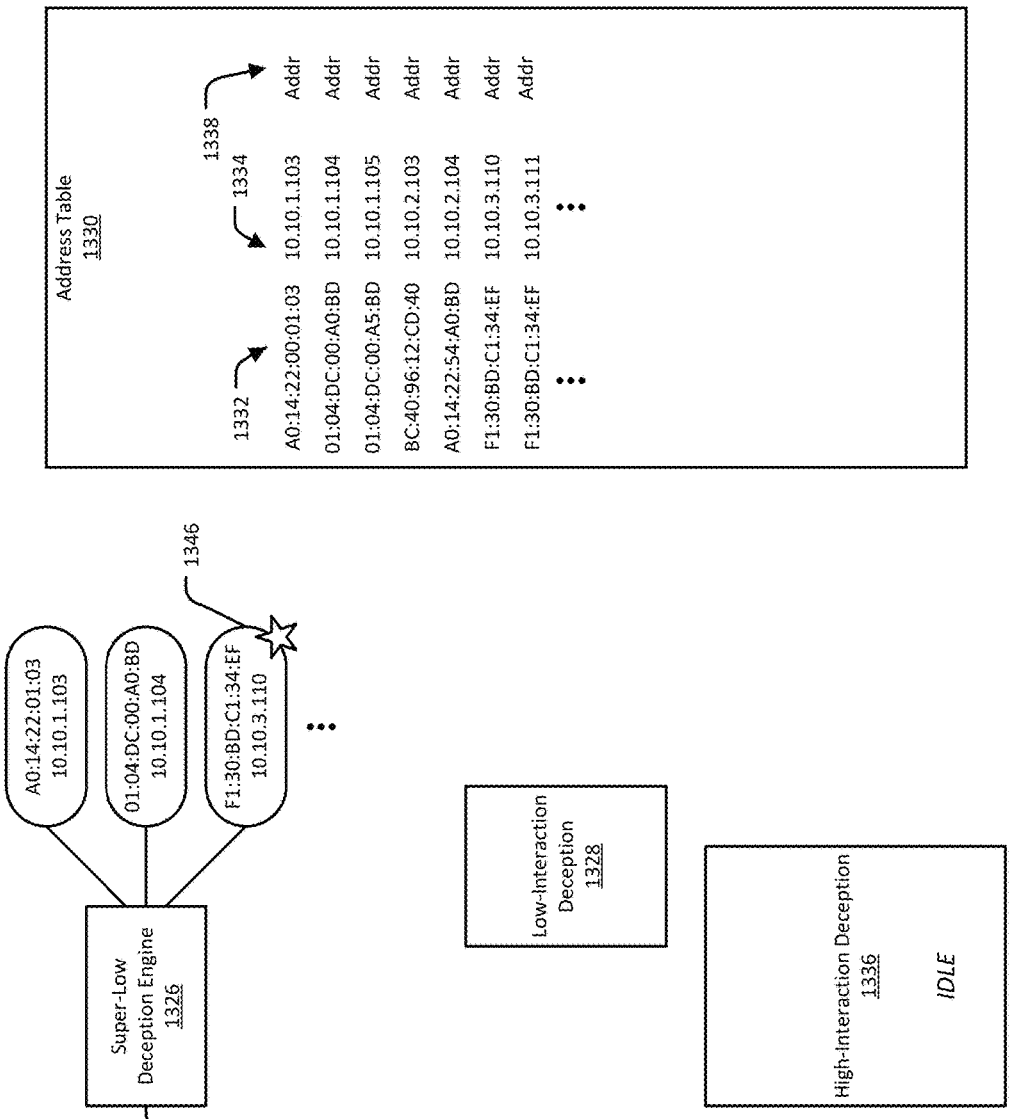
FIGS. 13A-13C illustrate an example of keeping a possible attacker engaged through escalation of the deceptions and reassignment of MAC and IP addresses.
Figure 13B:
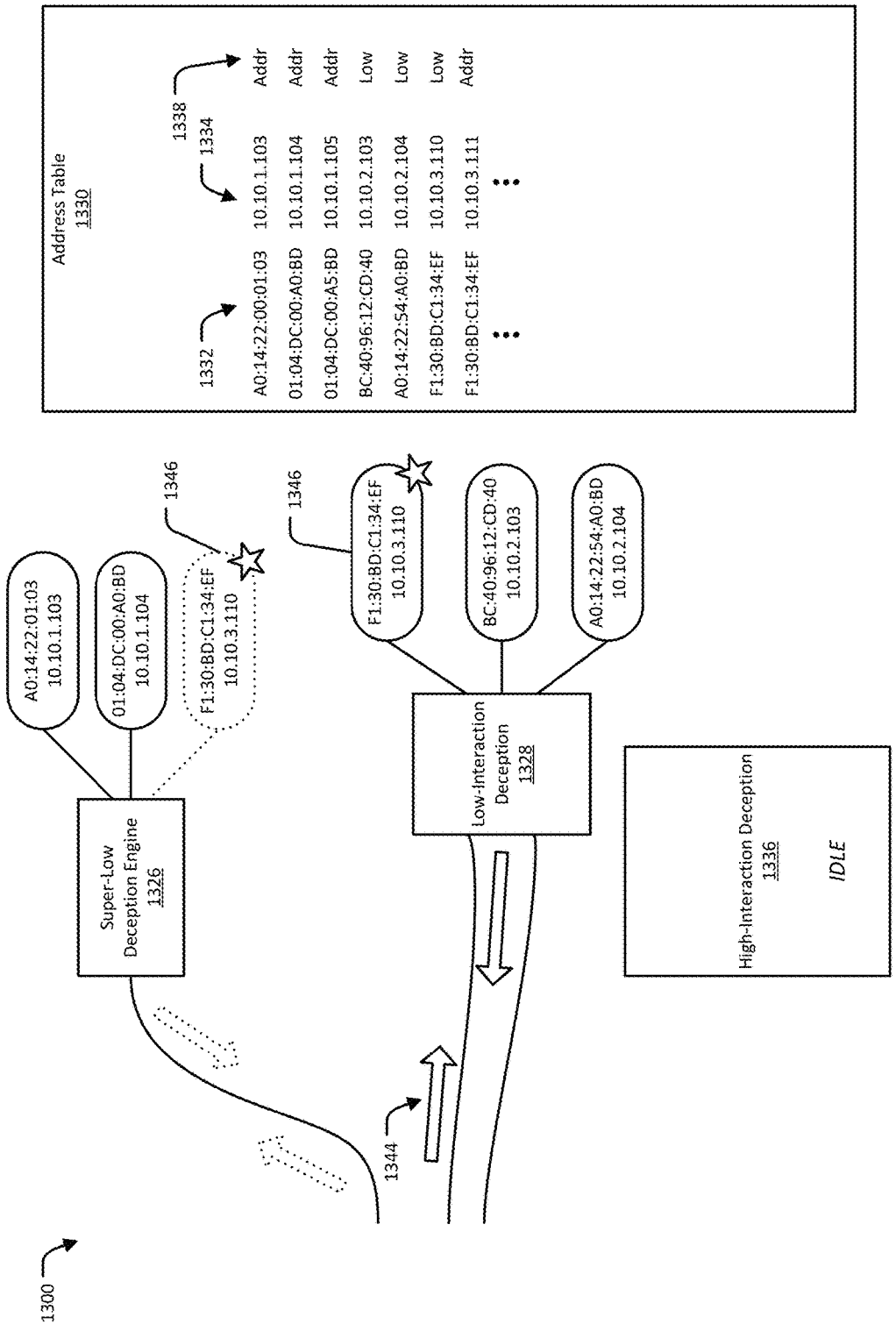
Figure 13C:
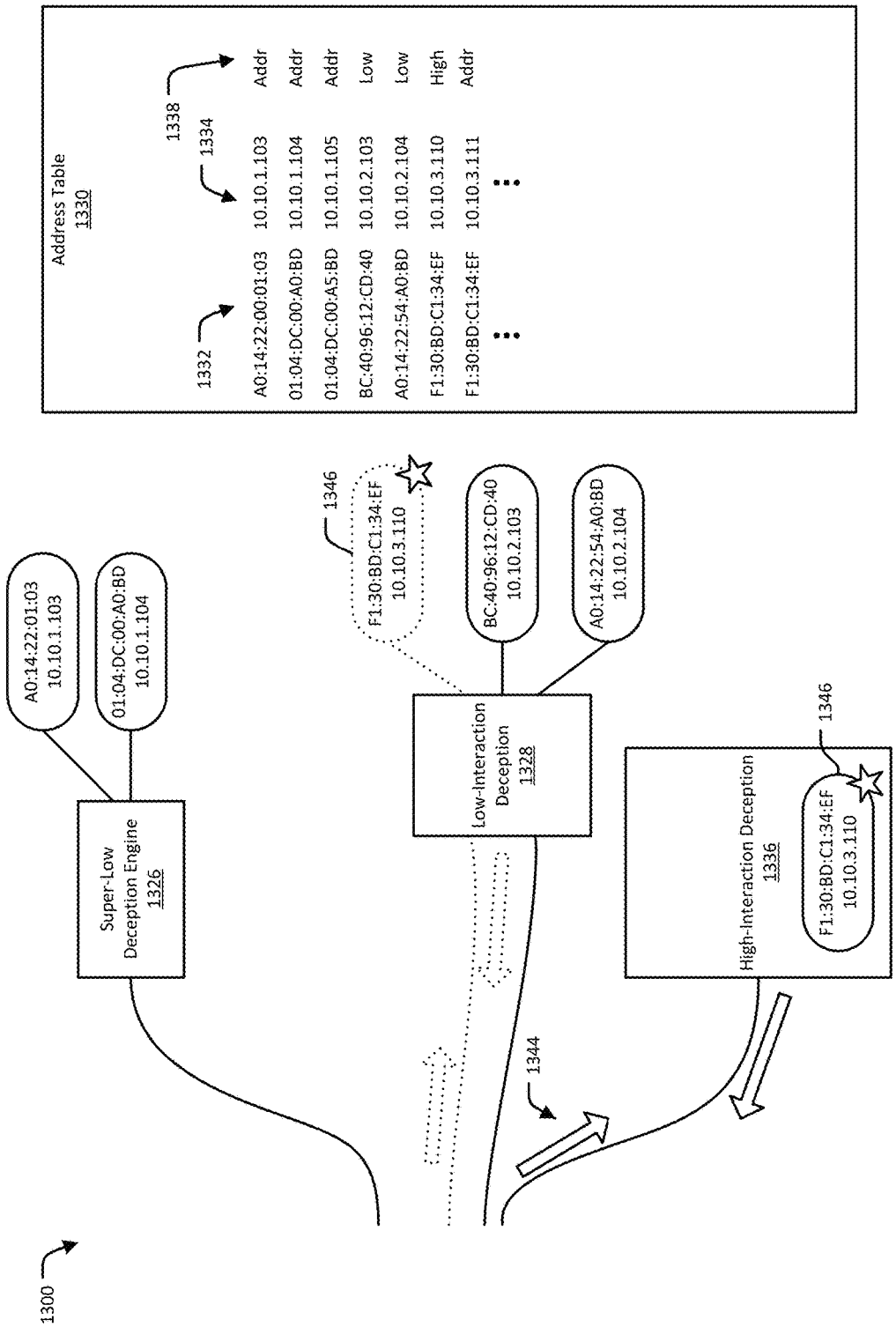

Keeping a threat source engaged may serve to keep the threat away from legitimate and valuable assets in a network. Keeping a threat source engaged can also provide valuable threat intelligence, possibly including identification of a vulnerability the threat source is seeking to exploit, the threat source's tactics, and maybe even identification of the threat source. FIGS. 13A-13C illustrate an example of keeping a threat source engaged through escalation of the deceptions and reassignment of MAC and IP addresses. The example illustrates a network deception system 1300 with various configurations of deceptions mechanisms. In various implementations, the deception mechanisms can be implemented using a network emulator, as discussed above.

The network deceptions system 1300 can include an address table 1330 for storing MAC addresses 1332 and IP addresses 1334 associated with each of the MAC addresses 1332. The MAC addresses 1332 can be configured by a network administrator or an automated process. The IP addresses 1334 can be obtained, for example, from a DHCP server running in a site network. The address table 1330 can also store assignments 1338 for each MAC 1332 and IP 1334 pair, which indicate the deception mechanism to which the address pair is assigned.

FIG. 13A illustrates an example configuration of network deception system 1300, where only address-based deception mechanisms are active. In the illustrated example, the super-low deception mechanisms are hosted by a super-low deception engine 1326. The super-low deception engine 1326 can be configured with some or all of the MAC 1332 and IP 1334 addresses in the address table 1330. The super-low deception engine 1326 can respond to some packets from a site network, such as queries for address information. For example, the super-low deception engine 1326 can implement an address resolution protocol, and respond to IP address queries with the MAC address that is associated with the queried IP address.

In the illustrated example, the system 1300 also has a low-interaction deception 1328 and a high-interaction deception 1336 on standby. The low-interaction deception 1328 and the high-interaction deception 1336 may be running with minimal functionality. Alternatively or additionally, these deception mechanism may not be booted, or may be partially booted. The system 1300 may further have a partial configuration (e.g., an operating system, services, applications, and/or data) prepared for these deception mechanisms.

In some implementations, the network deception system 1300 can also have one or more a low-interaction deceptions 1328 on standby. Standby indicates that the low-interaction deception 1328 and the high-interaction deception 1336 are available, but are idle. The low-interaction deception 1328 may have on operating system running, or may be ready to launch an operating system at any moment. When the low-interaction deception 1328 has an operating system running, it may also have services running, where the services are idle and waiting for network traffic. In some implementations, the low-interaction deception 1328 may be in "sleep" or "hibernate" mode, or some similar mode from which the low-interaction deception 1328 can be quickly woken. In most cases, a low-interaction deception 1328 that is on standby will not have any MAC 1332 or IP 1334 addresses assigned to it, since the low-interaction deception 1328 is not expecting network traffic.

Similarly, the high-interaction deception 1336 may be running or may be ready to launch at a moment's notice. In various implementations, the system 1300 can have a configuration prepared for the high-interaction deception 1336. The configuration can include configuration the high-interaction deception 1336 with a version of the operating system that is configured for the low-interaction deception 1328, so that the low-interaction deception 1328 and the high-interaction deception 1336 can appear to be the same network device. While the high-interaction deception 1336 is idle, in most cases it will not have an MAC 1332 or IP 1334 address assigned to it.

Alternatively or additionally, the configuration for the high-interaction deception 1336 can be taken from a snapshot of either an actual network device or an earlier iteration of a high-interaction deception. A snapshot can include information such as data present on a network device, running processes, log files, logged in user accounts, contents of memory and/or disk, and so on, as of the time at which the snapshot was taken. Using a snapshot from an actual network device (or drawing from snapshots from multiple actual network devices) can make the high-interaction deception 1336 appear authentic and "lived in," meaning in active use. A snapshot of an earlier iteration of the high-interaction deception can have been taken when the high-interaction deception 1336 was previously engaged. Using such a snapshot to configuring the high-interaction deception can make the high-interaction deception 1336 appear to be the same system with which a threat source was previously engaged. A high-interaction deception 1336 that can pick up where a previous high-interaction deception left off can be helpful for threats that persists for long periods of time (e.g., days, weeks, or months), such as Advance Persistent Threats (APTs). The snapshot used to configure the high-interaction deception 1336 can be based on information that can be gleaned about a threat source. For example, when a previously identified threat source re-engages with the network deception system, the high-interaction deception 1336 can be configured using a snapshot taken from the previous engagement.

In the illustrated example, all of the MAC 1332 and IP 1334 addresses are assigned 1338 to the super-low deception engine 1326, due to no other deception mechanisms being presently active. This configuration can reflect, for example, the case where the system is not presently engaged with an active threat.

In the early stages of an attack, a threat source may probe a network to find vulnerabilities and/or valuable data. Probing the network can include looking for address information. For example, the threat source may attempt to identify which IP addresses 1334 are presently in use in the site network. Alternatively or additionally, the threat source may be looking for particular MAC addresses 1332, which can identify particular types of network devices. The threat source may subsequently use this information to identify suitable targets for infiltrating. In these examples, because the threat source's communications 1344 are limited to queries for address information, the network deception system 1300 can receive these communications 1344 using the super-low deception engine 1326.

FIG. 13B illustrates an example of escalation from a super-low deception to a low-interaction deception 1328. As discussed with respect to FIG. 13A, the MAC 1332 and IP 1334 addresses being used by the network deception system 1300 may initially be assigned to the super-low deception engine 1326. The super-low deception engine 1326 can respond to queries for network address information. These queries may can lead to the network deception system 1300 receiving communications 1344 that use a specific MAC and/or IP address combination 1346 as a destination address. In various implementations, the network deception system 1300 executes escalation from a super-low deception to the low-interaction deception 1328 automatically and without need for human assistance.

As illustrated in FIG. 13B, to respond to more complex network communications 1344, the network deception system 1300 can initiate a low-interaction deception 1328. In various implementations, initiating a low-interaction deception 1328 can include de-assigning the MAC address and IP address combination 1346 being targeted by the communications from the super-low deception engine 1326, and reassigning the MAC address and IP address combination 1346 to the low-interaction deception 1328. De-assigning the MAC and IP address combination 1346 from the super-low deception engine 1326 can include removing the MAC and IP address combination 1346 from the super-low deception engine's local table or memory. Assigning the MAC and IP address combination 1346 to the low-interaction deception 1328 can involve, for example, assigning the MAC and IP address combination 1346 to the low-interaction deception's network interface. The address table 1330 can be updated to reflect the updated assignment 1338. As noted above, the low-interaction deception 1328 may be on standby, that is, running in a low-power or idle mode, and thus may only need to be woken upon initiation. Alternatively, the low-interaction deception 1328 can be booted upon initiation. In some implementations, initiating the low-interaction deception 1328 can also include initializing an operating system and/or starting services and/or making various ports available for connections, as discussed further below.

Once the low-interaction deception 1328 has been initiated, communications 1344 from the threat source can be directed to the low-interaction deception 1328. The low-interaction deception 1328 can subsequently respond to these communications 1344.

In various implementations, the low-interaction deception 1328 can be configured to receive network traffic for multiple MAC and IP address pairs. For example, additional MAC 1332 and IP 1334 addresses can be assigned to a network interface (which may be a virtual network interface) of the same low-interaction deception 1328. In this way, the low-interaction deception 1328 can emulate multiple systems. Each of these systems would appear to have a similar operating system and similar services.

The low-interaction deception 1328 can be configured to respond to network traffic, but the network deception system 1300 may determine that some of the network traffic is suspicious. For example, a connection attempt may be suspicious, and may require escalating the deception. Not all connection attempts, however, are necessarily suspect. Some network traffic, such as broadcast packets and port scans, may be from legitimate sources in a site network, or may not have a harmful effect. Some network traffic may be suspicious, but by itself not cause any harm. Port scanners, for example, are one tool used by hackers to identify ports on a network device, and to find one that may be vulnerable to an attack. A port scan, however, does not by itself provide the hacker with access to a network device.

The network deception system 1300 thus can include intelligent systems for determining whether incoming network traffic is associated with a network threat, or is probably harmless. For example, the network deception system 1300 can use a behavior of the network traffic to identify suspect network traffic. For example, the packets associated with a port scan may arrive very rapidly. In an actual attack, there may be delays between the packets, either because a malicious system attempting to make a connection is watching for a particular response, or because the packets are being initiated by a human being. As another example, when a rapid series of packets arrive for different destination address, and the packets all have the same source addresses, it is possible that the packets are for a port scan, and thus may not require escalating the deception.

Alternatively or additionally, the network deception system 1300 can receive information about the site network, and can apply various algorithms, such as data science algorithms, to determine whether some particular network traffic is suspicious. For example, a particular network device in the site network may be behaving suspiciously. The network device can have made a number of connections to a number of Internet sites that are normally not accessed from the site network. Should this network device attempt to connect to any of the MAC 1332 or IP 1334 addresses being used by the network deception system 1300, the network deception system 1300 may immediately initiate a high-interaction deception 1336 to respond.

FIG. 13C illustrates an example of escalation from a low-interaction deception 1328 to a high-interaction deception 1336. As discussed above, the low-interaction deception 1328 may receive a questionable connection attempt, directed at a MAC and IP address combination 1346 assigned to it. In many cases, the network deception system 1300 will avoid letting a connection with the low-interaction deception 1328 to complete.

Instead, the network deception system 1300 can initiate a high-interaction deception 1336, and redirect the connection to the high-interaction deception 1336. Initiating the high-interaction deception 1336 can include de-assigning the MAC and IP address combination 1346 being targeted by the connection attempt, and reassigning the MAC and IP address combination 1346 to the high-interaction deception 1336. For example, the MAC address may be assigned to a network interface card (which may be virtual) used by the high-interaction deception 1336. The address table 1330 can be updated to reflect this change. As noted above, the high-interaction deception 1336 may be on standby, and can be woken upon initiation. Alternatively, the high-interaction deception 1336 can be booted as an initiation step. In some implementations, initiating the high-interaction deception 1336 can also include booting and configuring an operating system. Configuring the operating system can include applying various customizations (e.g., patches and packages) that potentially make one installation of the operating system distinct from another installation. Initiating the high-interaction deception 1336 can also include starting various services and making ports available. In various implementations, the network deception system 1300 escalates from the low-interaction deception 1328 to the high-interaction deception 1336 automatically and without human assistance.

The operating system used by the high-interaction deception 1336 can be at least the same base version as the operating system used by the low-interaction deception 1328. In this way, a threat source may be deceived into believing that he has been interacting with only one system. Similarly, the high-interaction deception 1336 can have the same services that are running on the low-interaction deception 1328. The high-interaction deception 1336 can further have information and data that is only accessible once the possible attacker has established a connection to the high-interaction deception 1336. As discussed further below, this information and data can be selected to make the high-interaction deception 1336 appear particularly attractive for hacking into.

In most cases the high-interaction deception 1336 is intended to convincingly emulate just one network device, and so will only be assigned one MAC and IP address combination 1346 at a time.

Keeping a threat source engaged with the high-interaction deception 1336 may keep the threat source out of the site network. Additionally, once a threat source is engaged with the high-interaction deception 1336, his activity can be closely monitored in order to learn his methods, motivation, and possibly also his identity. The high-interaction deception 1336 can be configured to log all of the threat source's activity, including files downloaded from or uploaded to the Internet, processes initiated on the high-interaction deception 1336, file modifications made to the high-interaction deception 1336, and so on. Any lateral movement by the threat source—that is, the threat source attempting to access another network device—can also be closely monitored. Should the threat source attempt to access another system, the network deception system can respond by initiating another interactive deception to receive and respond to the access attempt. In some implementations, the network deception system can initiate another high-interaction deception. In some cases this new high-interaction deception can be configured with the MAC and IP addresses of a real network device in the site network. In this way, the threat source may be fooled into believing that he is accessing legitimate systems while he is, in fact, contained within an emulated network.

A noted above, the low-interaction deception 1328 can receive a large amount of network traffic, and not all the network traffic is questionable. As also discussed above, the network deception system 1300 can intelligently examine the network traffic received by the low-interaction deception 1328, and determine whether some particular network traffic is questionable.

Figure 14:
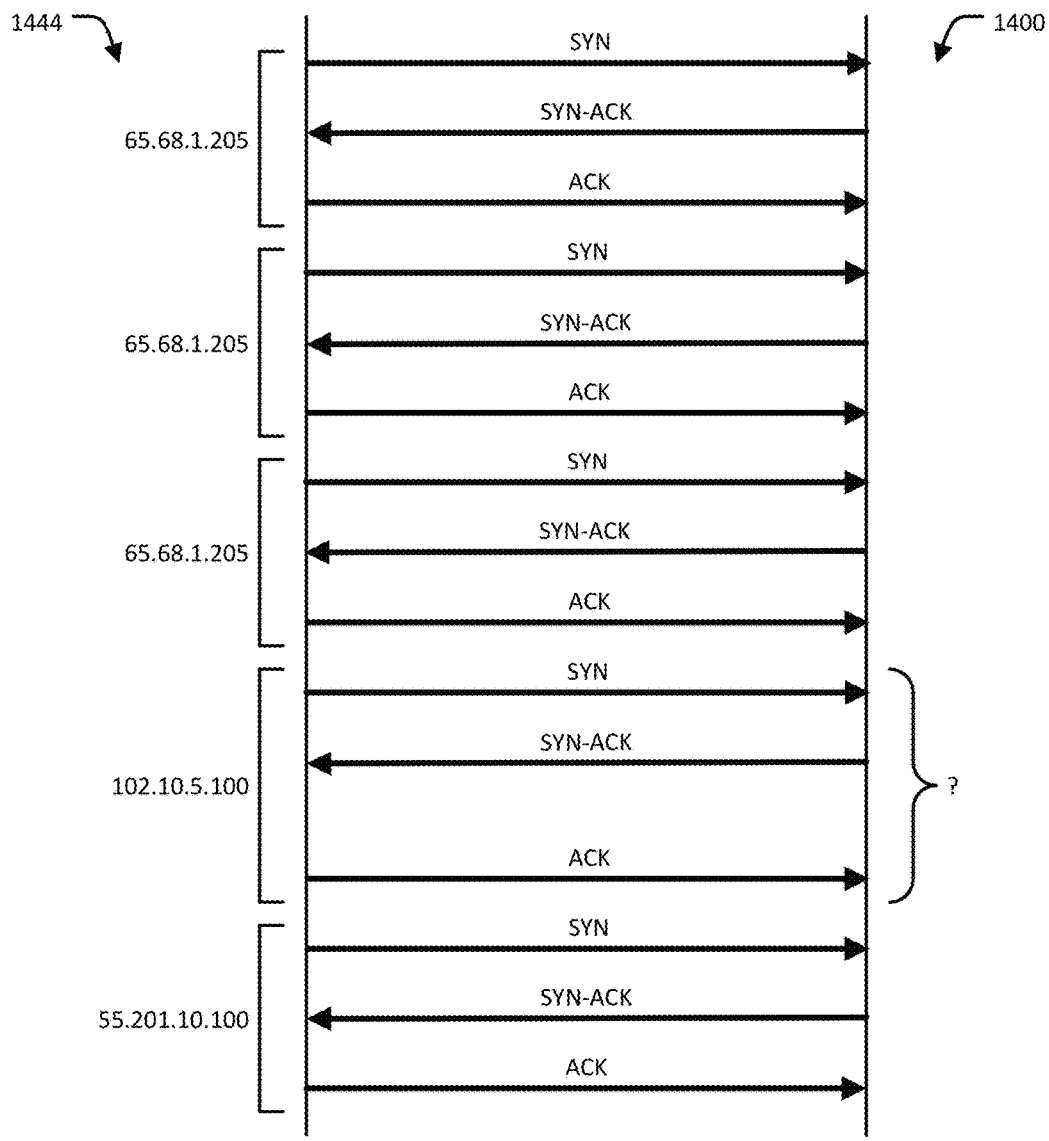
FIG. 14 illustrates several examples of information about network traffic that can be used to identify particular network traffic as questionable.

FIG. 14 illustrates several examples of information about network traffic that can be used to identify particular network traffic as questionable. This example is illustrated using TCP handshake messages (SYN, SYN-ACK, and ACK), which can be used to establish a TCP socket. TCP handshake messages are one example of network traffic that can be received by a network deception system 1400. Other network protocols can similarly use sequences of messages to connect to a network device, transmit data to a network device, and/or obtain data from a network device.

Establishing a connection may be the first step in a conversation between a sending 1444 system and a receiving system. To establish a connection using TCP, the sender 1444 can first send a SYN message. The receiving system, here a network deception system 1400, can respond with a SYN-ACK message, which lets the sender 1444 know that the receiver received the SYN message. The sender 1444 can subsequently send an ACK message, which lets the receiver know that the sender received the SYN-ACK message. Once the receiver receives the ACK message, a connection is established between the sender 1444 and the receiver.

Not every handshake, however, may be an intention to start a conversation. For example, a port scanning tool or a ping process in most cases is not likely to send additional messages after the handshake completes. The network deception system 1400 in most cases avoids initiating a high-interaction deception for connection attempts that may not result in an actual conversation. The network deception system 1400 may, instead, save processing resources for apparent attacks.

To identify possible attacks, the network deception system 1400 can examine, for example, the behavior of incoming network traffic or historical data that captured the flow of data from a particular sender 1444, and attempt to identify network traffic that may be associated with an attack. For example, handshakes initiated by tools and automated processes such as port scans and ping tend to occur very rapidly. That is, there may be a minimal or predictable delay between transmission of the SYN, SYN-ACK, and ACK messages. For example, in the illustrated example, three handshakes from source IP address 65.68.1.205 occurred in rapid succession, with a minimal delay between the SYN-ACK and ACK response. In this example, it may be that these handshakes were initiated by an automated source.

An unexpected delay between the handshake messages may indicate that the handshake from a particular sender 1444 is suspicious. For example, in the illustrated example, there was a delay between the SYN-ACK and ACK in the exchange with source IP address 102.10.5.1200. In this example, a threat source at IP address 102.10.5.1200 may be expecting a particular response pattern, or may be manually entering commands, and is not likely to be able to issue the handshake messages with the regularity or predictability of a tool. Thus a change in a pattern of the handshake messages may indicate that a particular handshake should be redirected to a high-interaction deception.

Other clues about the nature of a sender 1444 may be provided by the sender's network address. For example, when a series of handshake messages are received for sequential target addresses and the handshake messages originate from the same IP address (e.g., source IP address 65.68.1.205 in the illustrated example), it is possible that the messages were generated by a port scanner. As another example, handshake messages coming from the same source IP address, addressed to the same destination IP address, may be coming from a ping process.

Once the network deception system 1400 has identified a particular handshake that is questionable, the network deception system 1400 can redirect the connection attempt to a high-interaction deception. The manner in which the network deception system 1400 redirects the connection attempt may depend on the nature of the connection.

Figure 15A:
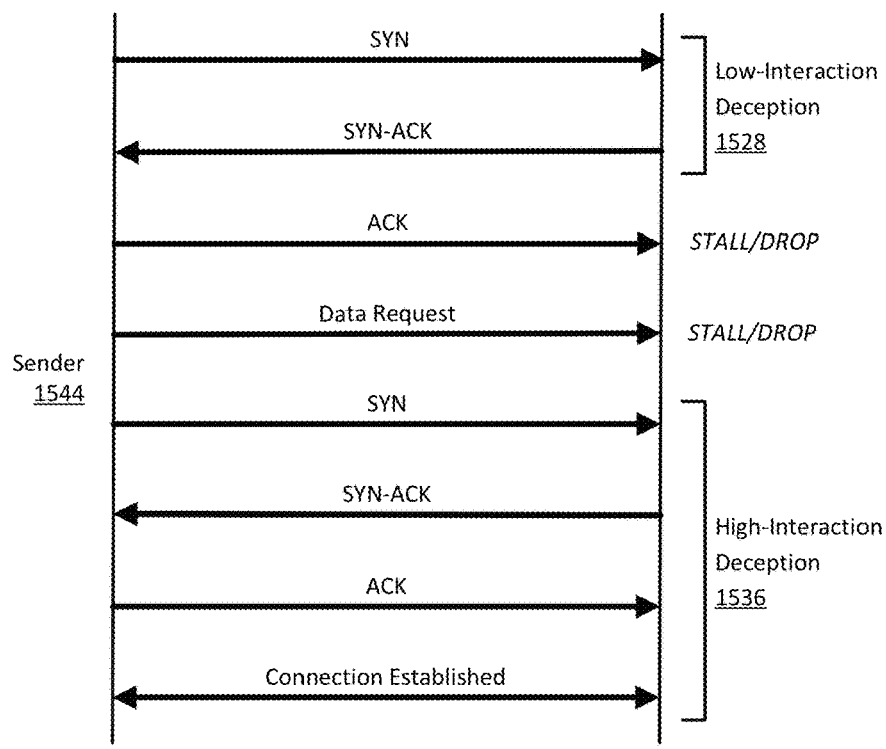
FIGS. 15A-15B illustrate examples of deception escalation when a sender makes various types of connection attempts.
Figure 15B:
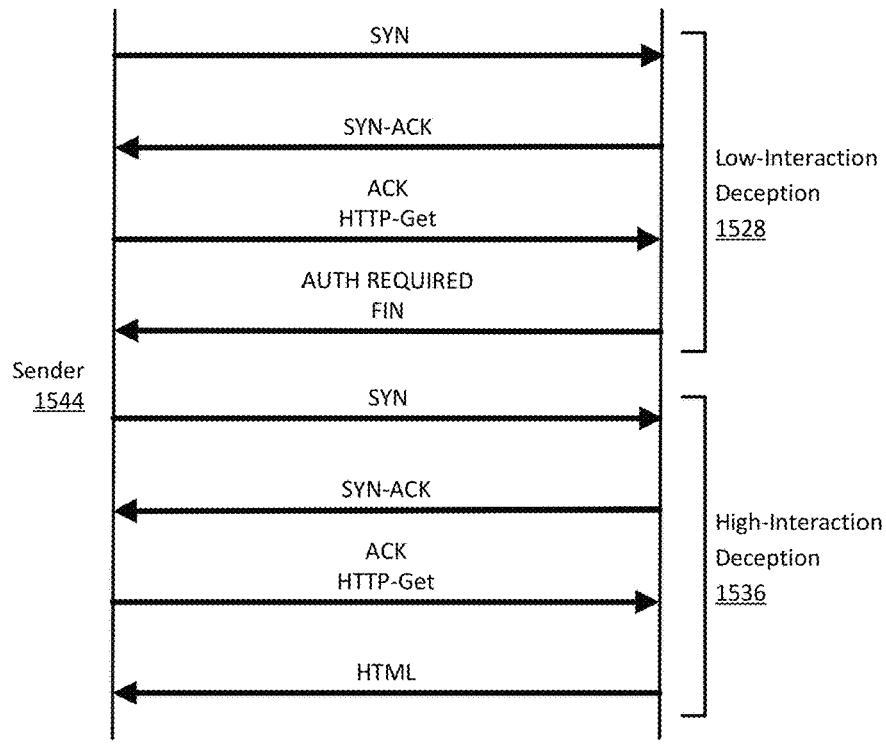

FIGS. 15A-15B illustrate examples of deception escalation when a sender 1544 makes various types of connection attempts. As discussed above, deception escalation means to redirect the sender's communications to a higher level deception mechanism. This redirection is configured to occur seamlessly, so that the sender 1544 may not be aware that it has communicated with different deceptions. Redirection occurs when a network deception system determines that the sender 1544 is a possible threat to the network, and should be kept engaged. When the sender 1544 does not appear to be a threat, its connection attempts can be ignored.

The manner in which communications from the sender 1544 are analyzed and redirected can depend on whether the sender 1544 is attempting a stateful or a stateless connection. A stateful connection occurs when the sender 1544 makes a connection that lasts for the duration of a network conversation. Such a connection can also be referred to as a persistent connection. Examples of persistent connections include those used for server message block (SMB) data exchanges, remote desktop connections, and telnet connections, among others. A stateless connection occurs when the connection between the sender 1544 and the receiver lasts only long enough for data to be transferred, usually from the receiver, after which the connection is terminated by either the sender 1544 or the receiver. Examples of such non-persistent connections include those used for Hypertext Transfer Protocol (HTTP), among others.

FIG. 15A illustrates an example of deception escalation when the sender 1544 attempts a persistent connection. In the illustrated example, the sender 1544 is attempting to establish a TCP connection. In other examples, other network protocols can be used to establish a persistent connection. These other protocol may use a similar exchange of messages.

As discussed above, a sender 1544 can initiate a connection attempt by sending a SYN message to the system with which the sender 1544 wishes to connect. Here, the receiver system is initially a low-interaction deception 1528, configured by a network deception system to respond to network traffic directed at one or more MAC and IP addresses. The low-interaction deception 1528 can respond to the SYN message with a SYN-ACK. Upon receiving an ACK, the network deception system can determine that the sender 1544 is attempting to establish a connection. Because the low-interaction deception 1528 is a decoy, and is not intended for any legitimate use of a network, this connection attempt is automatically suspect.

This suspicion that the sender's connection request is suspect may be further verified by a receipt of a subsequent data request, or some other communication that assumes the connection is available. While it may be possible that a legitimate user of the network has accidentally attempted to connect to the low-interaction deception 1528, the system may be configured to assume that this is not the case.

As discussed above, once the network deception system determines that the sender 1544 is suspect, the network deception system can redirect communications with the sender 1544 to a high-interaction deception 1536. The network deception system attempts to execute this redirection without the sender 1544 noticing. In this example, the network deception system can drop the ACK and subsequent data requests from the sender 1544, or otherwise not respond to these messages. To the sender 1544, lack of response to the data request might look to have been caused by network delays and/or packet drops, both of which are not unusual in a network. While the network deception system is delaying, it may initiate the high-interaction deception 1536, if the high-interaction deception 1536 is not already available. The network deception system can further reassign the MAC and IP address that is the target of the connection attempt from the low-interaction deception 1528 to the high-interaction deception 1536.

Stalling by the network deception system can cause the sender 1544 to retry the connection. In some cases, the sender's computing system hardware or software can automatically retry the connection after a certain delay in receiving responses to data requests. When the sender 1544 retries the connection, the high-interaction deception 1536 can respond and complete the connection. Communications between the sender 1544 and the network deception system can thereafter be with the high-interaction deception 1536, where the sender's activity can be closely monitored.

In some implementations, instead of stalling in order to prompt a retry by the sender 1544, the deception system can slow down the rate at which the system responds to the sender 1544. Generally, delaying by the network deception system is minimal, so that the sender 1544 remains engaged with the system. The delay may be just long enough for the high-interaction deception 1536 to come up and respond "just in time" (e.g., within a realistic response time) to the connection attempt.

In some implementations, the high-interaction deception 1536 may pick up the connection with the sender 1544 before the sender 1544 retries his connection. Packet drops are not an unusual occurrence in most networks. Thus, when the network deception system drops the first data request, the sender 1544 may automatically retry the data request several times before determining that the connection has dropped. The network deception system may drop a few of the data requests, and then have the high-interaction deception 1536 accept and respond to one of the retried requests, before the sender 1544 retries the connection. Further network traffic from the sender 1544 may be received by and responded to by the high-interaction deception 1536.

FIG. 15B illustrates an example of deception escalation when a message exchange is for a non-persistent connection. This example uses the messages exchanged when a sender 1544 requests webpage data using the HTTP protocol. HTTP uses TCP as an underlying protocol. In some versions of the HTTP standard, it is assumed that a TCP connection can be terminated once a webhost has delivered data to a client. Thus the webhost (here, the network deception system) can disconnect after having delivered requested webpage content to a client (here, the sender 1544). HTTP is one example of a network protocol that can use non-persistent connections. Other network protocols can similarly use non-persistent connections.

Because HTTP runs on top of TCP, network deception system can receive a SYN message when the sender 1544 initiates a connection for purposes of retrieving webpage content. The low-interaction deception 1528 can be assigned the MAC and IP address that is being targeted by the sender 1544, and thus can respond with SYN-ACK. The sender 1544 can subsequently send an ACK message, along with an HTTP-GET message, which includes the request for webpage content.

The network deception system can determine that the sender 1544 is suspicious, based on the assumption that no legitimate user should be attempting to retrieve web page content from the low-interaction deception 1528. The network deception system can thus determine to redirect further communication with the sender 1544 to a high-interaction deception 1536.

A actual webhost can respond to the HTTP-GET request and can then terminate the connection. For example, a webhost can respond to the HTTP-GET with a demand for authentication information (e.g., a username and password), and then terminate the connection, expecting the sender 1544 to respond eventually, or not respond at all.

The network deception system can respond to the HTTP-GET request with AUTH REQUIRED accompanied by FIN to cause the sender 1544 to try the connection request again. Alternatively, the network deception system can respond with a timeout message or other indication that the sender 1544 should try his request again. When the sender 1544 retries his connection request, the network deception system can have a high-interaction deception 1536 respond to the handshake messages, and with the requested data. From the sender's point of view, it has had a relatively normal interaction with a web server. In actuality, the sender's communications have been redirected to the high-interaction deception 1536, where the sender's actions can be closely monitored.

For connectionless network protocols, such as UDP, the network deception system can determine whether to escalate to a high-interaction deception based on what is requested by the connectionless network traffic. For example, UDP packets that seek to establish a tunnel may warrant initiating a high-interaction deception to respond to the tunnel request. UDP packets that are merely broadcasting information, however, may not require a response, and thus may not require initiating a high-interaction deception.

The examples of FIGS. 13A-13C discussed escalation from a super-low deception to a low-interaction deception, and then from a low-interaction deception to a high-interaction deception. In some implementations, a network deception system can escalate from a super-low deception directly to a high-interaction deception, without first escalating to a low-interaction deception.

Figure 16:
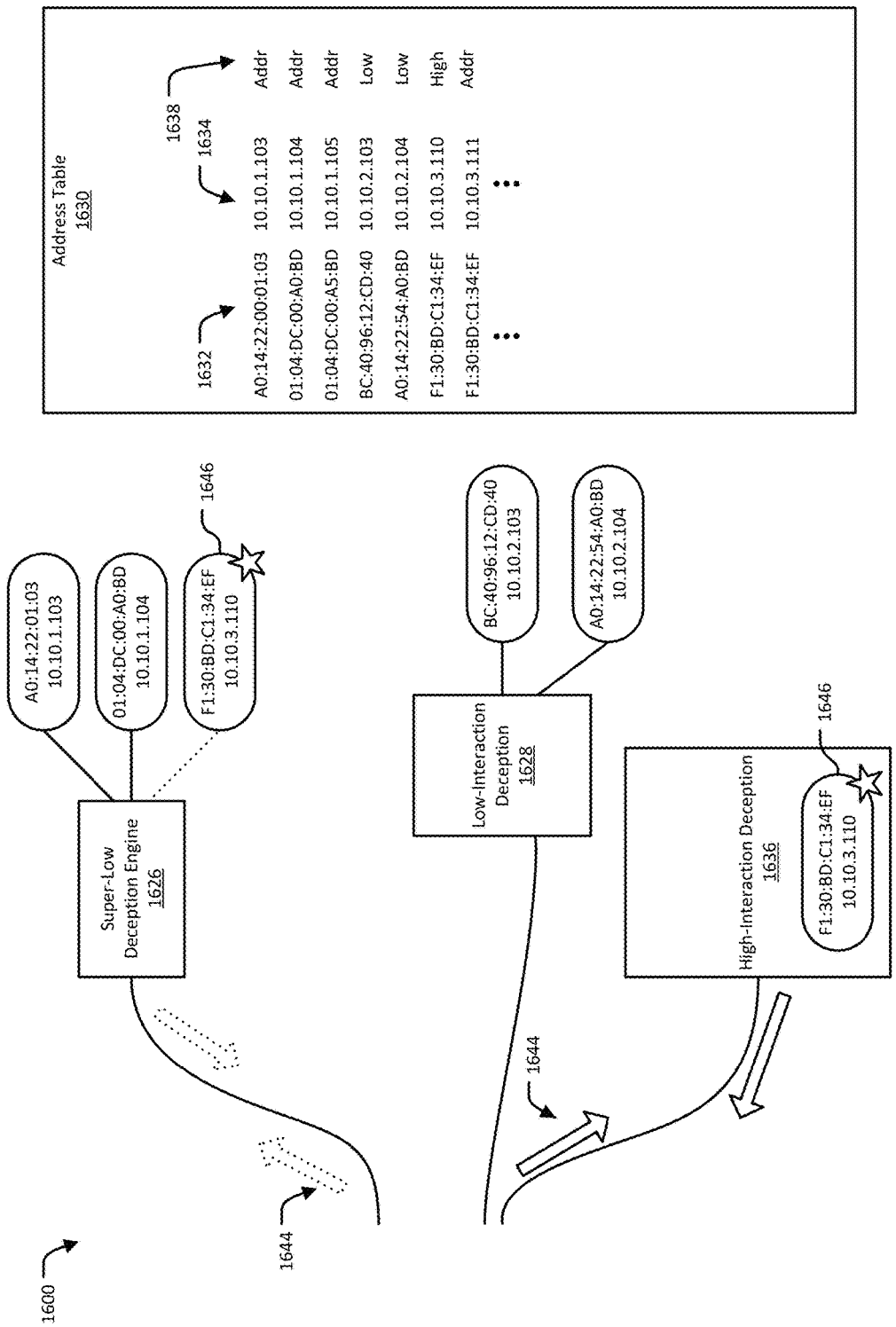
FIG. 16 illustrates an example of a network deception system escalating an engagement from a super-low deception directly to a high-interaction deception.

FIG. 16 illustrates an example of a network deception system 1600 escalating an engagement from a super-low deception directly to a high-interaction deception 1636. The network deception system 1600 can have a super-low deception engine 1626, configured to host multiple super-low deceptions. Each super-low deception can include at least a MAC address 1632 and an associated IP address 1634, which are stored in an address table 1630. The address table 1630 can also include assignments 1638, which indicate to which deception a MAC 1632 and IP 1634 address pair is currently assigned 1638.

The network deception system 1600 can also have an active low-interaction deception 1628. The low-interaction deception 1628 may be emulating one or more network devices, where each network device is represented by a MAC 1632 and IP 1634 address pair. The network devices being emulated by the low-interaction deception 1628 may also be identified by the operating system running on the low-interaction deception 1628.

The network deception system 1600 can also have a high-interaction deception 1636 on active standby. The high-interaction deception 1636 may be static; that is, the high-interaction deception 1636 can be configured with a particular operating system, have a certain set of services and ports available, have interesting and valuable-seeming data, and otherwise look like a system that is available on the site network. The high-interaction deception 1636 can also include vulnerabilities that make the high-interactive deception 1636 look like an attractive target for an attack.

The super-low deception engine 1626 can respond to basic communications 1644 for the MAC 1632 and IP 1634 addresses assigned to the super-low deception engine 1626. For example, the super-low deception engine 1626 can respond to basic "do you have this IP address" queries, among others.

For communications 1644 that are more complex, such as connection attempts, the network deception system 1600 can initiate the high-interaction deception 1636 to respond to these communications 1644. Initiating the high-interaction deception 1636 can include de-assigning the MAC and IP address combination 1646 from the super-low deception engine 1626, and reassigning the MAC and IP addresses combination 1646 to the high-interaction deception 1636. The address table 1630 can be updated to reflect this change. In various implementations, the network deception system 1600 can automatically escalate to the high-interaction deception 1636 without any human aid.

Escalating directly from a super-low deception to a high-interaction deception can be used in various situations. For example, in some implementations, a high-interaction deception can be configured as a fixed decoy in a site network. Additionally, the high-interaction deception may be configured as an attractive hacking target. For example, the high-interaction deception can be configured with open ports and/or data that appear to be valuable. To conserve processing resources, however, the high-interaction deception can be idle or minimally active. The network deception system can bring the high-interaction deception out of an idle state only when the network deception system receives suspect network traffic that targets the MAC and/or IP address assigned to the high-interaction deception.

Responsive Deception Mechanisms

In the examples discussed above, the low-interaction and high-interaction deception mechanism may have pre-determined configurations. Pre-determined configurations can simplify the configuration of a network deception system. In some cases, pre-determined configurations can also enable deceptions mechanisms to be on standby and/or be to be initiated quickly.

In various implementations, instead of using pre-determined configurations, the low-interaction and high-interaction deceptions can be configured in response to particular network traffic received by a network deception system. By dynamically configuring a deception mechanism "just in time" to respond to suspect network traffic, the deception mechanism can be tailored to the suspect network traffic. The deception mechanism may thus be able to present a threat source with something the threat source is looking for, and thereby be better able to engage the threat source.

Figure 17A:
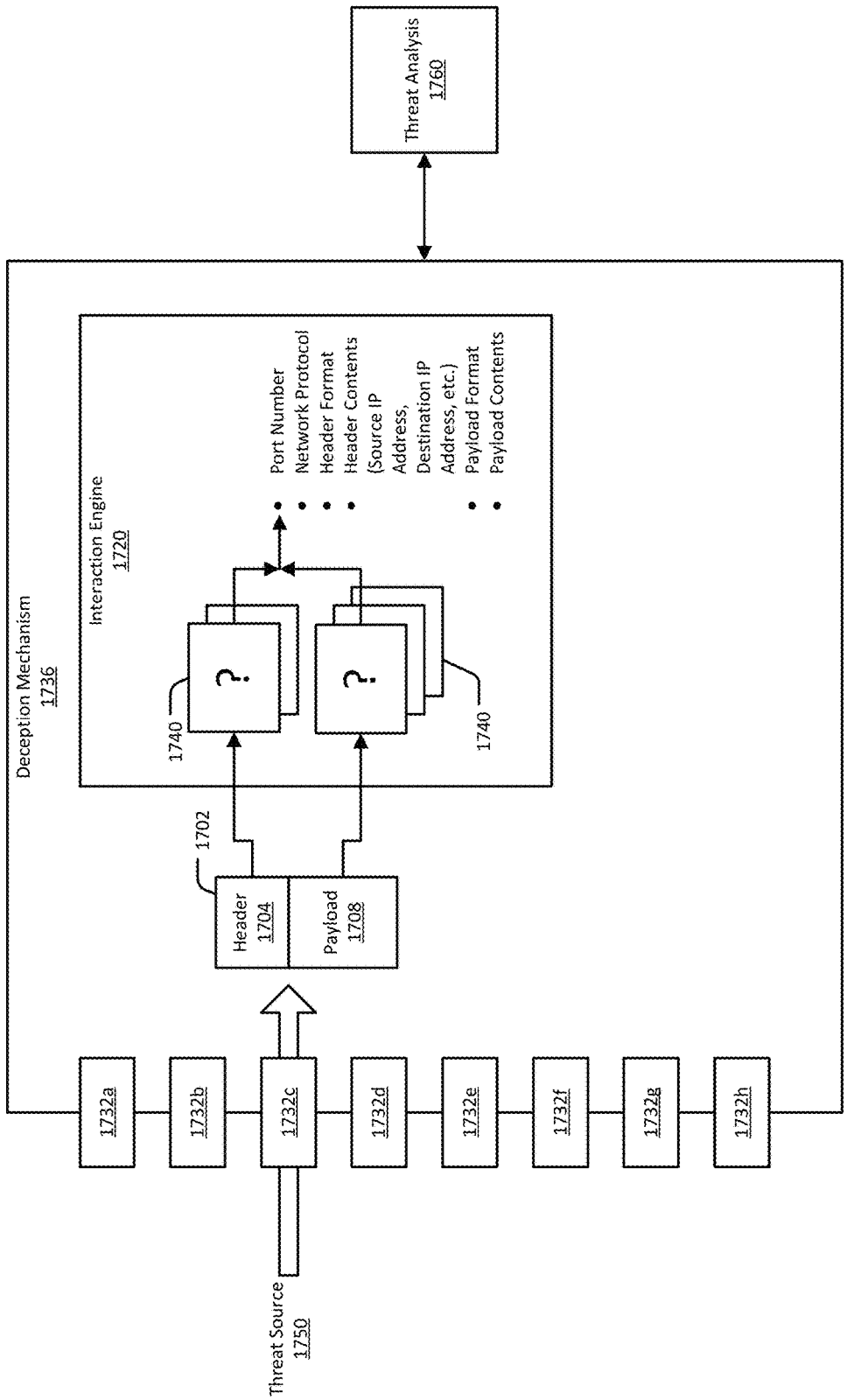
FIGS. 17A-17D illustrate an example of a deception mechanism that can be configured in response to a particular network packet or series of packets.
Figure 17B:
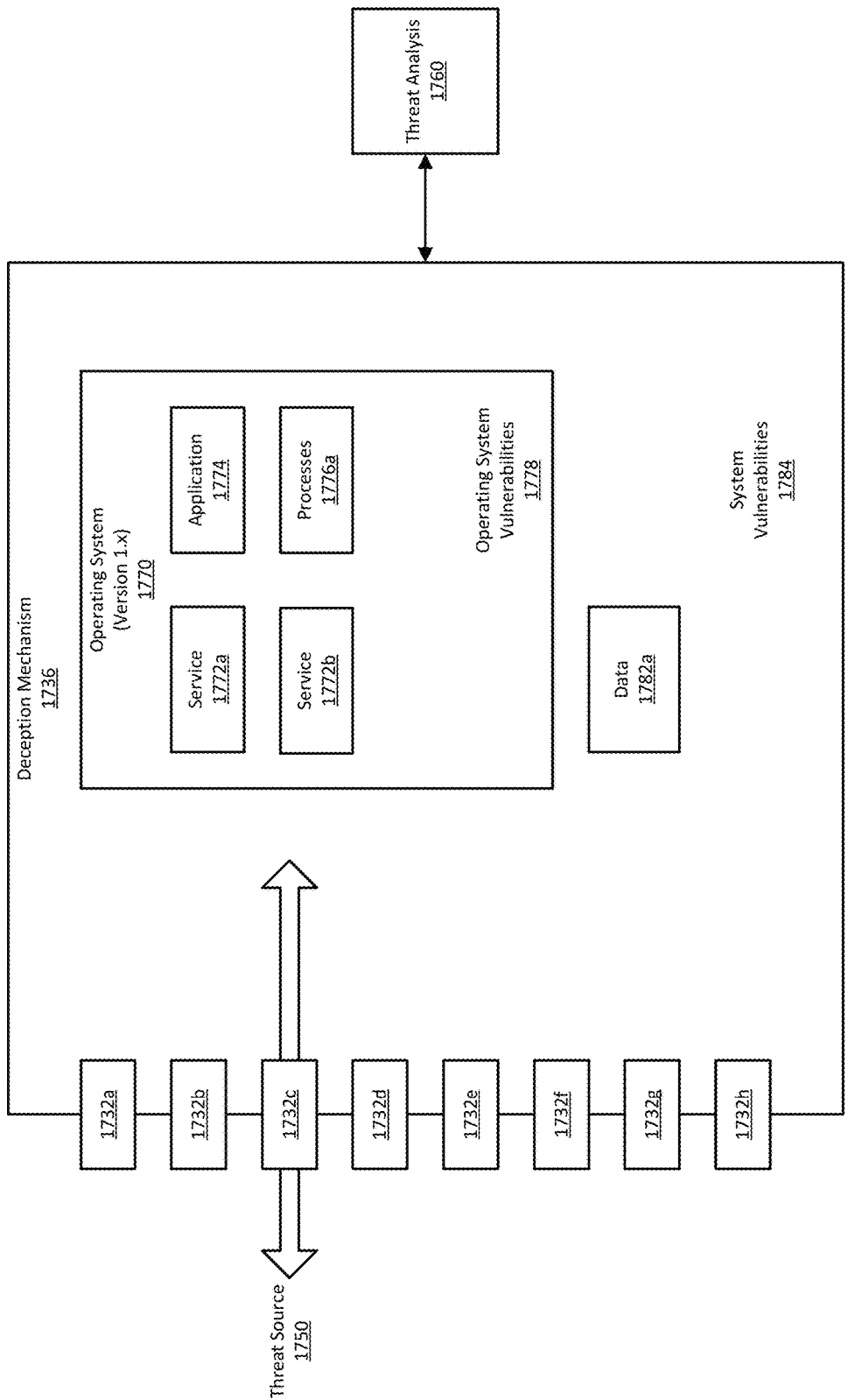
Figure 17C:
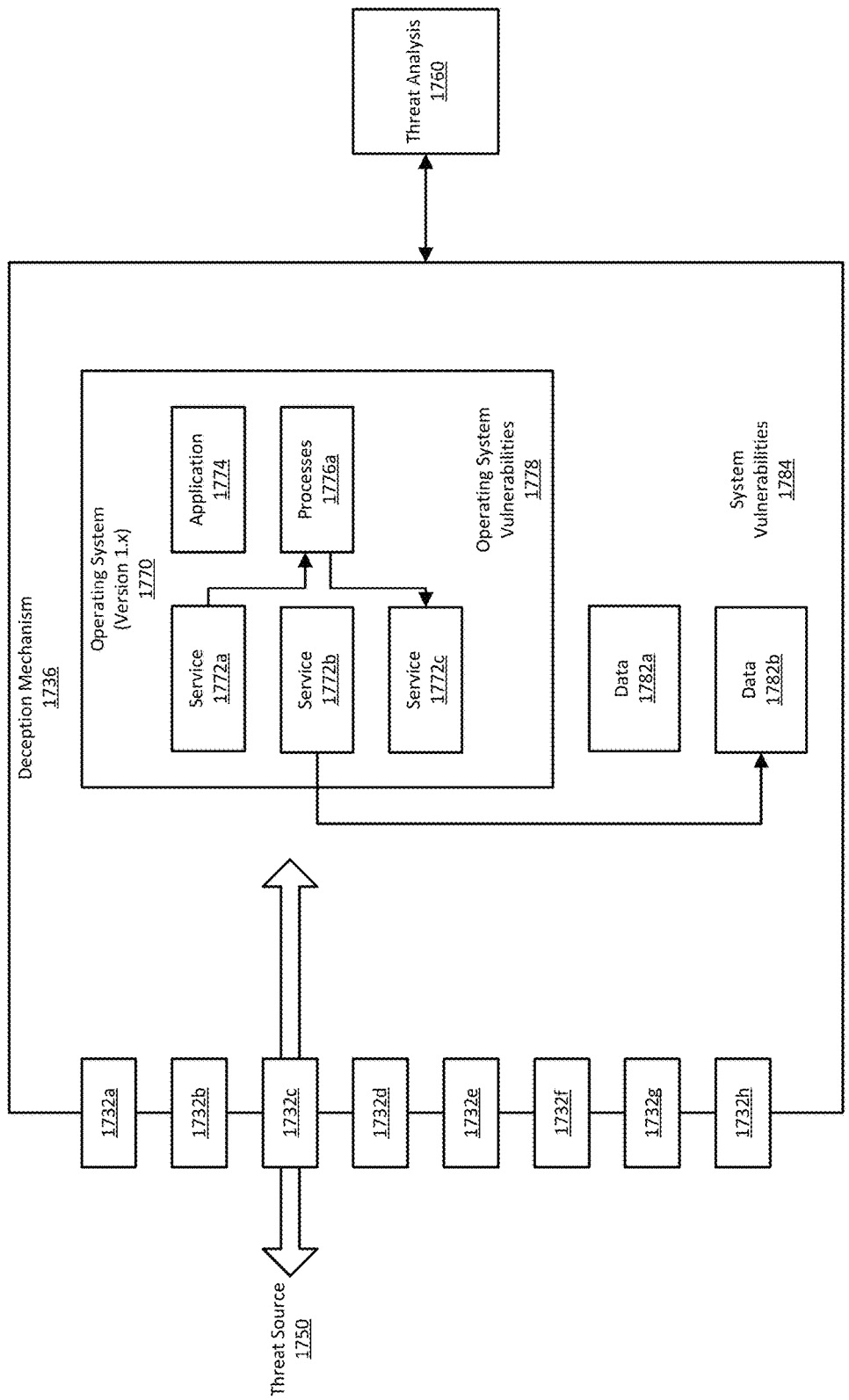

FIGS. 17A-17C illustrate an example of a deception mechanism 1736 that can be configured in response to a particular network packet 1702 or series of packets. In various implementations, the deception mechanism 1736 can be a low-interaction deception or a high-interaction deception. In various implementations, the deception mechanism 1736 can be implement using computing device, such as a mini-computer, a laptop computer, a desktop computer, or a rack-mounted server computer, among other examples. In various implementations, the deception mechanism 1736 can be implemented using a virtual machine. In some implementations, the deception mechanism 1736 can be part of or executing within a network emulator.

In various implementations, the deception mechanism 1736 can be configured with a number of ports 1732*a*-1732*h*. In some implementations, these ports 1732*a*-1732*h* can be physical network connections. In some implementations, the ports 1732*a*-1732*h* can be logical ports, where a port number can be included in the destination address of a received packet. In these implementations, the deception mechanism 1736 can have one or multiple physical network connections. In various implementations, each port 1732*a*-1732*h* is associated with what is commonly referred to as service, and may also be referred to as a protocol. For example, port 21 and 22 can be assigned to FTP, port 23 can be assigned to the telnet protocol, port 25 can be assigned to the Simple Mail Transfer (SMTP) protocol, and so on. The TCP and UDP standards presently define 1024 so-called "well-known" ports and 48,128 registered ports, some of which are reserved, deprecated, and/or unused.

In the example of FIG. 17A, the deception mechanism 1736 has received a packet 1702 from a possible threat source 1750. It may not be known, at this point, whether the threat source 1750 is an actual threat, but it can be assumed since no legitimate source should be sending packets to the deception mechanism 1736. The received packet 1702 can be a single packet, or can be part of a series of packets received packets, or can be part of an exchange of packets between the deception mechanism 1736 and the threat source 1750. The packet 1702 may have been received on a specific port 1732*c*. The received packet 1702 can include a standard header 1704 and may include a payload 1708.

In various implementations, the deception mechanism 1736 can include an interaction engine 1720. The interaction engine 1720 can examine the received packet 1702 (or series of packets, or exchange of packets, as appropriate) and attempt to identify an intent behind the received packet 1702. To make this determination, the interaction engine 1720 can include one or more analysis engines 1740, each of which can be configured to do a specific type of analysis. For example, one group of analysis engines 1740 can examine the packet header 1704 to determine information such as the port number of the port 1732*c* over which the packet 1702 was received, a network protocol used by the received packet 1702, a format for the header (e.g., is the packet an Internet Protocol version 4 (IPv4) or Internet Protocol version 6 (IPv6) packet, or some other version), and/or the contents of the header 1704, such as a source IP address and a destination IP address, among other things. As another example, a group of analysis engines 1740 can example the packet's payload 1708, and, for example, can determine a format of the data and/or identify some of the content in the payload 1708.

Using the information, the analysis engines 1740 may be able to identify an intent behind the received packet 1702. The threat source may be targeting a particular service or data and/or may have particular expertise in exploiting certain defects. For example, the port number can indicate that the threat source 1750 is attempting to establish a telnet, SSH, or remote desktop session with the deception mechanism 1736. As another example, the source IP address can indicate whether the threat source is inside or outside of the site network (that is, the network being defended by the deception mechanism 1736). As another example, the payload format and/or payload contents can indicate that the threat source 1750 is attempting to exploit a particular vulnerability, such as a security hole in an operating system, application, and/or protocol. As discussed further below, the deception mechanism 1736 can then respond to the determined intent.

The deception mechanism 1736 can, at this stage, also attempt to ensure that more packets will be received from the threat source. For example, the deception mechanism 1736 can open an appropriate port 1732*c* (meaning, enabling the port for receiving packets). As another example, if the threat source 1750 is attempting a connection that requires a password, the deception mechanism 1736 can be configured to accept whatever password the threat source provides, or some password after a number of login attempts.

In various implementations, the interaction engine 1720 can determine an intent based on a series or sequence of packets, and/or based on an exchange of packets. In various implementations, the interaction engine 1720 can re-evaluate its determination of the threat source's intent for each received packet 1702. In some implementations, the interaction engine 1720 can be assisted by a threat analysis 1760 system that is in communication with the deception mechanism 1736. In some implementations, intent determination is conducted by the threat analysis 1760 system and/or by another system that is in communication with the deception mechanism 1736.

FIG. 17B illustrates an example of a configuration of the deception mechanism 1736 that resulted from the analysis by the interaction engine 1720. In the illustrated example, the deception mechanism 1736 has been configured with a particular software, data 1782*a*, and hardware environment. The software environment includes a particular operating system 1770, some services 1772*a*-1772*b*, an application 1774, and some running processes 1776*a*. The operating system 1770 has further been configured to include some known operating system vulnerabilities 1778. The deception mechanism 1736 has also been configured with system vulnerabilities 1784, which can include hardware, firmware, and/or Basic Input/Output System (BIOS) vulnerabilities, among others.

In various implementations, one or more of the components of the deception mechanism's configuration can have been configured to satisfy the apparent intent of the threat source 1750. For example, the intent may be to exploit a vulnerability known to exist in a particular version of a particular operating system type. For example, Linux version 1.1 may have a known security hole. In these examples, the deception mechanism's operating system 1770 can be configured to match the determined operating system type and version. As another example, the intent may be to establish a RDP connection in order to hunt for valuable data. In this example, one of the two services 1772*a*, 1772*b* can be RDP, and a running process 1776*a* can be a decoy RDP session. As another example, the intent may be to exploit a security flaw in a document editor or reader, in which the case the application 1774 can be the flawed document editor or reader. As another example, the intent may be to exploit a security bug in standard library, such as the OpenSSL cryptography library (a bug known as Heartbleed). In this example, an older version of the OpenSSL library, which is known to have the bug, can be loaded into the operating system 1770.

The data 1782a for the deception mechanism 1736 can also be generated to suit the intent of the threat source 1750. For example, the intent may be to locate a particular type of file storage system (e.g., MongoDB, Dropbox, Box, or a system from another vendor), in which case the data 1782a can be organized according to the particular file storage system. Additionally, the data 1782a can include seemingly valuable files. As another example, the intent may be to look for additional systems to exploit. In this example, the data 1782a can include, for example, email address books (also referred to as contacts lists) and decoy log files for telnet, RDP, and/or SSH sessions. In this example, the address books can include decoy email addresses, such that, should the threat source 1750 send email to the decoy addresses, the emails can be intercepted and analyzed. In the case of the decoy log files, the log files can include decoy IP addresses, and be formatted to appear as if a user conducted sessions with the decoy IP addresses.

In some cases, the intent of the threat source 1750 may not be entirely clear. In these cases, the deception mechanism 1736 can be configured with software and/or data 1782a that may attract the attention of the threat source 1750. For example, current threat intelligence may indicate that hackers have been releasing ransomware that locates and encrypts databases. In this example, the deception mechanism 1736 can be configured with such a database. As another example, the security community may have recently learned of a flaw in a certain application, for which a fix may not yet be available or for which the fix may not yet have been widely distributed. In this example, the deception mechanism 1736 can be configured with an un-patched version of the application.

In various implementations, the operating system 1770, some of the services 1772a-1772b, the application 1774, the processes 1776a, and/or the data 1782a may not be configured to meet the intent of the threat source 1750 or to attract the attention of the threat source 1750. Instead, the software and/or data 1782a may be configured so that the deception mechanism 1736 resembles a fully functional and actively used system.

In some implementations, the deception mechanism 1736 can also be configured to discourage non-threatening sources, such as legitimate users, from accessing the deception mechanism 1736. For example, should a legitimate user connect to the deception mechanism 1736, the user can be presented with a banner or message the informs the user that she is not supposed to logged on to this system. The message can include, for example, dire consequences, such as being reported to management. The average user is likely to disconnect from the deception mechanism 1736 upon seeing such a warning.

A threat source, however, is likely to ignore the warning or be enticed by the warning. Alternatively, the threat source may be a program or other automated system that ignores any such messages. Additionally, legitimate users may not notice or be interested in attractive-seeming decoy data 1782a, an application 1774 with a security flaw, or operating system vulnerabilities 1778. Should the threat source 1750 make use of the services 1772a-1772b or application 1774, engage with the process 1776a, and/or access the data 1782a, this may be further evidence that the threat source 1750 is a true threat, and not an innocent user.

Once the threat source 1750 is engaged, the deception mechanism 1736 can be configured to keep the threat source 1750 engaged. FIG. 17C illustrates an example of a reconfiguration of the deception mechanism 1736 that can be based on further interactions with the threat source 1750. In the illustrated example, it may be that the threat source 1750 engaged with a service 1772a, and based on that interaction, it can be determined that the threat source 1750 is seeking to interact with another service 1772c. For example, the threat source 1750 may have started a telnet session and found a running RDP session among the processes 1776a. In this example, the threat source 1750 may next try to connect to the running RDP session. The deception mechanism 1736 may thus launch RDP to receive the threat source's RDP connection. As another example, the threat source may have initially engaged the deception mechanism 1736 using the using the Server Message Block (SMB) protocol. SMB can be used to access file directories shared over a network. Hence, in this example, the deception mechanism 1736 can be configured with additional data 1782b, configured as a share directory. The additional data 1782b can further be configured to appear valuable.

In various implementations, in addition to modifying the configuration of the deception mechanism 1736, the network deception system can escalate the deception. For example, the deception mechanism 1736 may be a low-interaction deception, and before continuing the engagement with the threat source 1750, the system can initiate a high-interaction deception to take over the engagement. In this example, the configuration of the deception mechanism 1736 can be ported to the high-interaction deception, so that the high-interaction deception has the same operating system 1770, services 1772a-1772b, application 1774, processes 1776a, and data 1782a that the threat source 1750 may have previously seen while engaged with the low-interaction deception.

Figure 17D:
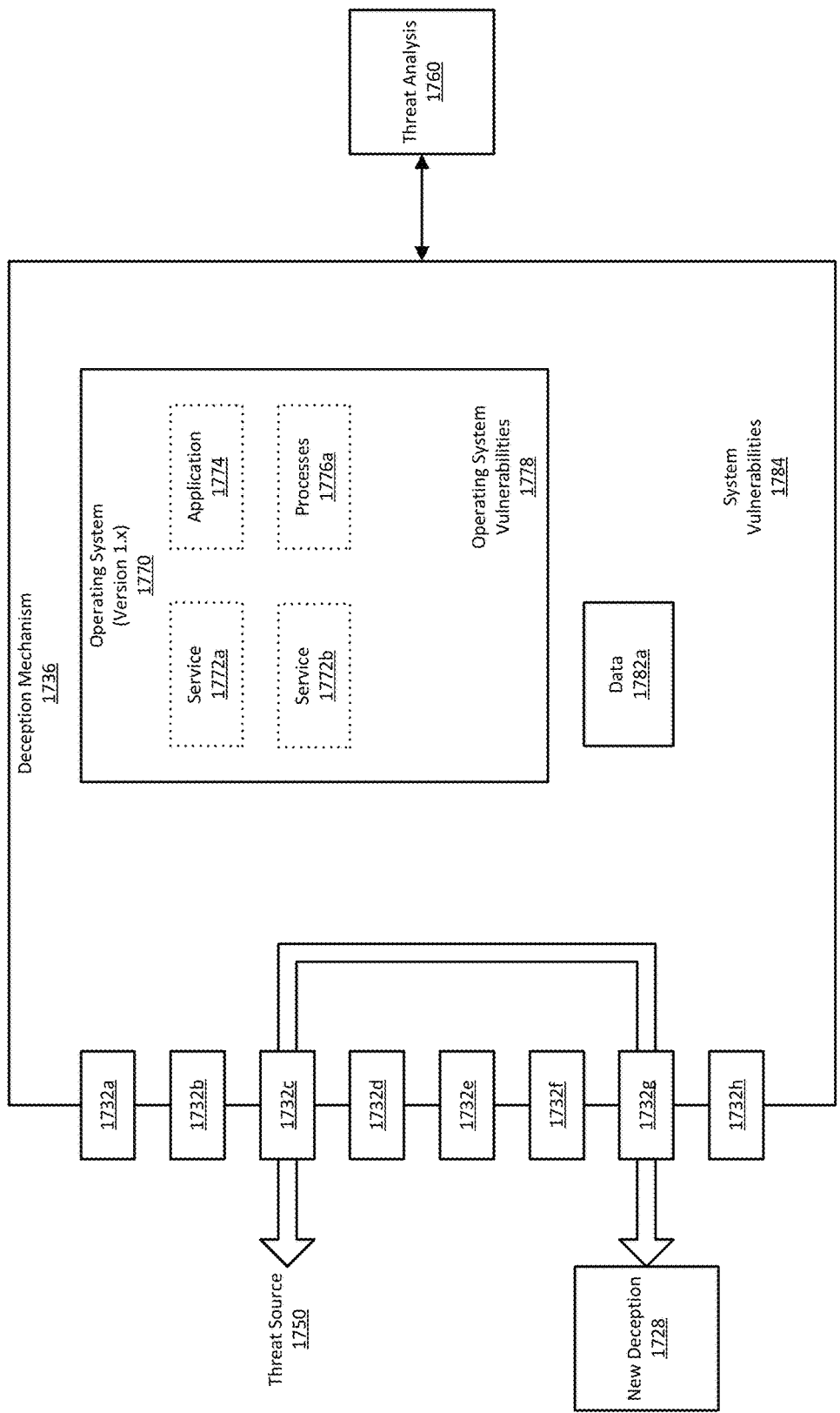

In some cases, keeping the threat source 1750 can require other measures. FIG. 17D illustrates one such other measure. In some cases, the threat source 1750 may be looking for other systems to exploit. For example, the threat source 1750 may be malware, which is attempting to place itself on every network system that the malware can reach. Alternatively or additionally, the threat source 1750 may not have found what the threat source 1750 was looking for on the deception mechanism 1736, and/or the threat source 1750 may have been looking for one thing and has decided to look for something else, and/or the interaction engine 1720 may have incorrectly guessed the threat source's intent.

In these and other examples the threat source 1750 may use data 1782a obtained from the deception mechanism 1736 to log into another system. In various implementations, the data 1782a can include decoy IP addresses, such that the threat source 1750 is encourage to attempt to connect to one of these decoy IP addresses.

As illustrated in FIG. 17D, the network deception system can determine that the threat source 1750 is attempting to establish a connection with a decoy IP address. For example, the deception mechanism 1736 may capture input from a process launched by the threat source, where the input includes commands used to establish a network connection. As another example, the deception mechanism 1736 may capture outbound packets targeted to the decoy IP address.

In these and other examples, the network deception system can configure a new deception 1728, and assign the new deception 1728 the decoy IP address that that the threat source 1750 is attempting the reach. In various implementations, the new deception 1728 can be configured using information that the deception mechanism 1736 has determined about the threat source 1750. In various implementations, the new deception 1728 can also be dynamically reconfigured to respond to interactions from the threat source 1750.

In various implementations, once it is apparent that the threat source 1750 has moved one, the deception mechanism 1736 can shut down the services 1772*a*-1772*b*, application 1774, and processes 1776*a*, to conserve computing resources.

In the above examples, by dynamically configuring and reconfiguring the deception mechanism 1736 in response to communications from the threat source 1750, the threat source 1750 can potentially be kept engaged. Keeping the threat source 1750 engaged can have the benefit of keeping the threat source 1750 away from actual network systems and truly valuable data. Additionally, the deception mechanism 1736 can be used to gather intelligence about the threat source 1750. For example, it may be possible to determine the threat source's methods, such as tools the threat source is using. As another example, the threat source's activity may reveal a previously unknown software, firmware, and/or hardware vulnerability. As another example, it may be possible to identify types of targets that malicious actors are presently after. As another example, it may be possible to trace a threat source and find its origin.

Dynamically reconfiguring the deception mechanism 1736 can also have the benefit of avoiding littering a site network with traps that unwary, legitimate users can fall into. Instead, a trap can be set up if a suspect interaction is detected, and more traps can be set up to engage the interaction. Legitimate users are more likely to disengage, thus avoiding the need for more traps.

In various implementations, the techniques discussed above for escalating and configuring deceptions in a context-aware manner, to respond to interactions with a threat source, can be extended to include the network neighborhood of the deceptions that are in actual communication with the threat source. For example, while a threat source is engaged with a high-interaction deception, based on that engagement, a network deception system can actively reconfigure the network emulated around the high-interaction deception. For example, the network can be made to appear to have certain virtual local area networks (VLANs), certain types of serves (e.g., database servers, web servers, etc.), and/or certain network services (e.g., virtual private networks (VPNs), network sharing, etc.). In this and other examples, the apparent network can be emulated and/or can use low-interaction and/or high-interaction deceptions to represent various network resources.

Specific details were given in the preceding description to provide a thorough understanding of various implementations of systems and components for network threat engagement and deception escalation. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for network threat engagement and deception escalation.

What is claimed is:

1. A method performed by a deception system on a network, comprising:
    configuring a network interface of the deception system with a list of Media Access Control (MAC) addresses and Internet Protocol (IP) addresses, wherein each MAC address in the list is associated with an IP address in the list, wherein each IP address and associated MAC address represents an address deception, and wherein, when responding to a request for information about a MAC address or an IP address from the list, the deception system adopts the IP address and the MAC address at the network interface in order to respond to the request;
    receiving a packet from the network, wherein the packet is addressed to a particular address deception represented in the list;
    determining that a response to the packet requires more than information about a particular MAC address or a particular IP address that represents the particular address deception;
    identifying a deception mechanism from a plurality of deception mechanisms hosted by the deception system, wherein the deception mechanism emulates a network device;
    starting up the deception mechanism, wherein a running deception mechanism that can respond to the packet is not available until the deception mechanism is started up;
    configuring the deception mechanism to respond to the packet;
    providing the packet to the deception mechanism;
    transmitting a response generated by the deception mechanism onto the network;
    receiving a second packet from the network, wherein the second packet is addressed to the deception mechanism;
    determining an intent associated with the second packet, wherein the intent includes an interaction with the network device emulated by the deception mechanism, wherein the interaction includes responding to the second packet or a subsequent packet; and
    modifying a configuration of the deception mechanism according to the intent, wherein modifying enables the deception mechanism to perform the interaction.

2. The method of claim 1, wherein the intent is associated with a network protocol, and wherein configuring the deception mechanism includes enabling the network protocol.

3. The method of claim 1, wherein the intent is associated with an operating system, and wherein configuring the deception mechanism includes initiating the operating system.

4. The method of claim 1, wherein the intent is associated with an application, and wherein configuring the deception mechanism includes making the application available.

5. The method of claim 1, wherein the intent is associated with a process, and wherein configuring the deception mechanism includes initiating the process.

6. The method of claim 1, wherein the intent is associated with data, and wherein configuring the deception mechanism includes generating the data.

7. The method of claim 1, wherein the intent is associated with a vulnerability, wherein configuring the deception mechanism includes configuring the deception mechanism to include the vulnerability.

8. The method of claim 1, wherein responding to the packet includes enabling a connection with a source of the packet.

9. The method of claim 1, further comprising:
    configuring the deception mechanism to include a an asset; and
    monitoring the deception mechanism to determine whether an additional packet is received that is directed at the asset.

10. The method of claim 1, wherein the deception mechanism is a low-interaction deception, wherein a low-interaction deception emulates one or more network devices, and wherein a low-interaction deception avoids granting connection requests.

11. The method of claim 1, wherein the deception mechanism is a high-interaction deception, wherein a high-interaction deception emulates only one network device, and wherein a high-interaction deception accepts connection requests.

12. The method of claim 1, wherein the intent is associated with specific user credentials, and wherein configuring the deception mechanism includes generating and enabling the specific user credentials on the deception mechanism.

13. A network deception system on a network, comprising:
one or more processors; and
a non-transitory computer-readable medium including instructions that, when executed by the one or more processors, cause the one or more processors to perform operations including:
configuring a network interface of the network deception system with a list of Media Access Control (MAC) and Internet Protocol (IP) addresses wherein each MAC address in the list is associated with an IP address in the list, wherein each MAC address and associated IP address represents an address deception, and wherein, when responding to a request for information about a MAC address or an IP address from the list, the network deception system adopts the IP address and the MAC address at the network interface in order to respond to the request;
receiving a packet from the network, wherein the packet is addressed to a particular address deception represented in the list;
determining that a response to the packet requires more than information about a particular MAC address or a particular IP address that represents the particular address deception;
identifying a deception mechanism from a plurality of deception mechanisms hosted by the network deception system, wherein the deception mechanism emulates a network device;
starting up the deception mechanism, wherein a running deception mechanism that can respond to the packet is not available until the deception mechanism is started up;
configuring the deception mechanism to respond to the packet, wherein configuring includes;
providing the packet to the deception mechanism;
transmitting a response generated by the deception mechanism onto the network;
receiving a second packet from the network, wherein the second packet is addressed to the deception mechanism;
determining an intent associated with the second packet, wherein the intent includes an interaction with the network device emulated by the deception mechanism, wherein the interaction includes responding to the second packet or a subsequent packet; and
modifying a configuration of the deception mechanism according to the intent, wherein modifying enables the deception mechanism to perform the interaction.

14. The network deception system of claim 13, wherein the non-transitory computer-readable medium further comprises instructions that, when executed by the one or more processors, cause the one or more processors to perform operations including:
configuring the deception mechanism to include a an asset; and
monitoring the deception mechanism to determine whether an additional packet is received that is directed at the asset.

15. The network deception system of claim 13, wherein the deception mechanism is a low-interaction deception, wherein a low-interaction deception emulates one or more network devices, and wherein a low-interaction deception avoids granting connection requests.

16. The network deception system of claim 13, wherein the deception mechanism is a high-interaction deception, wherein a high-interaction deception emulates only one network device, and wherein a high-interaction deception accepts connection requests.

17. The network deception system of claim 13, wherein the intent is associated with a network protocol, and wherein configuring the deception mechanism includes enabling the network protocol.

18. The network deception system of claim 13, wherein the intent is associated with an operating system, and wherein configuring the deception mechanism includes initiating the operating system.

19. The network deception system of claim 13, wherein the intent is associated with an application, and wherein configuring the deception mechanism includes making the application available.

20. The network deception system of claim 13, wherein the intent is associated with a process, and wherein configuring the deception mechanism includes initiating the process.

21. The network deception system of claim 13, wherein the intent is associated with data, and wherein configuring the deception mechanism includes generating the data.

22. The network deception system of claim 13, wherein the intent is associated with a vulnerability, wherein configuring the deception mechanism includes configuring the deception mechanism to include the vulnerability.

23. The network deception system of claim 13, wherein responding to the packet includes enabling a connection with a source of the packet.

24. The network deception system of claim 13, wherein the intent is associated with specific user credentials, and wherein configuring the deception mechanism includes generating and enabling the specific user credentials on the deception mechanism.

25. A computer-program product tangibly embodied in a non-transitory machine-readable storage medium, including instructions that, when executed by one or more processors of a deception system on a network, cause the one or more processors to:
configure a network interface of the deception system with a list of Media Access Control (MAC) addresses and Internet Protocol (IP) addresses, wherein each MAC address in the list is associated with an IP address in the list, wherein each MAC address and associated IP address represents an address deception, and wherein, when responding to a request for information about a MAC address or an IP address from the list, the deception system adopts the IP address and the MAC address at the network interface in order to respond to the request;
receive a packet from the network, wherein the packet is addressed to a particular address deception represented in the list;
determine that a response to the packet requires more than information about a particular MAC address or a particular IP address that represents the particular address deception;
identify a deception mechanism from a plurality of deception mechanisms hosted by the deception system, wherein the deception mechanism emulates a network device;

start up the deception mechanism, wherein a running deception mechanism that can respond to the packet is not available until the deception mechanism is started up;

configure the deception mechanism to respond to the packet, wherein configuring includes;

provide the packet to the deception mechanism;

transmit a response generated by the deception mechanism onto the network;

receive a second packet from the network, wherein the second packet is addressed to the deception mechanism;

determine an intent associated with the second packet, wherein the intent includes an interaction with the network device emulated by the deception mechanism, wherein the interaction includes responding to the second packet or a subsequent packet; and modify a configuration of the deception mechanism according to the intent, wherein modifying enables the deception mechanism to perform the interaction.

26. The computer-program product of claim 25, wherein the intent is associated with a network protocol, and wherein configuring the deception mechanism includes enabling the network protocol.

27. The computer-program product of claim 25, wherein the intent is associated with an operating system, and wherein configuring the deception mechanism includes initiating the operating system.

28. The computer-program product of claim 25, wherein the intent is associated with an application, and wherein configuring the deception mechanism includes making the application available.

29. The computer-program product of claim 25, wherein the intent is associated with a process, and wherein configuring the deception mechanism includes initiating the process.

30. The computer-program product of claim 25, wherein the intent is associated with data, and wherein configuring the deception mechanism includes generating the data.

31. The computer-program product of claim 25, wherein the intent is associated with a vulnerability, wherein configuring the deception mechanism includes configuring the deception mechanism to include the vulnerability.

32. The computer-program product of claim 25, wherein the instructions for responding to the packet include instructions that, when executed by one or more processors, cause the one or more processors to:

enable a connection with a source of the packet.

33. The computer-program product of claim 25, further comprising instructions that, when executed by the one or more processors, cause the one or more processors to:

configure the deception mechanism to include a an asset; and monitor the deception mechanism to determine whether an additional packet is received that is directed at the asset.

34. The computer-program product of claim 25, wherein the deception mechanism is a low-interaction deception, wherein a low-interaction deception emulates one or more network devices, and wherein a low-interaction deception avoids granting connection requests.

35. The computer-program product of claim 25, wherein the deception mechanism is a high-interaction deception, wherein a high-interaction deception emulates only one network device, and wherein a high-interaction deception accepts connection requests.

36. The computer-program product of claim 25, wherein the intent is associated with specific user credentials, and wherein configuring the deception mechanism includes generating and enabling the specific user credentials on the deception mechanism.

* * * * *